(12) United States Patent
Lazar

(10) Patent No.: US 8,866,412 B2
(45) Date of Patent: Oct. 21, 2014

(54) SOURCE AND MULTIPLE LOADS REGULATOR

(75) Inventor: James Frederick Lazar, Moorpark, CA (US)

(73) Assignee: Braxton Engineering, Inc., Moorpark, CA (US)

( * ) Notice: Subject to any disclaimer, the term of this patent is extended or adjusted under 35 U.S.C. 154(b) by 231 days.

(21) Appl. No.: 13/345,722

(22) Filed: Jan. 8, 2012

(65) Prior Publication Data

US 2012/0176826 A1 Jul. 12, 2012

Related U.S. Application Data

(60) Provisional application No. 61/431,435, filed on Jan. 11, 2011.

(51) Int. Cl.
| | | |
|---|---|---|
| *H05B 37/02* | (2006.01) | |
| *H02M 3/158* | (2006.01) | |
| *H02M 1/00* | (2006.01) | |

(52) U.S. Cl.
CPC ................... *H02M 3/158* (2013.01); *H02M 2001/0077* (2013.01)
USPC .................. 315/307; 315/185 R; 315/193

(58) Field of Classification Search
USPC ............. 315/119, 122, 125, 185 R, 186, 193, 315/291, 294, 306, 307, 360; 363/126
See application file for complete search history.

(56) References Cited

U.S. PATENT DOCUMENTS

| | | | |
|---|---|---|---|
| 3,691,404 | A | 9/1972 | Swygert, Jr. |
| 3,733,528 | A | 5/1973 | Gilbreath |
| 4,238,721 | A | 12/1980 | De Luca et al. |
| 5,254,878 | A | 10/1993 | Olsen |
| 5,640,061 | A | 6/1997 | Bornhorst et al. |
| 5,821,733 | A | 10/1998 | Turnbull |
| 5,886,422 | A | 3/1999 | Mills |
| 6,008,623 | A | 12/1999 | Chen et al. |
| 6,031,749 | A | 2/2000 | Covington et al. |
| 6,064,178 | A | 5/2000 | Miller |
| 6,114,835 | A | 9/2000 | Price |
| 6,166,455 | A | 12/2000 | Li |
| 6,452,363 | B1 | 9/2002 | Jabaji |
| 6,738,692 | B2 | 5/2004 | Schienbein et al. |
| 6,791,297 | B2 | 9/2004 | Ott et al. |
| 6,803,677 | B2 | 10/2004 | Algrain et al. |
| 6,806,686 | B1 | 10/2004 | Thrap |
| 6,841,971 | B1 | 1/2005 | Spee et al. |
| 6,975,094 | B1 | 12/2005 | Lascaud et al. |

(Continued)

OTHER PUBLICATIONS

International Search Report and the Written Opinion of the International Searching Authority for PCT/US2010/020581; Sep. 12, 2012.

(Continued)

*Primary Examiner* — Tung X Le

(57) ABSTRACT

A circuit that has one or more control units that divide a load into two or more load groups, with each load group comprised of at least one load element. The one or more control units directing power from a power source to one or more of the load groups based on voltage variations in an output of the power source, load grouping, and operational parameters of the load elements. The circuit further includes one or more pass stages that regulate current flow from the power source to the load groups.

7 Claims, 36 Drawing Sheets

(56) References Cited

U.S. PATENT DOCUMENTS

| | | |
|---|---|---|
| 7,196,494 B2 | 3/2007 | Baumgartner |
| 1,753,586 A1 | 8/2007 | Kangas et al. |
| 7,348,736 B2 | 3/2008 | Piepgras et al. |
| 7,489,086 B2 | 2/2009 | Miskin et al. |
| 7,646,620 B2 | 1/2010 | MacDonald et al. |
| 7,649,322 B2 | 1/2010 | Neuman et al. |
| 7,679,292 B2 | 3/2010 | Allen et al. |
| 7,687,937 B2 | 3/2010 | Lassefer et al. |
| 7,821,230 B2 | 10/2010 | Studgvin et al. |
| 8,384,311 B2 * | 2/2013 | Gray et al. ............ 315/307 |
| 8,410,717 B2 * | 4/2013 | Shteynberg et al. ......... 315/291 |
| 8,686,651 B2 * | 4/2014 | Lynch et al. .............. 315/192 |
| 2004/0233145 A1 | 11/2004 | Chiang |
| 2006/0033482 A1 | 2/2006 | Florence et al. |
| 2007/0145914 A1 * | 6/2007 | Hong et al. ............ 315/291 |
| 2010/0134018 A1 | 6/2010 | Tziony et al. |
| 2011/0273102 A1 * | 11/2011 | van de Ven et al. ........ 315/193 |

OTHER PUBLICATIONS

WO 2012/096861 Pub Date: Jul. 19, 2012 ; PCT/US2012/020581; PCT International Preliminary Report on Patentability Jul. 25, 2013.

* cited by examiner

| Number of Load Groups ON | S3 | S2 | S1 | Specific Load Groups ON |
|---|---|---|---|---|
| 1 | 1 | 1 | 1 | LG1 |
| 2 | 1 | 1 | 0 | LG1, LG2 |
| 3 | 1 | 0 | 1 | LG1, LG3, LG4 |
| 4 | 1 | 0 | 0 | LG1 to LG4 |
| 5 | 0 | 1 | 1 | LG1, LG5 to LG8 |
| 6 | 0 | 1 | 0 | LG1, LG2, LG5 to LG8 |
| 7 | 0 | 0 | 1 | LG1, LG3 to LG8 |
| 8 | 0 | 0 | 0 | LG1 to LG8 |

FIG. 5C

0=OPEN SWITCH; 1=CLOSED SWITCH

| Number of LEDs ON | Effective Load Voltage | S3 ($\overline{A2}$) | S2 ($\overline{A1}$) | S1 ($\overline{A0}$) | Specific Load Groups ON |
|---|---|---|---|---|---|
| 3 | 12V | 1 | 1 | 1 | LG1 |
| 6 | 24V | 1 | 1 | 0 | LG1, LG2 |
| 9 | 36V | 1 | 0 | 1 | LG1, LG3 |
| 12 | 48V | 1 | 0 | 0 | LG1, LG2, LG3 |
| 15 | 60V | 0 | 1 | 1 | LG1, LG4 |
| 18 | 72V | 0 | 1 | 0 | LG1, LG2, LG4 |
| 21 | 84V | 0 | 0 | 1 | LG1, LG3, LG4 |
| 24 | 96V | 0 | 0 | 0 | LG1, LG2, LG3, LG4 |

0=OPEN SWITCH;  1=CLOSED SWITCH

FIG. 5E

| Time Interval | Number of LEDs ON | Effective Load Voltage | S3 ($\overline{A2}$) | S2 ($\overline{A1}$) | S1 ($\overline{A0}$) | Specific Load Groups ON |
|---|---|---|---|---|---|---|
| T0-T2 (T15-T17) | 4 | 16V | 1 | 1 | 1 | LG1 |
| T2-T3 (T14-T15) | 8 | 32V | 1 | 1 | 0 | LG1, LG2 |
| T3-T4 (T13-T14) | 12 | 48V | 1 | 0 | 1 | LG1, LG3 |
| T4-T5 (T12-T13) | 16 | 64V | 1 | 0 | 0 | LG1, LG2, LG3 |
| T5-T6 (T11-T12) | 20 | 80V | 0 | 1 | 1 | LG1, LG4 |
| T6-T7 (T10-T11) | 24 | 96V | 0 | 1 | 0 | LG1, LG2, LG4 |
| T7-T8 (T9-T10) | 28 | 112V | 0 | 0 | 1 | LG1, LG3, LG4 |
| T8-T9 | 32 | 128V | 0 | 0 | 0 | LG1 to LG4 |

0=OPEN SWITCH; 1=CLOSED SWITCH

FIG. 5H

| Time Interval | Number of LEDs ON | Active Regulating Current Source | Approximate Current Set Point Value | Specific Load Groups ON |
|---|---|---|---|---|
| T0-T2 (T9-T11) | 4 | CS1 | 20mA | LG1 |
| T2-T3 (T8-T9) | 12 | CS2 | 24mA | LG1, LG2 |
| T3-T4 (T7-T8) | 20 | CS3 | 30mA | LG1, LG2, LG3 |
| T4-T5 (T6-T7) | 27 | CS4 | 40mA | LG1, LG2, LG3, LG4 |
| T5-T6 | 34 | CS5 | 50mA | LG1, LG2, LG3, LG4, LG5 |

FIG. 6E

SOURCE AND MULTIPLE LOADS REGULATOR

CROSS-REFERENCE TO RELATED APPLICATIONS

This application claims the benefit of priority of U.S. Utility Provisional Patent Application No. 61/431,435, filed 11 Jan. 2011, the entire disclosure of which is expressly incorporated by reference in its entirety herein.

BACKGROUND OF THE INVENTION

1. Field of the Invention

This invention is related to regulators and, more particularly, to a regulator circuit that can efficiently power a plurality of loads from a power source.

2. Description of Related Art

FIG. 1 depicts a conventional Alternating Current (or AC) driven Direct Current (or DC) load 102. As illustrated, a bridge rectifier 108 rectifies an incoming AC line voltage in a well-known manner with the resulting full-wave rectified AC voltage applied to the DC load 102, which is a series combination of individual DC loads 106 with substantially similar electrical characteristics in a DC load string 104 and current limiting resistor R. The current limiting resistor R is needed to control the magnitude of the current in the DC load string 104, and to keep the current within safe operating limits.

In general, the DC load 102 of the circuit topography of FIG. 1 is specifically designed to work with a particular magnitude of incoming AC line voltage Vac(t). That is, the DC load 102 is generally sensitive to incoming AC line voltage transients or potential volatilities or variations thereof. Accordingly, the DC load 102 is selected to function within a specific operating voltage range, requiring careful matching of an appropriate DC load string 104 for a given operating region (or magnitude of incoming AC line voltage Vac(t)). Non-limiting examples of magnitudes of incoming AC line voltage Vac(t) may include 100V, 110V, 120V, 220V, 230V, 240V, or any others dependent on application. Misapplication of the magnitude of incoming AC line voltage Vac(t) and the DC load string 104 requirements can cause many problems, including shortened life of the individual DC loads 106, or insufficient operation of the DC load string 104.

Regrettably, the use of specifically designed DC loads 102 for a given incoming AC line voltage range results in manufacturing difficulties and restricted use of the DC load 102. For example, the DC loads 106 in the DC load string 104 may need to be specifically measured and binned during the manufacturing process, and application of a given DC load string 104 and resistor R combination must be restricted for use with a specified limited AC line voltage range. Therefore, in applications employing the circuit of FIG. 1, DC loads 102 are manufactured with specific electrical characteristics so as to enable operation at specified magnitude of incoming AC line voltage Vac(t). Accordingly, the required manufacture of DC loads 102 with specific or particular electrical characteristics to operate within a specifically commensurate magnitude of incoming AC line voltage Vac(t) becomes costly, and can lead to premature failure of the DC load 102 if misapplied by the consumer.

It should be noted that the choice of the resistor value of the current limiting resistor R of the circuit of FIG. 1 depends on many factors, including the selected magnitude of the incoming AC line voltage Vac(t), and characteristics of the DC load string 104, such as the number of DC loads 106 used in the DC Load string 104, the individual DC load 106 voltages (or the total DC load string 104 voltage), efficiency desired, and others. In order to maintain high efficiency (i.e., maximum operational output and minimum power dissipation), the resistor value of the current limiting resistor R, number of DC loads 106, and DC load voltage of each DC load 106 are chosen to yield maximum operational output with minimum power dissipation in the current limiting resistor R, while ensuring that safe current levels are maintained in order to protect the DC loads 106 from damage. This typically leads to selecting a specific number of DC loads 106 with operational voltage requirements that are commensurate with the peak input voltage (i.e., slightly lower than the peak voltage to further account for the cumulative voltages across the bridge rectifier 108 and the current limiting resistor R).

The current limiting resistor R is particularly useful when used with non-linear DC loads 106 wherein the relationship between the DC loads currents and DC loads voltages is non-linear (e.g., exponential). A non-limiting example of a DC load with non-linear electrical characteristics (e.g., non-linear current and voltage relationship) is a Light Emitting Diode (LED). LEDs are increasingly used as a source of light, in a wide variety of applications, including domestic and industrial lighting, traffic signaling, and decorative lighting, to name a few. The reasons for this proliferation are many: LEDs are efficient, rugged, and can operate over wide variations in temperature. Owing to their higher efficiency, LED-based light bulbs currently available can produce the same light output, with only a fraction of the input power of equivalent incandescent bulbs. Furthermore, LEDs have great reliability, making for light sources with extended lifespan. Additionally, with the proliferation of these light sources and the benefits of high volume production, they are becoming increasingly cost effective.

FIG. 2A depicts a conventional AC driven power circuit, with DC load 102 including a DC load string 104 that is comprised of non-linear DC loads 106 in the form of LEDs. FIG. 2B is an exemplary graphical illustration of typical electrical characteristics, also known as I-V characteristics, of the DC load 102 and DC load string 104 shown in FIG. 2A. As illustrated in FIG. 2B, the application of voltage across an LED string generates an exponential increase in the current through it, which, if increased above a designed limit, Ion (max), may easily damage the LED string. Most devices, linear or non-linear, are designed to operate within a very specified range of current. The current limiting resistor R is used to "linearize" the relationship between voltage and current in the load, so that when the voltage increases, the current in the load will be limited, and may be increased incrementally rather than exponentially. Coupling resistor R to the DC load 104 string extends the useful operating voltage range of DC load 104, from Von(min) to Von(max), as illustrated in FIG. 2B. This benefit does not come without cost, as resistor R is dissipative, and therefore lowers the efficiency of the system, and may lead to thermal problems if the power dissipated is too large.

In addition to the abovementioned design, manufacturing, and deployment issues (e.g., matching electrical characteristics of the DC load 102 requirements with the incoming AC line voltage Vac(t) and so on), the circuits of FIGS. 1 and 2A have a relatively low power factor. Power factor may be thought of as a measure of the effectiveness with which power is delivered to a load from an AC power source. As best illustrated in FIGS. 2C and 2D, because the DC load string 104 in FIGS. 1 and 2A requires a minimum turn ON voltage Von(min) before the individual DC loads 106 conduct significant current, the AC current (as a result of the applied AC voltage Vac(t)) flows only during brief intervals around the peaks of the AC line cycle (where sufficient voltage Von(min) illustrated in FIG. 2C is available to generate sufficient current Idc(t) to turn ON DC load string 104). Accordingly, as the incoming voltage Vac(t) increases (or ramps up) from zero to Von(min), essentially no current or power is actually delivered to the loads during this period. In other words, there is a significant time period in the AC line cycle during which the DC load string 104 is OFF. Stated otherwise, the DC load string 104 is only ON in intervals during which the magnitude of the incoming AC voltage Vac(t) is equal to or greater than Von(min), and the DC load string 104 is OFF in others, resulting in pulsed operation of the DC load string 104. This results in poor power factor, as indicated by the pulse current waveform Idc(t) in FIG. 2D, where current flows only in the intervals between Ton to Toff, with high peak current Ipk 1.

Also shown in FIG. 2D is an ideal current waveform with unity power factor, having substantially reduced peak current Ipk 2. In order to achieve the same average current needed to generate the desired DC load output, the peak current Ipk 1 of the pulsed current waveform must be considerably higher than it would be under higher power factor conditions like the ideal current waveform with peak current Ipk 2. The result of this pulsed current waveform is high peak current and poor power factor. The current is pulsed through the DC load string 104 because current sufficient to turn ON the DC load string 104 flows only during intervals when the AC line voltage Vac(t) is greater than Von(min). That is, as the incoming AC line voltage Vac(t) increases (or ramps up) from zero to Von (min), essentially no current or power is actually delivered to the loads until the instantaneous AC line voltage Vac(t) reaches the minimum ON voltage Von(min). Once turned ON, current flows through the DC load string 104 until the instantaneous AC line voltage Vac(t) again falls below the minimum ON voltage Von(min). Accordingly, throughout the remainder of the line cycle (outside the Ton and Toff interval), no sufficient voltage is available to turn ON the DC load string 104, while during the AC line cycle between Ton and Toff (which are near the peak AC voltage) sufficient current Idc(t) flows through the DC load string 104, resulting in a pulsed current waveform.

In general, pulsed current waveforms have a high crest factor with high peak currents, with relatively low average power delivered to the load compared to current waveforms with high power factor. It is preferable to deliver the maximum power with the minimum current, which is equivalent to having the power factor equal to one, sometimes referred to as unity power factor. The penalties for low power factor include added loss in the power delivery system, reduced reliability of the DC loads 106 owing to high peak current stress, and distortion of the AC line voltage waveform owing to the high peak currents. These issues may seem small when considering the effect of a single load of this type, but the effects are potentially enormous when considering the proliferation of many such loads collectively, simultaneously connected to the same AC power grid.

An added consequence of the pulsed current waveform is that the DC loads 106 are pulse driven, resulting in pulsed "operation" of the DC loads 106. The consequence of the pulsed current waveform for the circuits of FIGS. 1 and 2A (and FIG. 2A in particular) is that in the case where the DC loads 106 are Light Emitting Diodes (LEDs), the circuit generates large flicker in the light output of the LEDs. Light is emitted (or the DC load 106 operates) only when sufficient current Idc(t) flows, during brief intervals around the peaks of the AC line cycle (as illustrated in FIGS. 2C and 2D). In the case of full-wave rectified AC voltage, the resulting light output flicker occurs at twice the AC line frequency. This flicker reduces the quality of the light output, and may even have harmful side effects in individuals susceptible to light flicker.

In addition, the approach depicted in FIGS. 1 and 2A results in a circuit that is not compatible with conventional phase-controlled circuits, a non-limiting example of which may include phase-controlled light dimmer circuits. Conventional phase-controlled light dimmer circuits were originally designed for use with incandescent bulbs. The impedance of an incandescent bulb is largely resistive in nature. This resistive impedance characteristic is compatible with well-known phase-angle control methods used in conventional phase-controlled light dimmers. The AC driven LED circuit shown in FIGS. 1 and 2A is generally not compatible with conventional phase-controlled light dimmers, because the impedance of the DC loads 102 in FIGS. 1 and 2A is inherently nonlinear.

FIG. 3 depicts a conventional DC load string 104 driven by a DC-DC converter used to control the current through the DC load string 104. The bridge rectifier 108 rectifies the incoming AC line voltage Vac(t), and the resulting full-wave rectified AC voltage Vdc(t) is applied to the input of a switch-mode DC-DC converter 110. Owing to its complexity and the presence of energy storage elements (e.g., capacitors, inductors, etc.) within, the switch-mode DC-DC converter 110 is capable of controlling both the incoming AC current and the outgoing DC current through the DC load string 104. Properly designed, the system is capable of efficiently providing DC current to the DC load string 104, while maintaining high power factor at the AC input. This capability does not come without cost. The switch-mode DC-DC converter 110 is complex, typically consisting of a switching transistor, capacitor, inductor, rectifier diode, and associated control circuits at a minimum. The inductor and capacitor serve as energy storage components, which are needed for power processing. These elements are typically large and affect reliability. In addition, the switching action of these circuits is a significant generator of electromagnetic interference (EMI). Mitigating the EMI issues requires still more components. In the end, although the performance of this system can be very good, the complexity and number of components make the realization of this approach large, costly, and less reliable than simpler alternatives.

In addition to the aforementioned issues, the system with the DC-DC converter 110 shown in FIG. 3 is also generally not compatible with conventional light dimmer circuits. When powered from a conventional phase-controlled light dimmer, these circuits can exhibit oscillatory behavior. This oscillatory behavior can manifest itself as low frequency flicker (e.g., at frequencies below twice the AC line frequency), and this may induce harmful side effects in individuals susceptible to light flicker. Clearly, there is a need for a simple load regulator circuit that overcomes the issues discussed above.

Accordingly, in light of the current state-of-the-art and the drawbacks to current regulators mentioned above, a need exists for a source and multiple loads regulator that would enable a load to operate reliably within a wide range of source voltage inputs, with improved power factor, minimum power loss (high efficiency), and low cost of production.

BRIEF SUMMARY OF THE INVENTION

A non-limiting, exemplary optional aspect of the present invention provides a circuit, comprising:

one or more control units that divide a load into two or more load groups, with each load group comprised of at least one load element;

with the one or more control units directing power from a power source to one or more of the load groups based on voltage variations in an output of the power source, and commensurate with load grouping and operational parameters of the load groups and the load elements.

Another non-limiting, exemplary optional aspect of the present invention provides a circuit, further comprising:

one or more pass stages that regulate current flow from the power source to the load groups.

Still another non-limiting, exemplary optional aspect of the present invention provides a circuit, further comprising:

one or more regulating current source modules, each operating in any one of:

a low impedance state;

a linear series pass stage, providing regulated current to a series coupled circuits; and a high impedance state.

A further non-limiting, exemplary optional aspect of the present invention provides a circuit, further comprising:

one or more regulating current source modules, each operating in any one of:

a low impedance state;

a switching series pass stage, providing regulated current to a series coupled circuits; and a high impedance state.

Still a further non-limiting, exemplary optional aspect of the present invention provides a circuit, wherein:

the power source is an Alternating Current (AC) voltage source, and the one or more pass stages regulate the flow of current substantially proportional to the instantaneous magnitude of the applied voltage.

Another non-limiting, exemplary optional aspect of the present invention provides a method for regulating a varying power source and load, comprising:

dividing a load into two or more load groups, with each load group comprised of at least one load element; and directing power from a varying power source to one or more of the load groups based on voltage variations in an output of the varying power source, and commensurate with the load grouping and operational parameters of the load groups and load elements.

Another non-limiting, exemplary optional aspect of the present invention provides a method for regulating a varying power source and load, further comprising:

regulating current flow from the power source to the load groups.

Another non-limiting, exemplary optional aspect of the present invention provides a regulator circuit, comprising:

a controller that divides a load into two or more load groups, with each load group of the two or more load groups comprised of at least one load element;

the controller directs power to one or more of the load groups, based on voltage variations in an output of a power source, load grouping, and operational parameters of load elements;

with a number of load elements of one or more load groups powered ON in response to the variations in the output of the power source commensurate with power requirements of the number of load elements and instantaneous magnitude of a voltage of the power source.

Still another non-limiting, exemplary optional aspect of the present invention provides a regulator circuit, wherein:

the number of load elements is the maximum number of load elements that can be powered ON commensurate with power requirements of the load elements and instantaneous magnitude of the voltage of the power source.

A further non-limiting, exemplary optional aspect of the present invention provides a regulator circuit, comprising:

a controller that divides a load into two or more load groups, with a load group of the two or more load groups comprised of at least one load element;

the controller directs power to one of load, at least one load group, and at least one load element commensurate with instantaneous magnitude of a power source voltage and power requirements of one of the load, load group, and load element to establish any one or more of:

a load voltage across and a load current through the load;

a load group voltage across and a load group current through at least one load group; and a load element voltage across and a load element current through at least one load element;

with the load group voltage having a first magnitude that is less than the load voltage magnitude, and with the load element voltage having a second magnitude that is less than or equal to the first magnitude;

with load element current through at least one load element established commensurate with power requirements of the load element and the instantaneous magnitude of the power source voltage to thereby maximize operational output of the load and improve efficiency.

Still a further non-limiting, exemplary optional aspect of the present invention provides a regulator circuit, wherein:

the load element current through at least one load element is established throughout most of an Alternating Current (AC) line cycle commensurate with power requirements of the load element and the instantaneous magnitude of the AC power source voltage to thereby maximize operational output of the load, improving efficiency and power factor.

Yet a further, non-limiting, exemplary optional aspect of the present invention provides a regulator circuit, wherein:

the load group current through at least one load group is established throughout most of an Alternating Current (AC) line cycle commensurate with power requirements of the load group and the instantaneous magnitude of the AC power source voltage to thereby maximize operational output of the load, improving efficiency and power factor.

Another non-limiting, exemplary optional aspect of the present invention provides a regulator circuit, further comprising:

one or more series pass stages for regulating current to load substantially proportional to input voltage.

Yet another non-limiting, exemplary optional aspect of the present invention provides a regulator circuit, further comprising:

one or more series pass stages for regulating current to load substantially proportional to input voltage.

Such stated advantages of the invention are only examples and should not be construed as limiting the present invention. These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments. It should be noted that no chart or graph is necessarily to scale, and all are mere exemplary illustrations.

Referring to the drawings in which like reference character(s) present corresponding part(s) throughout:

FIG. 5C is a non-limiting exemplary illustration of a table showing the states of various elements of the regulator circuit of FIG. 5B in accordance with the present invention;

FIG. 5E is a non-limiting exemplary illustration of a table showing the states of various elements of the regulator circuit of FIG. 5D in accordance with the present invention;

FIG. 5H is a non-limiting exemplary illustration of a table showing the states of various elements of the regulator circuit of FIG. 5F in accordance with the present invention;

FIG. 6E is a non-limiting exemplary illustration of a table showing the states of various elements of the regulator circuit of FIG. 6C in accordance with the present invention;

DETAILED DESCRIPTION OF THE INVENTION

The detailed description set forth below in connection with the appended drawings is intended as a description of presently preferred exemplary embodiments of the invention and is not intended to represent the only forms in which the present invention may be constructed and or utilized.

The term "rectifier" in the context of this invention is generally used to describe a circuit that converts AC voltage at its input to DC voltage at its output. The term "DC voltage" is sometimes used to mean a stable, constant voltage, such as that from a battery, but is also used to describe a voltage of a single polarity, such as that appearing at the output (or DC) side of a bridge rectifier with a sinusoidal AC input voltage and a resistive load. In the present context, the DC voltage appearing at the output (or DC) side of the bridge rectifier is referred to as "rectified AC voltage." The term "resistive" such as in "resistive load" in the context of this invention is generally used to describe a load or element (passive or active) that has an impedance wherein the current depends on the applied voltage, and should not be limited to mere resistors.

Throughout the disclosure, specific references to LEDs or batteries as DC loads are only meant for convenience of examples of DC loads, and should not be limiting. In fact, any two or more DC loads or a group of DC loads with compatible electrical characteristics or properties may be used, a non-limiting example of which may include different DC based systems or devices such as DC loads with compatible electrical characteristics or properties. In the context of the present invention a "load" must be divisible into two or more load groups and or elements.

The present invention provides a circuit comprising one or more control units that divide a load into two or more load groups, with each load group comprised of at least one load element. The one or more control units direct power from a power source to one or more load groups based on variations in an output of the power source and operational parameters of the load elements to thereby improve efficiency, power factor, flicker (in case of a load being a lamp or LED or other light source), or some other desirable system parameter. The power source may be an AC or DC power source, and the load may be an AC or DC load. The load must be capable of being divided into smaller load groups or load elements in terms of load electrical properties or characteristics that require lesser or smaller voltage, current, and/or power to be activated or biased ON. The level of granulation of the load into smaller load groups (i.e., the amount by which a load may be divided into smaller load groups and load elements that require smaller voltage, current, and/or power to be activated or biased ON) depends on the load and power requirements, including efficiencies required.

Figure 1:
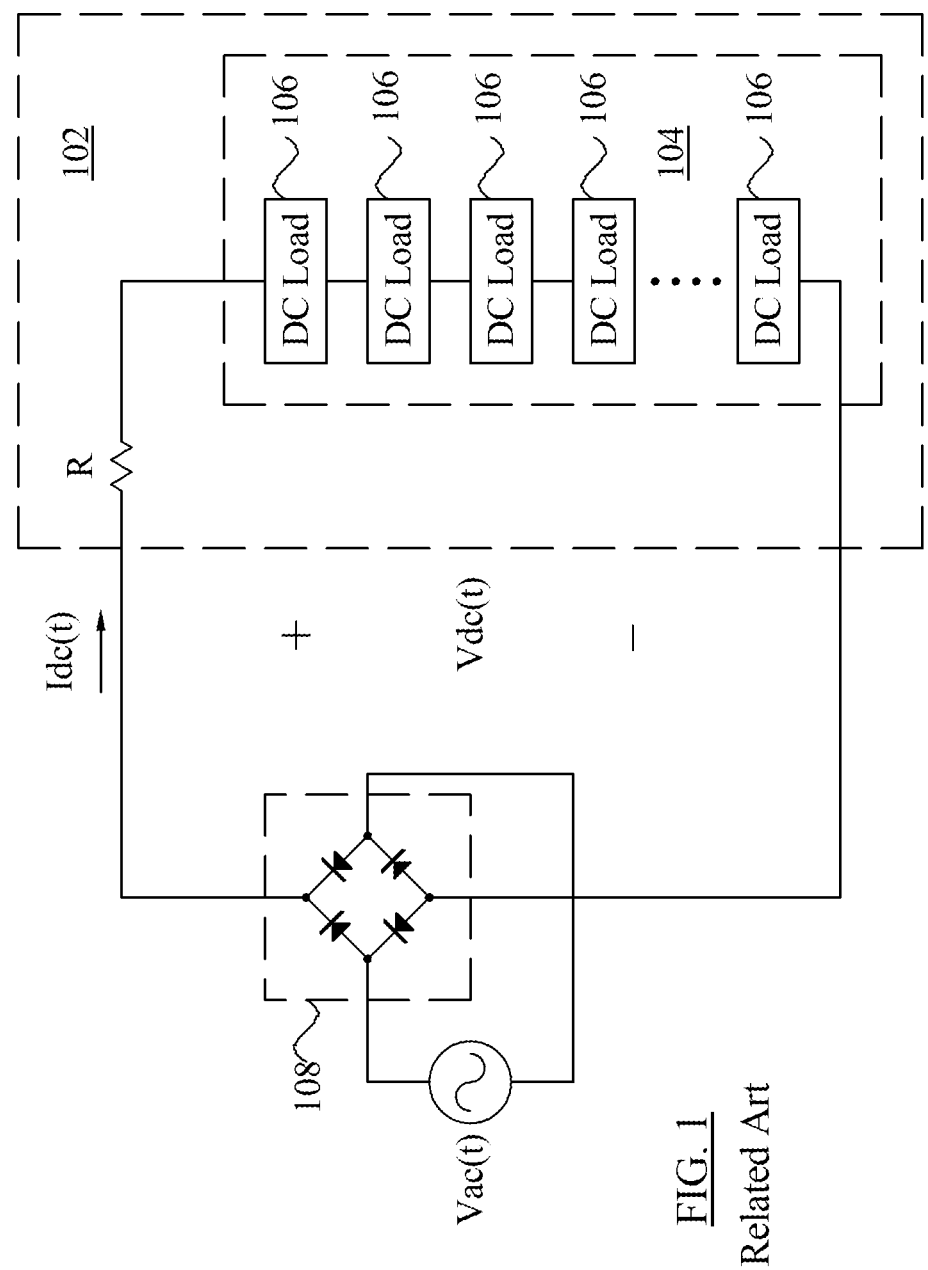
FIG. 1 is a non-limiting exemplary illustration of a conventional AC driven DC load.
Figure 2A:
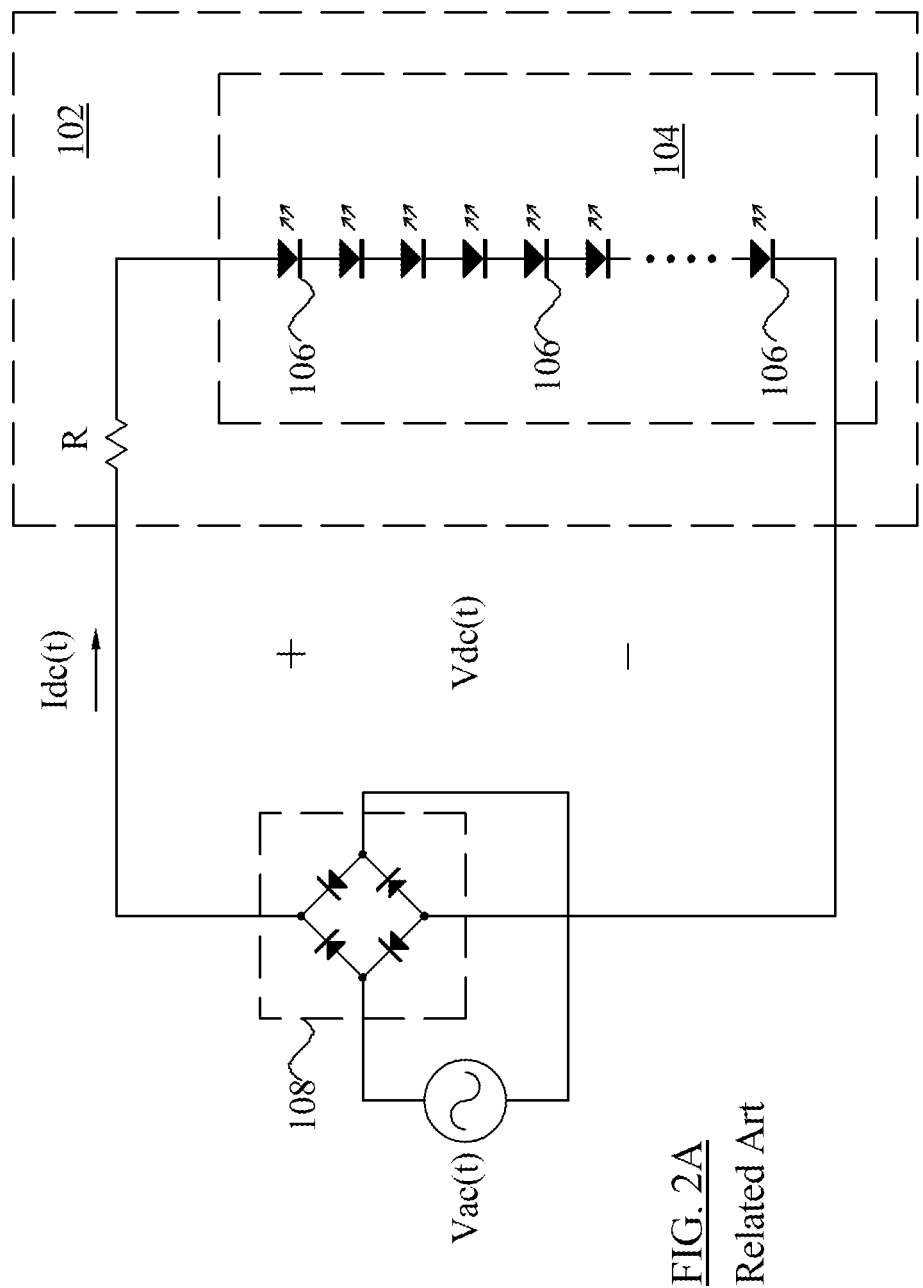
FIG. 2A is a non-limiting exemplary illustration of a conventional AC driven power circuit, with DC load including a DC load string that is comprised of non-linear DC loads.
Figure 2B:
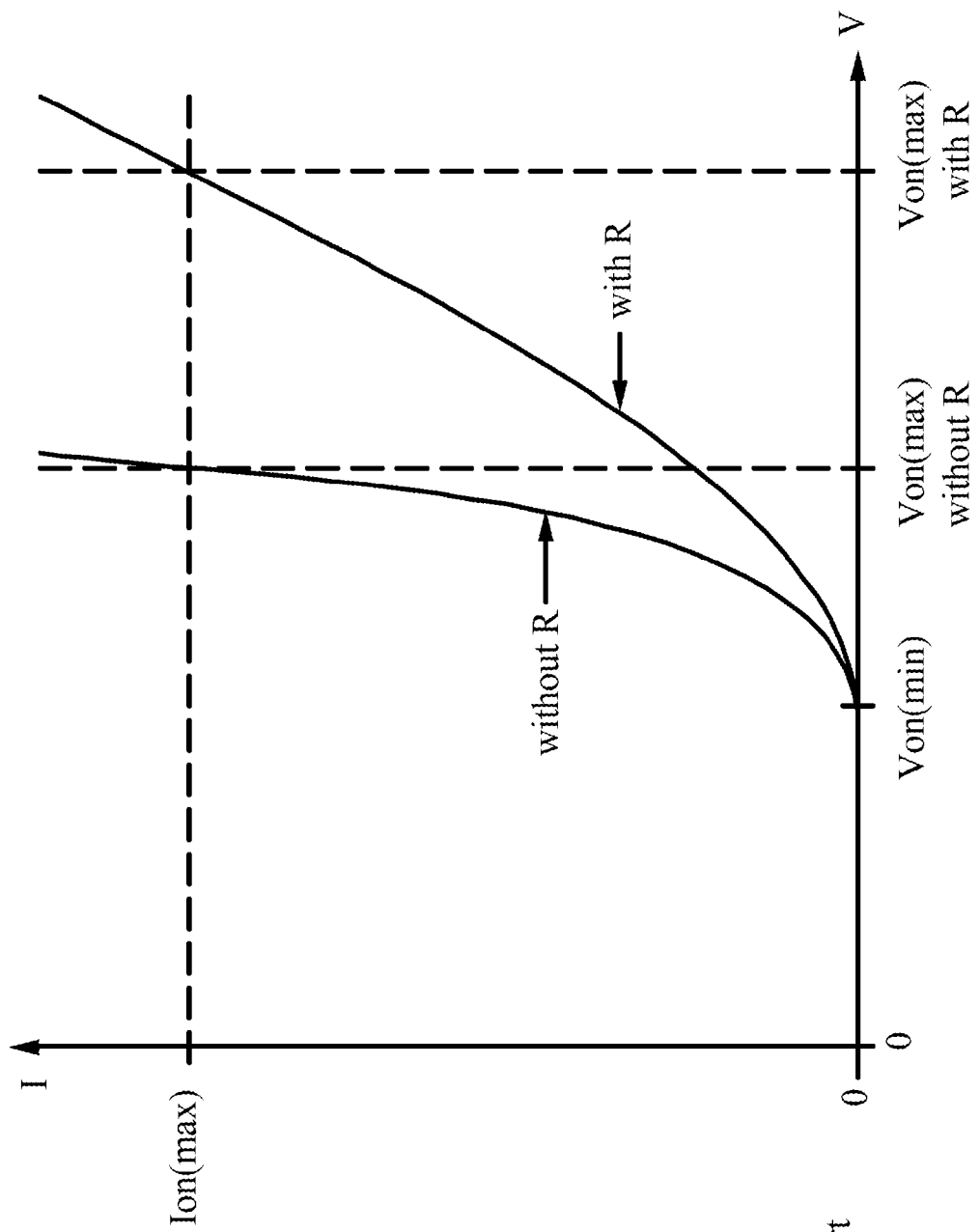
FIG. 2B is a non-limiting exemplary graphical illustration of typical electrical characteristics, also known as I-V characteristics, of the DC load and DC load string shown in FIG. 2A.
Figures 2C, 2D:
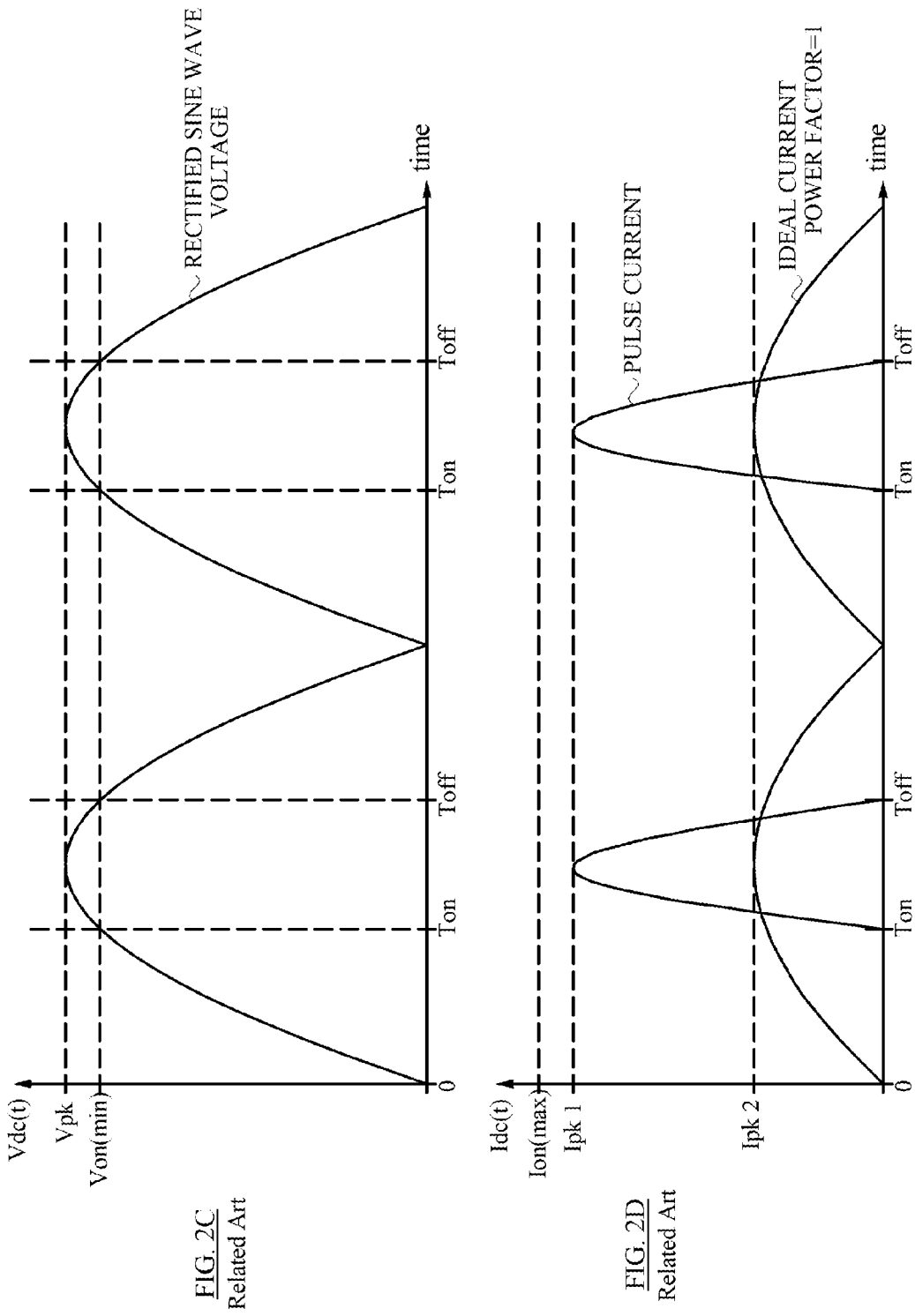
FIG. 2C is a non-limiting exemplary graphical illustration of voltage in circuit shown in FIG. 2A.
FIG. 2D is a non-limiting exemplary graphical illustration of current in circuit shown in FIG. 2A.
Figure 3:
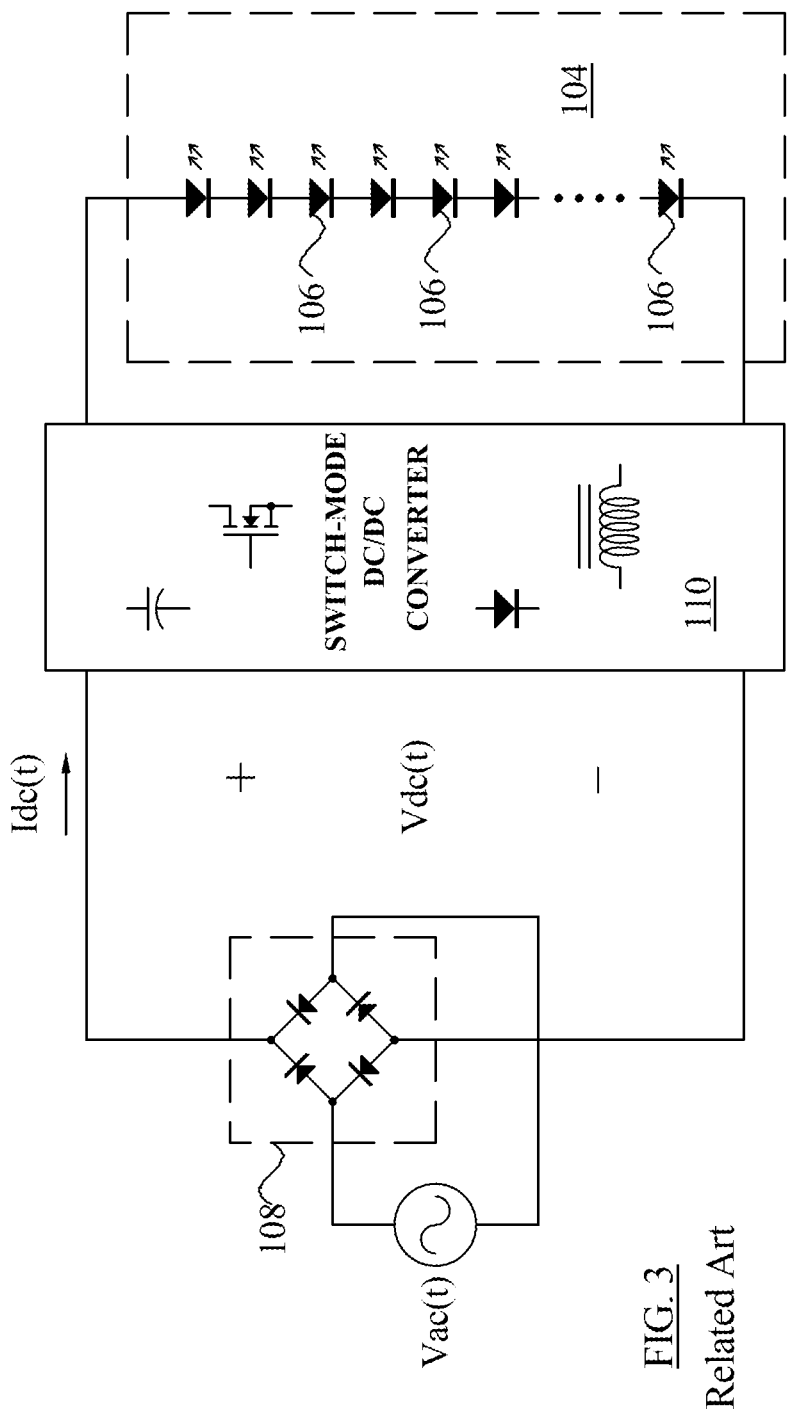
FIG. 3 is a non-limiting exemplary illustration of a conventional AC driven DC load using a switch-mode DC/DC converter.
Figure 4A:
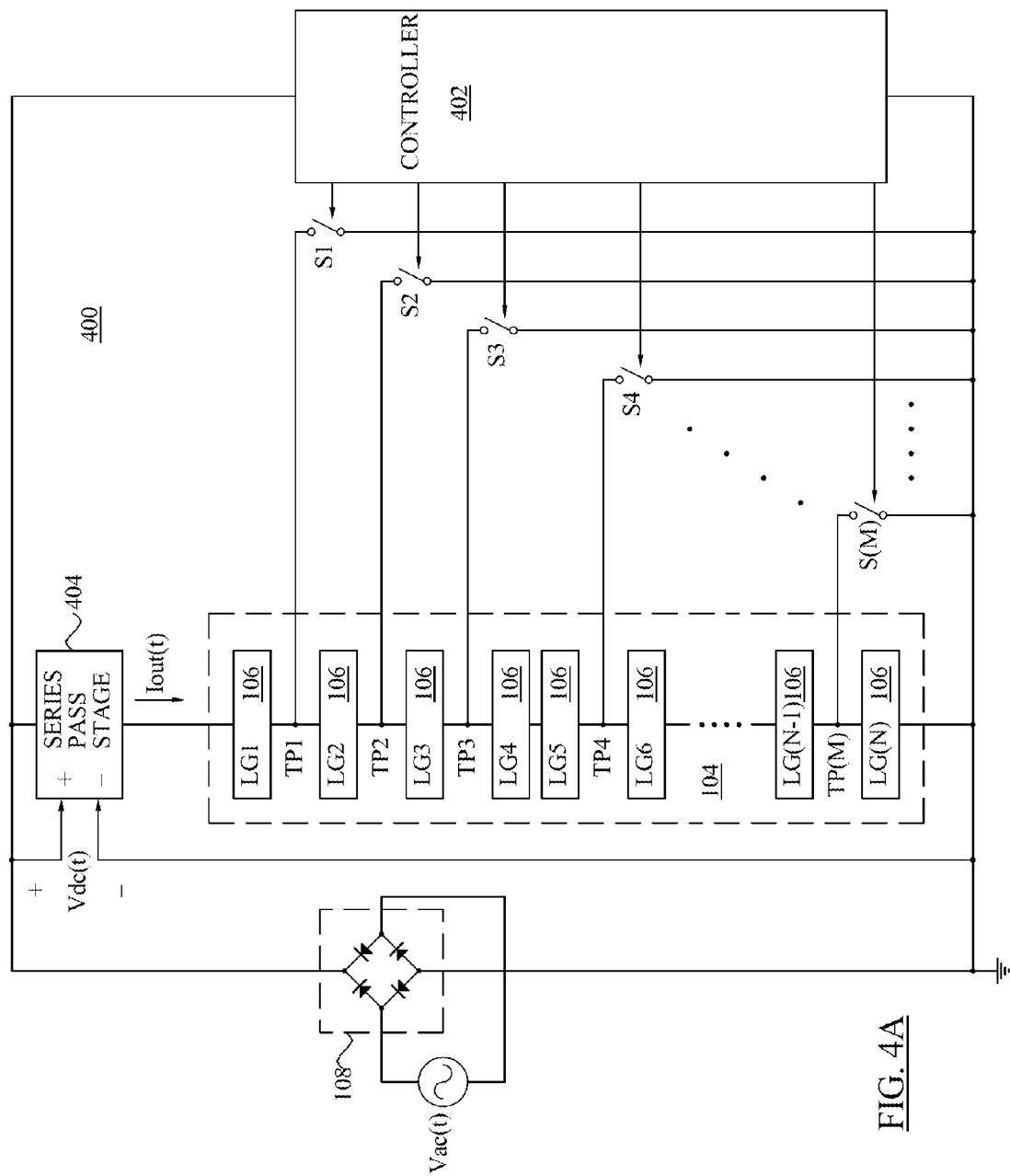
FIG. 4A is a non-limiting exemplary illustration of a regulator circuit in accordance with the present invention.

FIG. 4A is a non-limiting, exemplary illustration of an embodiment of a regulator circuit in accordance with the present invention. As illustrated, the regulator circuit 400 includes a controller 402 that divides a load 104 into two or more load group constituents 106 (LG1, LG2, LG3, . . . LG(N)), with a load group of the two or more load groups 106 comprised of at least one load element. The controller 402 directs power to one or more load groups 106 based on variations in an output of a power source Vac(t) and operational parameters of the load elements via a switching scheme using switches S1 to S(M). The circuit 400 enables the maximum number of load elements to be powered ON in response to the variations in the output of the power source Vac(t) commensurate with power requirements of the maximum number of load elements and instantaneous magnitude of a voltage of the power source to thereby maximize operational output of the load 104, and improving efficiency.

As illustrated in FIG. 4A, the circuit 400 includes a load 104 that is capable of being divided into two or more smaller load groups 106 LG1, LG2, LG3, . . . LG(N), with each individual load group or constituent 106 LG1, LG2, LG3, . . . LG(N) having electrical properties or characteristics that require less current, voltage, and/or power to be activated or biased ON as compared with the larger load 104. A non-limiting, non-exhaustive example of a load 104 that may be divided into smaller constituent load components or elements, may be a single series connected string of LEDs, as a load 104 that may be divided into individual or smaller strings of LEDs as smaller load groups or elements constituent components.

As further illustrated in FIG. 4A, in this particular non-limiting, exemplary embodiment, the present invention provides a switching scheme that uses switches S1 to S(M) that are controlled by the controller 402 to accomplish the division of the DC load 104 into smaller, more granulated load groups 106 LG1, LG2, LG3, . . . LG(N). As stated above, the level and manner of granulation of the DC load 104 into smaller load groups 106 (i.e., the manner and the number by which a load 104 may be divided into smaller number of load groups 106 requiring less current, voltage, and/or power to be individually activated) depends on the characteristics of the load 104, the switching and control scheme used, the power requirements, and the desired efficiencies.

The circuit 400 has a first switch S1 that is exemplarily coupled in between switching tap point TP1 and ground GND, with switching tap point TP1 selected in between a series coupled load groups 106 LG1 and LG2. A second switch S2 is coupled in between switching tap point TP2 and ground GND, with switching tap point TP2 selected in between a series coupled load groups 106 LG2 and LG3. A third switch S3 is coupled in between switching tap point TP3 and ground GND, with switching tap point TP3 selected in between a series coupled load groups 106 LG3 and LG4. A fourth switch S4 is coupled in between switching tap point TP4 and ground GND, with switching tap point TP4 selected in between a series coupled load groups 106 LG5 and LG6.

The tapping location of the switching tap points TP1 to TP(M) may be selected at any desired position, commensurate with the level and manner of granulation of the division of load 104 into smaller load groups 106 that is desired. For example, switching tap points TP1 to TP3 divide the load 104 into three individual load groups 106 LG1, LG2, and LG3. As another example, the switching tap point TP4 is placed so that both load groups 106 LG4 and LG5 are activated together. Accordingly, load 104 may be divided and isolated into N load groups using M switches, where N is an integer greater than one, and M is an integer greater than or equal to one. For the non-limiting exemplary switching scheme illustrated in FIG. 4A, the load 104 may be divided into N load groups 106 using M switches, where N is an integer greater than one, and M is an integer greater than or equal to one.

Referring to FIG. 4A for the overall systems view operation of the regulator circuit 400, during the initial commencement of the voltage line cycle (i.e., time t=0, arbitrarily assigned to the instant that applied AC line voltage passes through zero on its negative-to-positive transition), initially, all switches S1 to S(M) are closed. As the AC line voltage ramps up and increases from zero volts, the switches are successively opened commensurate with available instantaneous AC line voltage and load requirements. As the AC line voltage reaches its peak value and begins decreasing (i.e., the instantaneous AC line voltage begins to ramp down and decrease from the peak voltage), the switches are successively closed in the reverse order (last opened is first to close) commensurate with the available voltage and load requirements.

Therefore, initially (at time t=0), switch S1 (and, arbitrarily, all other switches S2 to S(M)) would be closed, and all current will initially flow through load group 106 LG1, switching tap point TP1, switch S1, and then to ground GND to bias ON load 106 LG1. It should be noted that no current is passed through load group 106 LG2 because the current flowing through load group 106 LG1 takes the least path of resistance (with closed switch S1 being essentially a short circuit). In other words, closed switch S1 effectively shorts out the remaining series coupled load groups LG2 to LG(N). Therefore, with the present invention, it is no longer required to have a large minimum level of AC input voltage prior to activation of the single larger load 104. That is, the instantaneous magnitude of the AC input voltage need not reach the minimum level that is required to activate the larger load 104 because the larger load 104 is now divided into smaller constituent load group components 106, with each smaller load group 106 requiring lesser or smaller minimum instantaneous magnitude of the AC input voltage to be activated. In other words, each of the smaller load groups or constituents 106 with their lesser or smaller electrical properties or characteristics would require smaller or lesser voltage, current, and/or power for activation, and can be "switched in" successively, commensurate with the sufficient available instantaneous magnitude of the AC input voltage. This enables the maximum number of load elements to be powered ON in response to the variations in the amplitude of the AC power source, commensurate with the power requirements of the maximum number of load elements and instantaneous magnitude of the AC input voltage provided by the AC power source, to thereby maximize operational output of the load, and improve efficiency. The level of granulation of the load 104 into smaller load groups 106 LG1, LG2, . . . LG(N) (i.e., the number of load divisions into load groups and load elements) depends on the load 104 and power requirements, including efficiencies desired.

To continue, current flow is initially through load group 106 LG1 and through switch S1. As the instantaneous magnitude of the applied AC voltage continues to ramp up and increase, and the controller 402 determines that there is sufficient voltage to provide power to additional loads, the controller 402 opens switch S1. Opening switch S1 creates an open-circuit condition in the path of switch S1, compelling instead the current to flow through the additional set of load constituents (e.g., load groups 106: LG1 and LG2), rather than load group LG1 only via switch S1 itself. That is, once the controller 402 determines that there is sufficient voltage in the applied AC input voltage to power two load groups 106, the controller 402 opens the switch S1 (with all other switches already closed). With switch S1 open, current is directed to pass through load group 106 LG1, switching tap point TP1, through load group 106 LG2, switching tap point TP2, and then to ground GND via closed switch S2. In other words, switch S2 shorts out the remaining series coupled load groups LG3 to LG(N). Again, it should be noted that no current flows through switching tap point TP2 to load group 106 LG3 because the current flowing through load group 106 LG2 takes the path of least resistance (with switch S2 being essentially a short circuit).

As the applied AC voltage Vac(t) continues to ramp up and increase, and the controller 402 determines that there is sufficient voltage to be applied across further additional loads, the controller opens switch S2 with S1 remaining open. Opening switch S2 creates an open-circuit condition along the switch path of switch S2, compelling current to flow through the further additional set of loads or load constituents (e.g., loads 106: LG1, LG2, and LG3), rather than through switches S1 and S2. That is, once the controller 402 determines that there is sufficient voltage available to power the three load groups 106 LG1, LG2, and LG3, the controller 402 then opens switch S2 (with switches S3 to S(M) remaining closed, and S1 remaining open). With switches S1 and S2 open, current is directed to flow through load groups 106 LG1, LG2, and LG3, the switching tap point TP3, and then to ground GND via closed switch S3. In other words, switch S3 remaining closed shorts out the remaining series coupled load groups LG4 to LG(N). Again, it should be noted that no current flows through load group 106 LG4 because the current flowing through load group 106 LG3 takes the path of least resistance (with closed switch S3 being essentially a short circuit).

As the instantaneous magnitude of the applied AC voltage Vac(t) continues to ramp up and increase, and the controller 402 determines that there is sufficient voltage to power even further additional loads, the controller then opens switch S3, with switches S2 and S1 remaining open. Opening switch S3 creates an open circuit condition, compelling current to flow through the additional set of load groups LG4 and LG5 (i.e., load groups 106 LG1, LG2, LG3, LG4, and LG5 powered ON), rather than the switches S1, S2, and S3. That is, once the controller 402 determines that there is sufficient voltage in the applied AC input voltage to power five load groups 106, the controller 402 opens switch S3 (with switches S1 and S2 already open, and switches S4 to S(M) already closed). With switches S1, S2, and S3 open, the current is directed to flow through load groups 106 LG1 to LG5 and then to ground GND via the next successive closed switch S4. With switch S4 closed, the remaining series coupled load groups LG6 to LG(N) are effectively isolated from the power source by the closed switch S4. It should be noted that as stated above, the level and manner of granulation of the load 104 into load groups 106 LG1, LG2, . . . LG(N) (the number of load divisions into smaller constituent load groups and load elements) depends on the load 104 and power requirements, including efficiencies required. Accordingly, in this non-limiting exemplary instance, load groups 106 LG4 and LG5 were grouped together, and activated together with load groups LG1 to LG3 as a result of the opening of the switches S1, S2, and S3.

At the peak of the AC line cycle, most (if not all) of the load elements will be activated. This means that there might be instances (depending on design requirements, load requirements, and availability of power) where one or more load groups 106 may not be activated or turned ON, even at the peak of the AC line cycle. For example, in the exemplary instance illustrated in FIG. 4A, load groups 106 LG6 to LG(N) may not turn ON. That is, if the controller 402 determines that the magnitude of the applied AC voltage, even at the peak, is not sufficient to add further loads, the controller 402 will maintain the next successive switch (in this case switches S4 to S(M)) closed, thereby effectively isolating load groups LG6 to LG(N) from being activated, by diverting current through closed switch S4. Accordingly, with the regulator circuit 400 and in accordance with the present invention, the operating voltages of load elements within the load 104 need not be specifically measured and binned during the manufacturing process, and application of a given DC load string 104 and resistor R combination need not be restricted to a specified limited line voltage range. Therefore, in the circuit of FIG. 4A, load 104 need not be manufactured with specific electrical characteristics or properties so as to enable its operation within a very limited specific range of incoming AC line voltage. Accordingly, since the manufacture of loads 104 with specific or particular electrical characteristics or properties to enable operation within a very limited specific range of incoming AC line voltage is no longer necessary, the loads 104 and associated systems may be mass-produced, which lowers their costs. Additionally, given that the circuit scheme of FIG. 4A provides flexibility in control and application of power by "switching in" or "switching out" smaller load constituents 106 of the load 104 commensurate with available incoming AC line voltage, the operation of the load 104 will no longer lead to premature failure if misapplied by consumers. Hence, with the regulator circuit 400, and in accordance with the present invention, the use of specifically designed loads 104 for a very limited specific incoming AC line voltage range is no longer needed, resulting in easy manufacturing and fewer restrictions in the use and application of the load 104.

To continue, as the incoming AC line voltage passes through its peak value and begins to ramp down and decrease, the switching sequence reverses. That is, once the controller 402 determines that there is insufficient voltage in the incoming AC line voltage to power the five load groups 106 LG1 to LG5, the controller 402 closes switch S3, with switches S1 and S2 remaining open, and switches S4 to S(M) remaining closed. With switches S1 and S2 open, the current is directed to flow through load groups 106 LG1 to LG3 and then to ground GND via the now closed switch S3. With switch S3 closed, the remaining series coupled load groups LG4 to LG(N) are effectively isolated from the power source by the closed switch S3. In other words, the now closed switch S3 isolates the remaining series coupled DC load groups LG4 to LG(N), taking them off-line or "switching-out" the DC load groups LG4 to LG(N), commensurate with the instantaneous available voltage.

As the incoming AC line voltage continues to ramp down and decrease further, switch S2 is closed by the controller 402. That is, once the controller 402 determines that there is insufficient voltage in the incoming AC line voltage to power three loads, the controller 402 closes switch S2, with switch S1 remaining open (other switches S3 to S(M) remaining closed). With switch S2 closed and switch S1 open, current is directed to flow through load groups 106 LG1 and LG2 only, and then to ground GND via the now closed switch S2. The remaining series coupled load groups LG3 to LG(N) are effectively isolated from the power source by the closed switch S2.

As the incoming AC line voltage continues to ramp down and decrease even further, switch S1 is closed by the controller 402. That is, once the controller 402 determines that there is insufficient voltage in the incoming AC line voltage to power the two load groups 106 LG1 and LG2, the controller 402 closes switch S1 (with switches S2 to S(M) remaining closed). With switch S1 closed, current is directed to flow through load group 106 LG1 only, and then to ground GND via the now closed switch S1. The remaining series coupled load groups LG2 to LG(N) are effectively isolated from the power source by the closed switch S1.

With the above circuit topography, the load 104 is divided into N load groups using M switches, where N is an integer greater than one, and M is an integer greater than or equal to one. That is, M switches may be used to control N loads. Accordingly, the circuit 400 "breaks" the load 104 into multiple load groups 106. The load groups 106 collectively, when connected in series have a collective voltage, but parts of the load 104 can be energized at different times during the AC line cycle. The controller 402 is used to switch the load groups 106 in and out of the circuit according to availability of voltage from the power source. Accordingly, the rectified AC voltage applied to the regulator circuit 400 cycles from zero to its peak value and back to zero, and during that period the load groups 106 are switched in and out of the circuit in an appropriate manner in order to maximize the power delivered to the load groups 106, and minimize the power dissipated in the series pass stage 404.

Figure 4C:
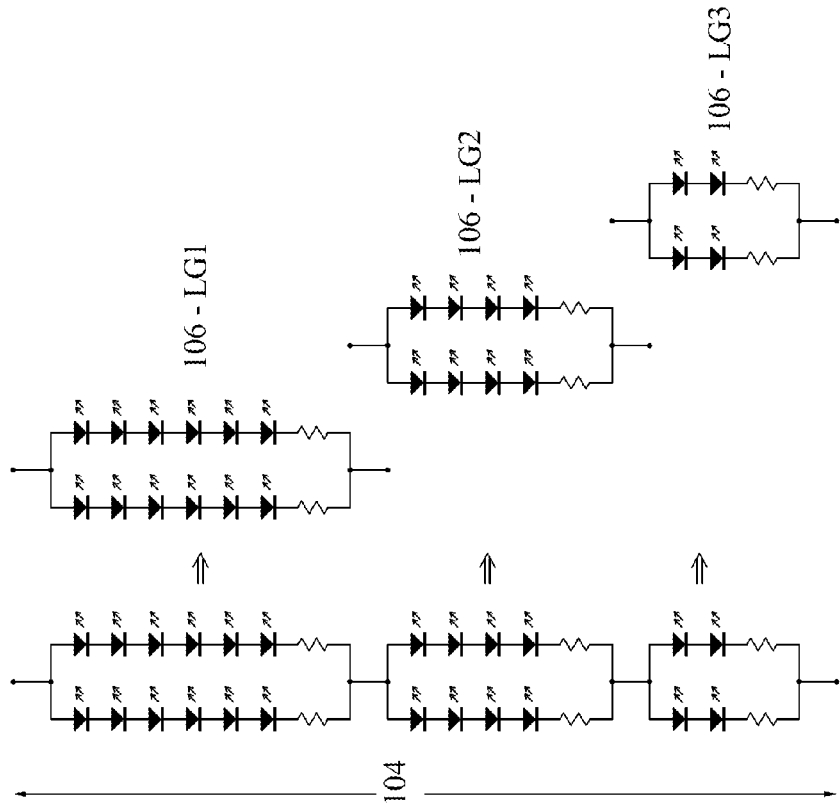
FIGS. 4B and 4C are non-limiting exemplary illustrations of a load divided into one or more load groups and or load elements in accordance with the present invention.
Figure 4B:
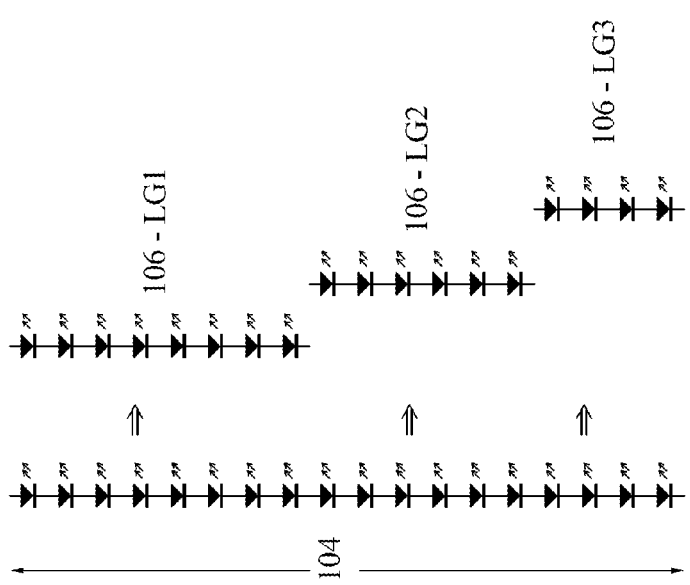

FIGS. 4B and 4C are exemplary illustrations of loads 104 that are capable of being divided into two or more smaller load constituent groups 106 with similar electrical properties or characteristics, with the load groups 106 requiring less current, voltage, and/or power for operation than the larger loads 104. FIG. 4B is a non-limiting example of a load 104 divided into three smaller load constituent groups 106 LG1, LG2, and LG3, with each load group having a different number of load elements (LEDs). As stated above, the manner and level of granulation of the load 104 into finer or smaller load group constituents 106 (i.e., the manner and the amount or number by which a load 104 may be divided into smaller load groups 106 that require smaller voltage, current, and/or power to be activated or biased ON) can vary, and depend on the load and power requirements, including efficiencies desired. FIG. 4C is a non-limiting example of yet another load 104 divided into three smaller load constituent groups 106 LG1, LG2, and LG3, with each load group having a different number of load elements (e.g., LEDs). It is further shown in FIG. 4C that other electrical elements, resistors in this case, may be included in the load groups 106. These resistors may be used to balance current in adjacent LEDs within each load group, or as current sensing resistors. Accordingly, the number of permutations and combinations for the manner and level of granulation of the load 104 into finer or smaller load group constituents 106 is very large.

Referring back to FIG. 4A, the regulator circuit 400 is further comprised of a series pass stage 404, used to provide current to the load 104 in accordance with the voltage and power available from the power source. The series pass stage 404 could simply be a passive element such as a resistor, may include active elements such as transistors, and may further include control inputs as shown in FIG. 4A. In the present case of an AC input voltage source, high power factor can be obtained by passing current "Iout" to load 104 that is substantially proportional to the rectified AC voltage Vdc(t), that is:

$$Iout \propto Vdc(t)$$

Where Vdc(t) is the instantaneous rectified AC voltage at the output (or DC) side of the bridge rectifier 108, as sensed by the series pass stage 404. The voltage Vdc(t), as sensed by the series pass stage 404, is used to provide a proportional current Iout as follows:

$$Iout = Gm \times Vdc(t)$$

Where Gm is the constant of proportionality, or transconductance, between the output current Iout and the sensed voltage Vdc(t). Generally speaking, the transconductance Gm is the ratio of a current change $I_{out}$ at the output of a circuit (in this case, the output of the series pass stage 404) to the voltage change $V_{in}$ at the input of the circuit (series pass stage 404 in this case), that is:

$$Gm \equiv \frac{I_{out}}{V_{in}}$$

In the exemplary instance, $I_{out}$ is the output current Iout of the series pass stage 404, and $V_{in}$ is the sensed voltage Vdc(t). This relationship forces the output current Iout to track the input voltage Vdc(t), with a constant of proportionality given by Gm. Viewed from the AC side of the bridge rectifier 108, the ratio of the AC voltage Vac(t), to the AC current Iac(t), is sometimes referred to as the "emulation resistance" of the circuit. In this exemplary instance:

$$Rem = \frac{Vac(t)}{Iac(t)} = \frac{Vdc(t)}{Iout} = \frac{1}{Gm}$$

This demonstrates that the circuit behaves as a "resistor emulator," with emulation resistance given by:

$$Rem = \frac{1}{Gm}$$

In this example, the series pass stage 404 is designed to provide a current Iout that is proportional to the rectified AC input voltage Vdc(t). The transconductance Gm (that forces current Iout to be substantially proportional to Vdc(t)) is viewed by the power source as a resistive load Rem (or emulation resistance Rem). In other words, the series pass stage 404 enables the input AC voltage source Vac(t) to view the rest of the circuit of FIG. 4A as a resistive element with emulation resistance Rem. It should be noted that the power factor for resistive loads is substantially equal to 1, also known as unity power factor. Accordingly, the series pass stage 404 enables the circuit of FIG. 4A to achieve a power factor that is substantially equal to unity. Stated otherwise, the voltage and current provided by the AC power source are substantially proportional owing to the operation of the series pass stage 404, enabling the regulator circuit 400 to emulate a resistor. Of course, having a substantially unity power factor (where the voltage is substantially proportional to the current) is not necessarily an indication of efficiency. To achieve high efficiency, it is desired to reduce the voltage across the series pass stage 404 to a minimum (thereby reducing power dissipation in the series pass stage: P=VI), while maximizing the voltage across the load 104. Therefore, shifting the most voltage from series pass stage 404 to the loads 104 (i.e., switching-in load groups 106 commensurate with voltage variations), while maintaining a substantially unity power factor, improves the efficiency of the circuit. That is, it reduces the power consumed by the series pass stage 404, and increases the power delivered to the loads 104. As mentioned previously, the series pass stage 404 may be implemented with passive or active elements such as a simple resistor or current source with no requirement for sensing the input voltage Vdc(t), or may be comprised of an active transistor circuit with control inputs as described below.

Figure 4D:
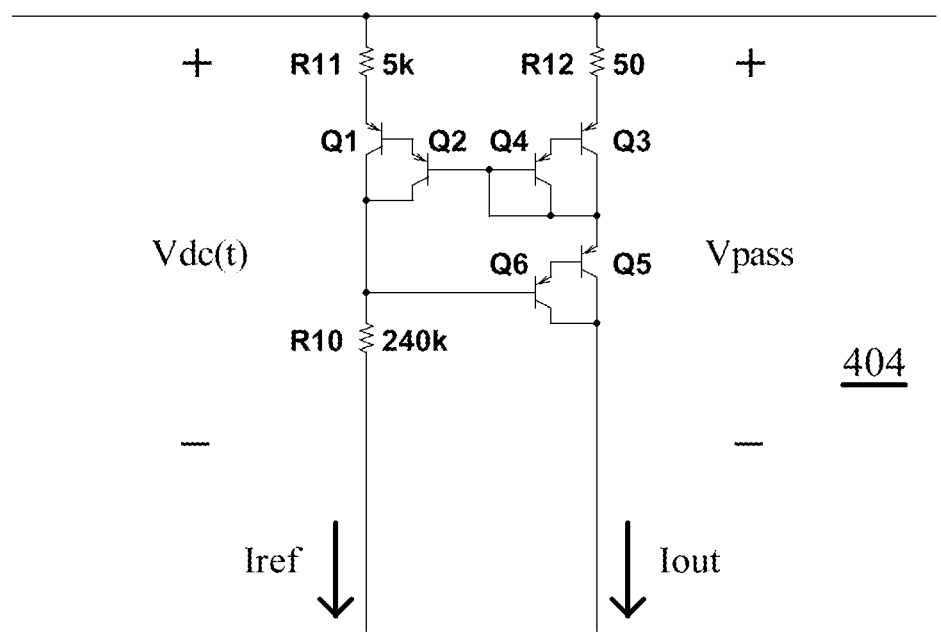
FIG. 4D is a non-limiting exemplary illustration of a pass stage in accordance with the present invention.

FIG. 4D is a non-limiting example of a series pass stage circuit 404 in accordance with the present invention. The series pass stage 404 may be implemented in numerous ways, a non-limiting example of which is illustrated in FIG. 4D as a well-known Wilson Current Mirror employing Darlington pair transistors. The exemplary series pass stage 404 includes a reference current Iref flowing through resistor R10, with resistor R10 chosen to have a relatively high resistance value so to reduce power dissipation. Accordingly, upon application of rectified AC voltage Vdc(t), the reference current Iref is approximately as follows:

$$Iref \cong \frac{Vdc(t)}{R10}$$

The value of resistor R11 is chosen to be much greater than the value of resistor R12, which makes the current gain of the circuit large. Therefore, the output current Iout will be much larger than the reference current Iref. This means that a very small reference current Iref will provide a relatively large output current Iout, with the relationship approximately as follows:

$$Iout \cong \frac{R11}{R12} Iref$$

where R11>>R12. The two expressions above can be combined to relate the output current Iout to the input voltage Vdc(t):

$$Iout \cong \frac{R11}{R10 \times R12} Vdc(t)$$

Figure 4E:
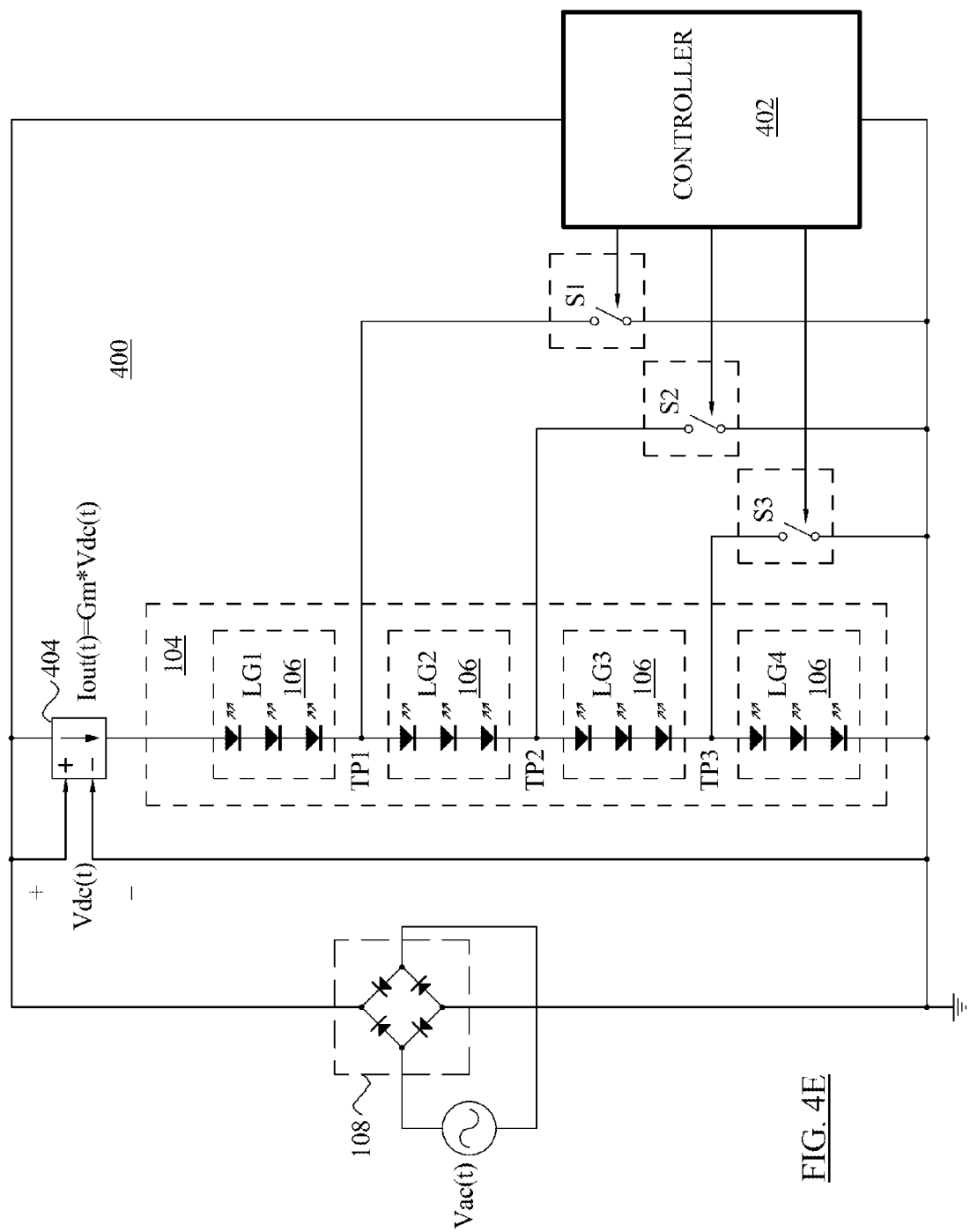
FIG. 4E is a non-limiting exemplary illustration of a regulator circuit using LEDs as load elements in accordance with the present invention.
Figure 4F:
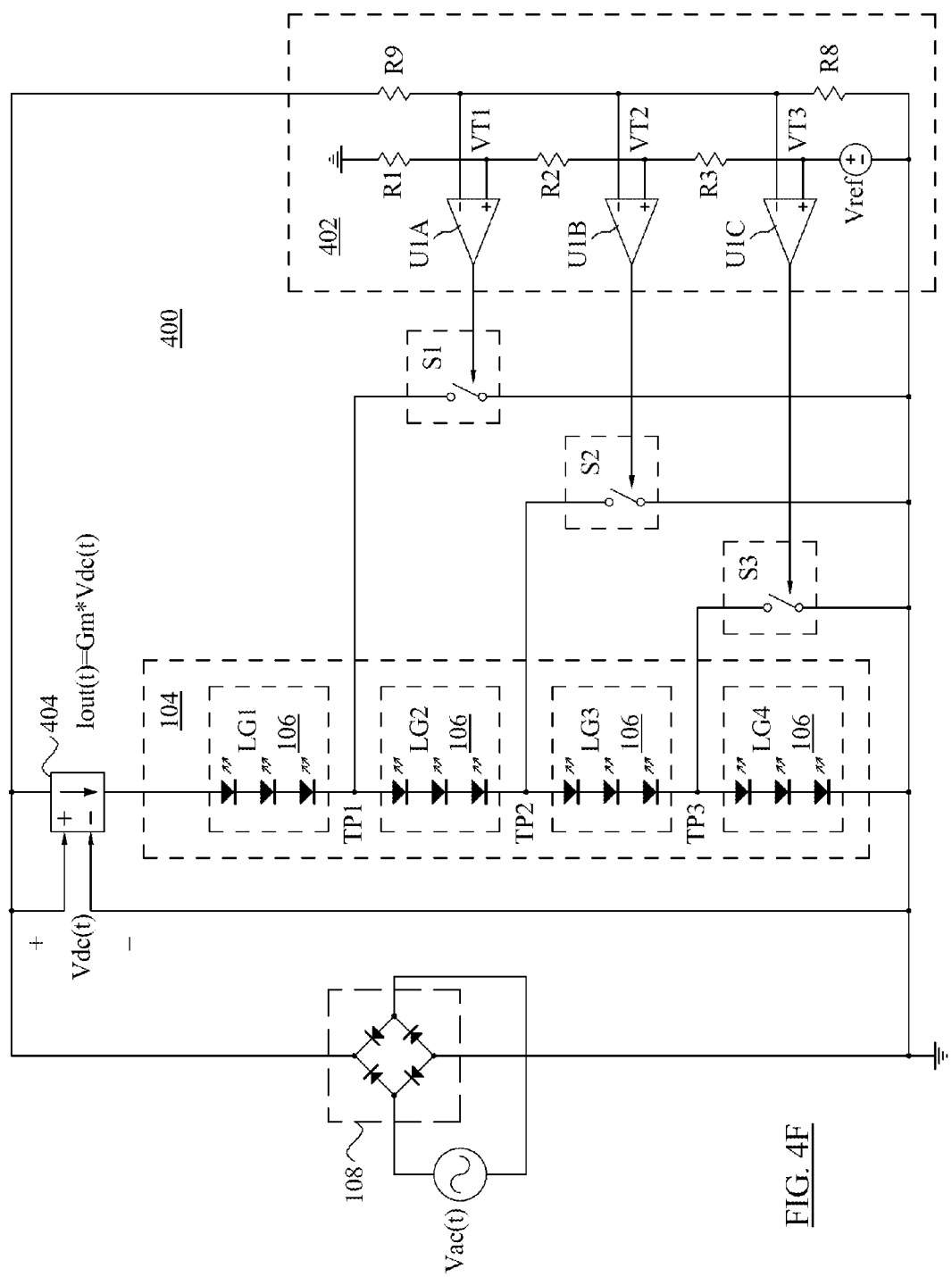
FIG. 4F is a non-limiting exemplary illustration of a regulator circuit using LEDs as load elements, illustrating further details of a controller in accordance with the present invention.
Figure 4G:
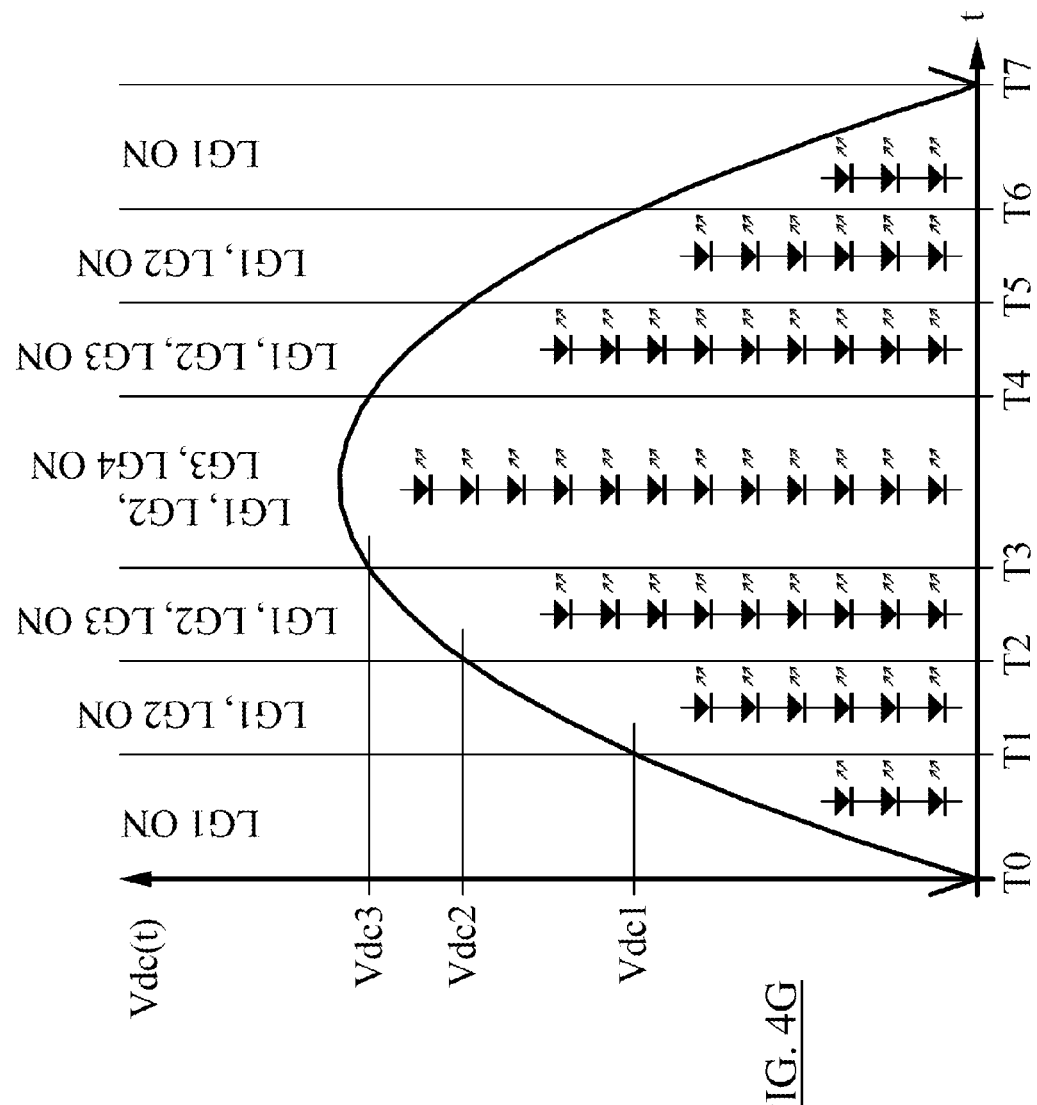
FIG. 4G is a non-limiting exemplary graphical illustration of voltage and number of load elements powered ON in the circuit shown in FIG. 4F in accordance with the present invention.
Figure 4H:
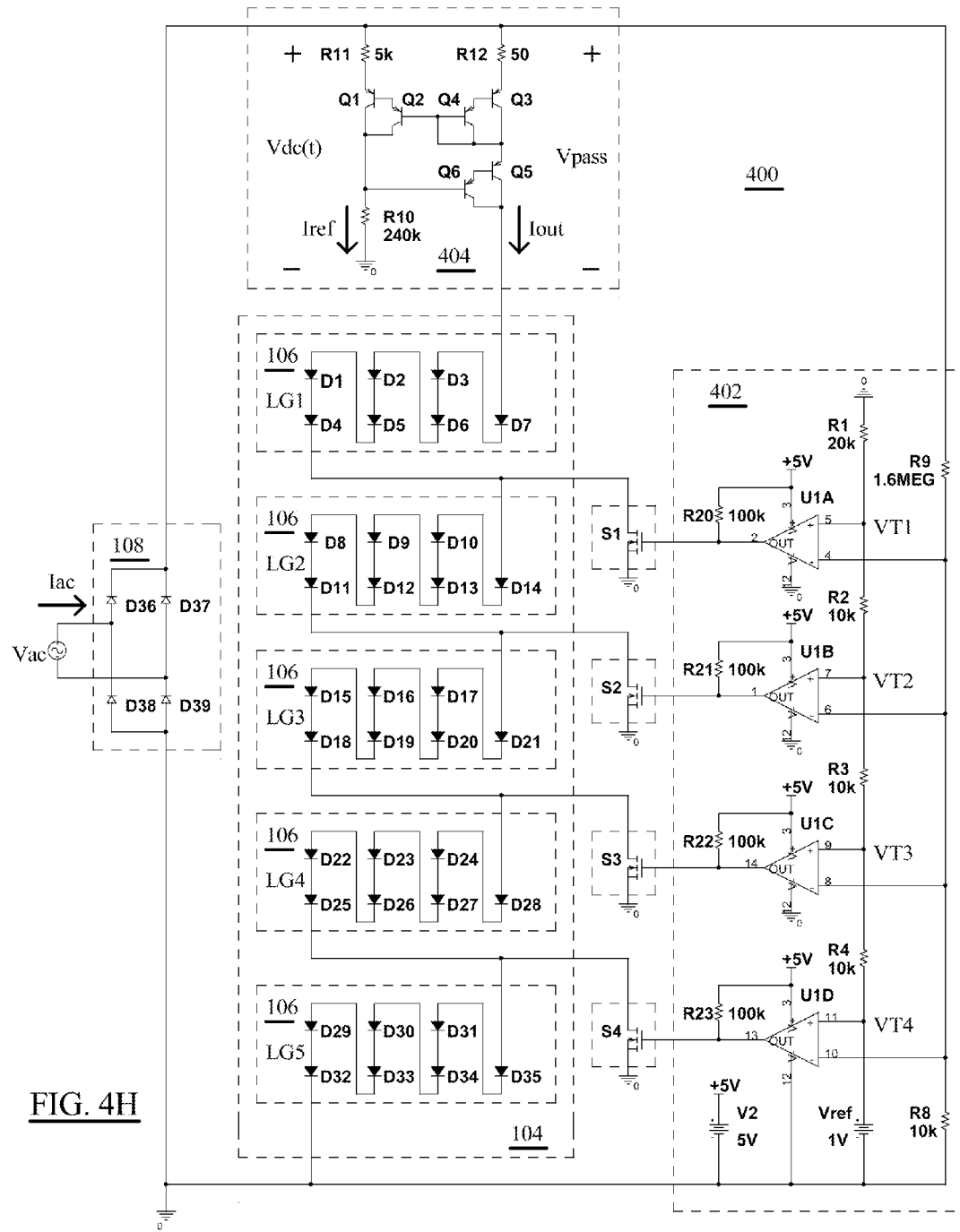
FIG. 4H is a non-limiting exemplary detailed illustration of a regulator circuit in accordance with the present invention.

Referring ahead to FIG. 4H for an exemplary embodiment employing this circuit, the emulation resistance Rem and transconductance Gm for the regulator circuit 400 can be extracted from the above expression:

$$Rem = \frac{Vac(t)}{Iac(t)} = \frac{Vdc(t)}{Iout} = \frac{1}{GM} \cong \frac{R10 \times R12}{R11}$$

The exemplary circuit 400, as viewed from the AC power source Vac(t), emulates a resistor, with emulation resistance Rem given approximately by the above expression.

As further illustrated in FIG. 4D, the Wilson Current Mirror circuit, as one, non-limiting exemplary embodiment of a series pass stage 404, incorporates three Darlington Transistor Pairs (cascade of two transistors), the Darlington Transistor Pairs facilitate to increase the gain of the circuit. Transistors Q1 and Q2 constitute a first Darlington Transistor Pair, transistors Q3 and Q4 constitute a second Darlington Transistor Pair, and transistors Q5 and Q6 constitute a third. As stated above, the purpose of this circuit is to provide an output current Iout that is substantially proportional to the rectified AC input voltage Vdc(t). The voltage Vpass is the voltage appearing across the output of series pass stage 404, which is determined as follows:

$$Vpass(t) = Vdc(t) - Vload(t)$$

Accordingly, it is the non-linear nature of the load 104 (e.g., if loads are LEDs), the amount of current flowing through the load 104, and the status of switches S1 to S(M) that results in the voltage Vpass(t), the voltage appearing across the output of series pass stage 404. For highest efficiency, it is desirable to maintain the voltage Vpass(t) to a minimum; as close to zero volts as possible.

Referring now to FIG. 4E, which is a non-limiting, exemplary illustration of the regulator circuit of FIG. 4A, but using an LED load string 104 in accordance with the present invention. The regulator circuit of FIG. 4E includes similar corresponding or equivalent components, interconnections, functions, and or cooperative relationships as the regulator circuit 400 that is shown in FIG. 4A, and described above. Therefore, for the sake of brevity, clarity, convenience, and to avoid duplication, the general description of FIG. 4E will not repeat every corresponding or equivalent component and or interconnections that have already been described above in relation to the regulator circuit 400 shown in FIG. 4A. In this non-limiting example shown in FIG. 4E, the load 104 is comprised of a string of twelve LEDs that are divided into four load groups 106 LG1, LG2, LG3, and LG4, with each load group 106 consisting of three load elements (or LEDs in this case). The operation of the regulator circuit of the FIG. 4E is identical to that described in FIG. 4A.

FIG. 4F is a non-limiting, exemplary illustration of the regulator circuit 400 of FIGS. 4A and 4E that further details a controller in accordance with the present invention. FIG. 4G is a graphical illustration of an AC line voltage half-cycle versus time, showing pictorially when load groups are switched in and out of the circuit 400. As illustrated in FIG. 4F, exemplary controller 402 is comprised of at least one comparator for comparing the input voltage Vdc(t) (or a scaled-down version thereof) against one or more threshold voltages for actuation of a switch, so as to switch-in or switch-out load groups 106 commensurate with the instantaneous input voltage Vdc(t). That is, when the scaled down version of the input voltage Vdc(t) exceeds a particular threshold voltage, the respective comparator output will switch from high to low, opening the switch associated with that comparator. In other words, the comparators function as voltage controlled switches wherein a high comparator output voltage actuates the closure of a switch with which the comparator is coupled, and a low comparator output voltage actuates the opening of the switch.

More specifically, the controller 402 is comprised of one or more comparators U1 to U3 that compare the scaled-down version of the rectified AC input voltage Vdc(t) (generated by voltage divider resistors R8 and R9) with threshold voltages VT1 to VT3, for actuation of one or more switches S1 to S3. The scaled-down version of the rectified AC input voltage Vac(t) is coupled with the inverting input terminals of the comparators U1 to U3, and the threshold voltages VT1 to VT3 are coupled with the non-inverting input terminals of comparators U1 to U3. The threshold voltages VT1 to VT3 are generated from the reference voltage Vref and resistor divider network R1 to R3. These threshold voltages VT1 to VT3 are easily calculated as:

$$VT1 = \left(\frac{R1}{R1+R2+R3}\right)Vref$$

$$VT2 = \left(\frac{R1+R2}{R1+R2+R3}\right)Vref$$

$$VT3 = Vref$$

The corresponding rectified AC input voltages where the comparator transitions will occur are then calculated by rescaling the above threshold voltages by the resistor divider formed by R8 and R9. Let these transition voltages be Vdc1, Vdc2, and Vdc3. The transition voltages Vdc1 to Vdc3 are then:

$$Vdc1 = \left(1+\frac{R9}{R8}\right)VT1 = \left(1+\frac{R9}{R8}\right)\left(\frac{R1}{R1+R2+R3}\right)Vref$$

$$Vdc2 = \left(1+\frac{R9}{R8}\right)VT2 = \left(1+\frac{R9}{R8}\right)\left(\frac{R1+R2}{R1+R2+R3}\right)Vref$$

$$Vdc3 = \left(1+\frac{R9}{R8}\right)VT3 = \left(1+\frac{R9}{R8}\right)Vref$$

Referring to both FIGS. 4F and 4G, consider one half-cycle of the full-wave rectified AC voltage waveform as shown in FIG. 4G. At the zero crossings of the AC line voltage, the instantaneous value of the full-wave rectified AC voltage Vdc(t) is zero. Let this time be denoted T0, as shown in FIG. 4G. At this instant, the comparator outputs U1A to U1C are all high, and switches S1 to S3 are therefore closed. Closed switches S1 to S3 effectively short load groups 106 LG2 to LG4. As the full-wave rectified AC voltage Vdc(t) increases, there is a time (between T0 and T1) at which there is sufficient voltage to supply substantial current to load group 106 LG1, powering ON load group 106 LG1. During the time period T0 to T1 all switches S1 to S3 remain closed. This process continues until there is sufficient voltage to power ON load groups 106 LG1 and LG2. At time T1, the rectified AC input voltage Vdc(t) increases through Vdc1, and comparator U1A output switches from high to low (i.e., Vdc(t)>Vdc1), opening switch S1. The series pass stage 404 now supplies current to load groups 106 LG1 and LG2, from time T1 until time T2. At time T2, the rectified AC input voltage Vdc(t) increases through Vdc2, and comparator output U1B switches from high to low, opening switch S2. The series pass stage 404 now supplies current to load groups 106 LG1 to LG3, from time T2 until time T3. At time T3, the rectified AC input voltage Vdc(t) increases through Vdc3, and comparator output U1C switches from high to low, opening switch S3. The series pass stage 404 now supplies current to load groups 106 LG1 to LG4, from time T3 until time T4. During the time periods T4 to T7, this process reverses, as illustrated in FIG. 4G. At time T7, the current and voltage return to zero, and the half-cycle is ended. The entire process then repeats itself over and over in the subsequent half-cycles.

FIG. 4H is a non-limiting, exemplary illustrative implementation of the detailed circuit topography of the regulator circuit 400 shown in FIGS. 4A to 4G, but in this non-limiting exemplary implementation, load 104 is exemplarily shown to be comprised of a string of thirty-five LEDs that are divided into five load groups 106 LG1 to LG5, with each load group 106 having seven load elements (e.g., LEDs). In addition, FIG. 4H further details an exemplary circuit topography of the series pass stage 404 (also shown in FIG. 4D) and exemplary circuit details of the controller 402 for the five load groups 106 LG1 to LG5, including the use of MOSFET switches S1 to S4 as the switching elements. The overall operation of the regulator circuit 400 of the FIG. 4H is similar to that described in FIGS. 4A to 4G, with the exception that due to the one additional load group 106 LG5, the regulator circuit 400 of FIG. 4H uses an additional switch S4 and a corresponding additional comparator U4 used to control the switch S4. Accordingly, as illustrated, the regulator circuit 400 of FIG. 4H includes similar corresponding or equivalent components, interconnections, functions, and or cooperative relationships as the regulator circuit 400 that is shown in FIG. 4A to 4G, and described above. Therefore, for the sake of brevity, clarity, convenience, and to avoid duplication, the general description of the regulator circuit 400 of FIG. 4H will not repeat every corresponding or equivalent component, function, and or interconnections that have already been described above in relation to regulator circuit 400 that is shown in FIGS. 4A to 4G.

As illustrated in FIG. 4H, in the non-limiting exemplary implementation, the regulator circuit 400 divides the load 104 into five load groups 106 LG1 to LG5, with each load group 106 having seven load elements (i.e., LEDs in this example). As stated above in relation to FIGS. 4A to 4G, the regulator circuit 400 of FIG. 4H is implemented using four switches S1 to S4 to switch-in and switch-out the five load groups LG1 to LG5. The controller 402 of the regulator circuit 400 includes comparators U1A to U1D associated with switches S1 to S4.

The circuit regulator 400 of FIG. 4H includes the switches S1 to S4 that are implemented as active transistor devices. Many types of transistor devices may be used to perform this function, including bipolar transistors or MOSFETS. FIG. 4H also provides further details with respect to the comparator circuit topography in that the comparators U1A to U1D are shown to include pull-up resistors R20 to R23. It is well known that comparators typically incorporate an open-collector or open-drain type output, wherein the transistor constituting the comparator output can sink current, but cannot source current. Accordingly, pull-up resistors R20 to R23 are used to drive the output voltage of the comparator to a high state whenever the voltage at the comparator non-inverting input is greater than that at the inverting input. Accordingly, the pull-up resistors R20 to R23 are used to drive the comparator outputs to a high logic state, and provide the gate current to the MOSFET switches S1 to S4 for biasing them ON.

Regarding the threshold voltages VT1 to VT4, and the corresponding transition voltages Vdc1 to Vdc4, their values are determined using the same procedure used to derive threshold voltages VT1 to VT3, and transition voltages Vdc1 to Vdc3, in the exemplary embodiment of FIGS. 4F and 4G. Their values are given by:

$$VT1 = \left(\frac{R1}{R1+R2+R3+R4}\right)Vref$$

$$VT2 = \left(\frac{R1+R2}{R1+R2+R3+R4}\right)Vref$$

$$VT3 = \left(\frac{R1+R2+R3}{R1+R2+R3+R4}\right)Vref$$

$$VT4 = Vref$$

and the corresponding transition voltages:

$$Vdc1 = \left(1+\frac{R9}{R8}\right)VT1 = \left(1+\frac{R9}{R8}\right)\left(\frac{R1}{R1+R2+R3+R4}\right)Vref$$

$$Vdc2 = \left(1+\frac{R9}{R8}\right)VT2 = \left(1+\frac{R9}{R8}\right)\left(\frac{R1+R2}{R1+R2+R3+R4}\right)Vref$$

$$Vdc3 = \left(1+\frac{R9}{R8}\right)VT3 = \left(1+\frac{R9}{R8}\right)\left(\frac{R1+R2+R3}{R1+R2+R3+R4}\right)Vref$$

$$Vdc4 = \left(1+\frac{R9}{R8}\right)VT4 = \left(1+\frac{R9}{R8}\right)Vref$$

The threshold voltages VT1 to VT4, and corresponding transition voltages Vdc1 to Vdc4, are chosen to maintain sufficient positive operating voltage across series pass stage 404, while optimizing the desired performance measures of the system, including efficiency, power factor, output power, and flicker.

Figure 4I:
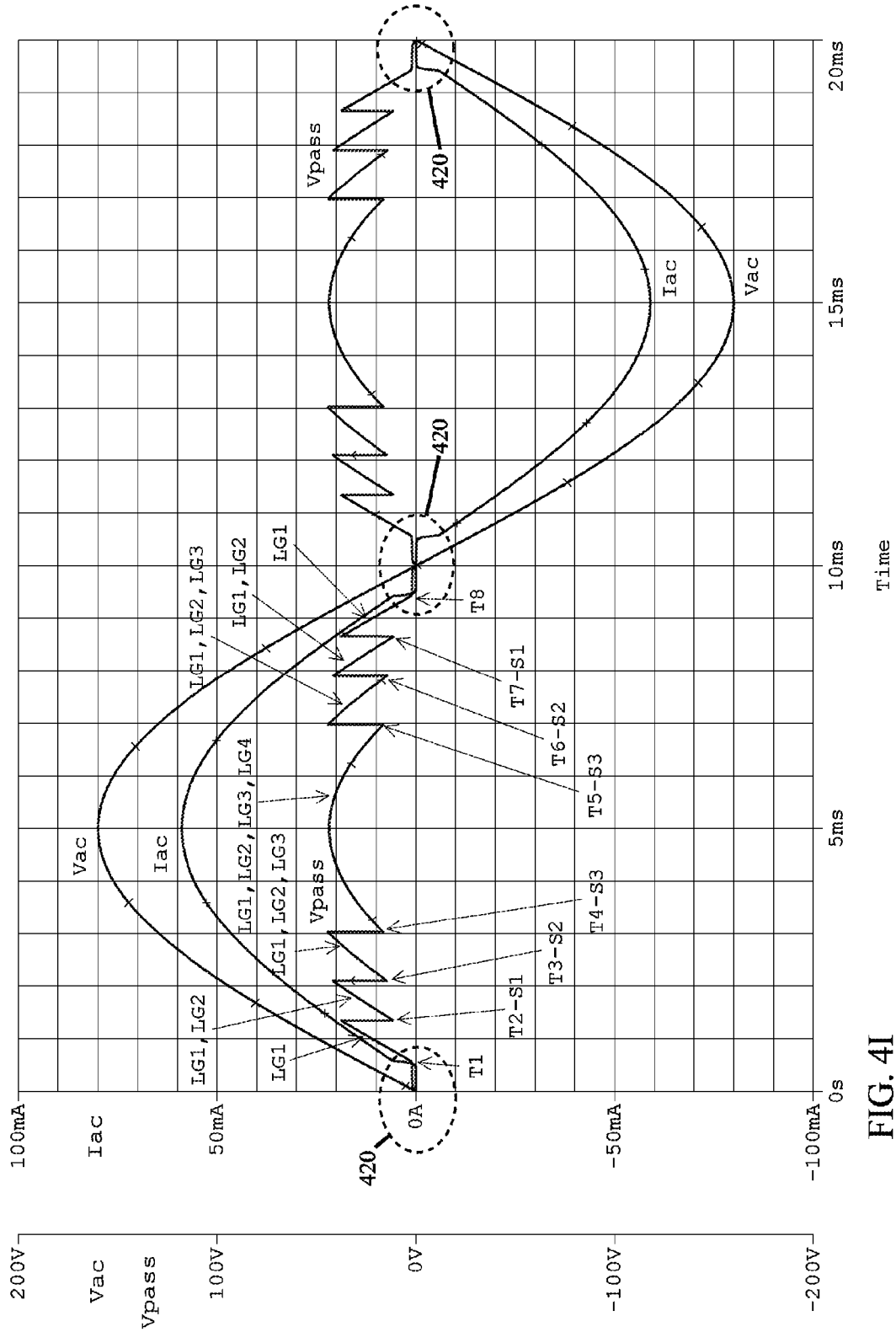
FIG. 4I is a non-limiting exemplary graphical illustration of voltage and current waveforms of the regulator circuit shown in FIG. 4H in accordance with the present invention.

FIG. 4I is an exemplary graphical illustration of the operational electrical properties or characteristics of the regulator circuit 400 of FIG. 4H in accordance with the present invention. The graphs of FIG. 4I show the AC input voltage Vac(t), AC input current Iac(t), and the voltage across the series pass stage 404, Vpass(t). As illustrated, one electrical property or characteristic of the regulator circuit of FIG. 4H is that the series pass stage 404 provides a substantially continuous proportionality between the AC input voltage Vac(t) and the AC input current Iac(t), over the majority of the full line cycle period. The exception to the proportionality between the Vac(t) and Iac(t) is near the zero-crossings 420 where there is insufficient voltage Vac(t) to generate sufficient current Iac(t) to activate any load group 106. For example, at the very beginning of the AC line cycle the voltage Vac(t) in the indicated region 422, even though the AC input voltage Vac(t) is greater than zero between times T0 and T1, that voltage does not generate sufficient current Iac(t) to activate or turn ON any load group 106 and hence, no current Iac(t) flows through any of the load groups 106 and therefore, Iac(t)≅0 even though Vac(t)>0.

For the exemplary instance of FIG. 4H and with regard to the graphs of FIG. 4I, and in a manner similar to that discussed previously in relation to the FIGS. 4A to 4G, at time t=0, all switches S1 to S4 are closed. As illustrated, at time T1 the switch S1 continues to be closed, and there is sufficient AC input voltage Vac(t) to start to turn ON the load group 106 LG1 (as the voltage Vac(t) ramps up). Between times T1 and T2, load group 106 LG1 is powered ON and the AC input voltage Vac(t) and AC input current Iac(t) continue to ramp up until at time T2 switch S1 is opened, directing current Iac(t) to flow through load groups 106 LG1 and LG2. Between times T2 and T3 the AC input voltage Vac(t) and the AC input current Iac(t) continue to ramp up even further until at time T3 switch S2 opens (with switch S1 remaining open), directing current Iac(t) to flow through load groups 106 LG1 to LG3. Between times T3 and T4 the AC input voltage Vac(t) and the AC input current Iac(t) continue to increase until at time T4 switch S3 opens (with switches S1 and S2 remaining open), directing current Iac(t) to flow through load groups 106 LG1 to LG4. Accordingly, on the interval from T4 to T5, load groups 106 LG1 to LG4 are powered ON, with the applied rectified AC voltage increasing through the peak of the AC line cycle, and then decreasing toward zero.

It should be noted that for this exemplary instance and under the stated conditions, switch S4 did not open and hence, load group LG5 did not turn ON. That is, between T4 and T5, the AC input voltage Vac(t) at its peak never exceeded the transition voltage Vdc4 required to open switch S4, and thereby direct current Iac(t) to flow through and turn ON the load group 106 LG5. Accordingly, the regulator circuit 400 of FIG. 4H is able to work with a wide AC input voltage range, where if the peak AC voltage is less than one or more of the transition voltages Vdc(N), fewer load groups 106 will be activated, and if the AC voltage is sufficient to turn ON all load groups 106, then all load groups 106 will be activated. This provides the flexibility of powering the system with a wide range of voltages. Therefore, it is no longer necessary for the load 104 to be designed to work within a very specific and narrow range of AC line voltage.

As stated above, one of the functions of the series pass stage 404 is to establish a controlled relationship between voltage and current of a non-linear load such as an LED so that when the voltage increases, the current through the non-linear load (e.g., an LED) is limited, and increases incrementally rather than exponentially. It would also be appreciated by those skilled in the art that the duration of time between switch closures and openings (e.g., between T1 and T2, or T3 and T4, for example) is controlled by the various threshold values used to actuate the corresponding switches S1 to S(N), a non-limiting example of which is the use of the reference voltage Vref, and resistors R1 to R4 and R8 and R9 used to generate the values for the threshold voltages VT1 to VT4, and corresponding transition voltages Vdc1 to Vdc4.

The instantaneous power dissipated in the series pass stage 404 is substantially equal to the voltage across the series pass stage 404, Vpass, multiplied by the current through the series pass stage, Iout, neglecting any additional losses owed to the reference current and biasing, etc. It is desired to have the power dissipated in the series pass stage 404 to be minimal in order to maximize the system efficiency. As stated above, the voltage Vpass (the voltage across series pass stage 404), depends on the rectified AC input voltage Vdc(t), and load voltage Vload according to: Vpass=Vdc(t)−Vload. It is the non-linear nature of the loads (the LEDs in this example) and the amount of current delivered to those loads that result in the voltage across the series pass stage 404, Vpass. T0 minimize power dissipation, it is desirable to maintain the voltage across the series pass stage 404 to a minimum, as close to zero volts as possible. Accordingly, in the present example, the greatest dissipation or power loss occurs in the region 424, since that region exhibits the largest values for Vpass and Iout. The lower the voltage Vpass in the region 424 (the closer to zero the better), the lower the power dissipated, and the higher the efficiency. Therefore, in implementing the regulator circuit 400 of FIG. 4H, as illustrated in FIG. 4I, the voltage across the series pass stage 404 VPASS is minimized while providing the current required by the loads. In addition, owing to the operation of series pass stage 404 and the timely switching-in and switching-out of loads commensurate with AC input voltage Vac(t), a near-unity power factor is achieved (because the AC input current Iac(t) is being controlled proportional to the AC input voltage Vac(t)), while simultaneously minimizing or reducing the voltage Vpass across the series pass stage 404, thereby reducing power dissipation and increasing efficiency.

Figure 4J:
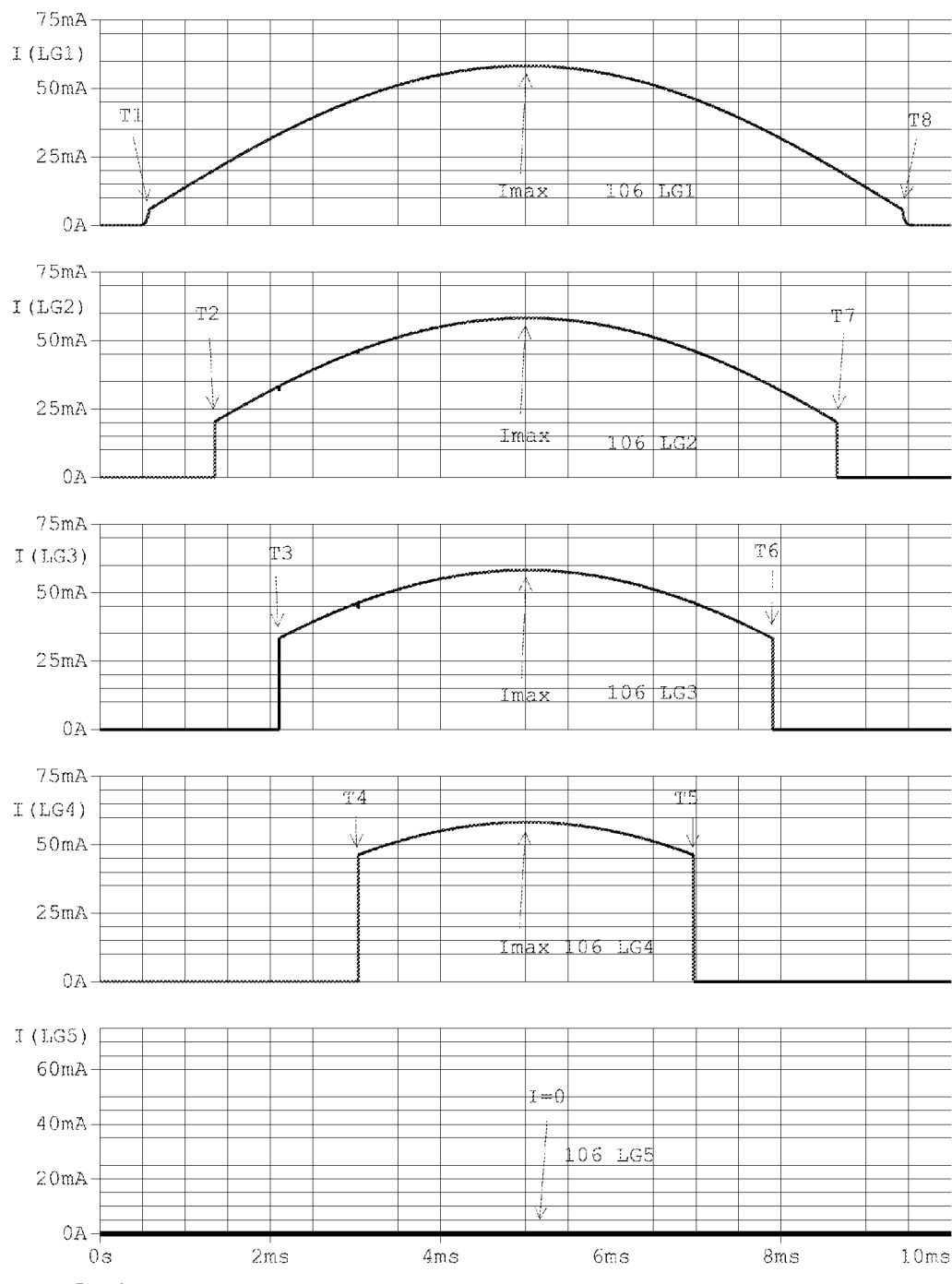
FIG. 4J is a non-limiting exemplary graphical illustration that further details the current waveforms in each of the load groups of the regulator circuit shown in FIG. 4H in accordance with the present invention.

FIG. 4J is an exemplary illustration of the current through each of the load groups 106 LG1 to LG5, as a function of time, for the circuit illustrated in FIG. 4H, over a complete half-cycle of the AC input voltage Vac(t). As illustrated, current flows through load group 106 LG1 throughout most of the voltage line cycle, with the subsequent load groups 106 LG2 to LG4 having respectively shorter and shorter conduction times (or angles). As described above in relation to the exemplary circuit topography of FIG. 4H, the load group 106 LG5 never received any current because of insufficient AC voltage Vac(t) and hence, it remained OFF over the entire half-cycle of the AC input voltage with no current flowing through it (as illustrated in FIG. 4J). Further, as illustrated in FIG. 4J, all of the conducting load groups 106 LG1 to LG4 have the same maximum current passing through them because the load groups 106 LG1 to LG4 (as illustrated in FIG. 4H) are coupled in series. However, they commence and end conduction at different times and conduct for different durations, which are a function of the contemporaneous available AC input voltage, and chosen design parameters.

It should be noted that well-known filtering mechanisms may be used with the regulator circuit 400 to reduce or eliminate any potentially existing voltage or current spikes (if any) that may be caused as a result of the fast rate of change of the switching states of the switches S1 to S(N) from an ON-state to an OFF-state and vice-versa. That is, in general, it is well-known that the fast transition rate in the state of the switches S1 to S(N) (the rate at which the switches transition from an OFF-state to an ON-state and vice-versa) may potentially cause spikes in the AC input voltage Vac(t) or AC input current Iac(t), and hence, well-known solutions exist to eliminate those spikes (if any). A non-limiting example of a method for eliminating spikes (if any) is simply to slow down the rate of transition or the rate at which a switch changes state or transitions from an ON-state to OFF-state and vice-versa.

The rate of transition (or the time it would take to turn ON or turn OFF a switch) may be slowed (i.e., the transition time or duration increased) by the addition of a well-known filtering mechanism comprised of resistor and capacitor combination (an RC filter). For example, it is well known that MOSFET switches have an intrinsic capacitance in their Gate-to-Source and Gate-to-Drain regions, which can be combined with the same pull-up resistors R20 to R23 (with increased resistor or impedance values) to slow the turn ON rate of the switches. Accordingly, the combination of the higher resistor values of the pull-up resistors, and the intrinsic capacitance of the MOSFET switches, constitutes a filtering mechanism that slows the transitional state change for the MOSFET switches from an OFF state to an ON state, thereby eliminating spikes (if any) for that particular transition (OFF to ON). That is, increasing the value of pull-up resistors R20 to R23 acts to increase the time for the switches to turn ON, with the slower state transition eliminating spikes (if any) for the OFF to ON phase. In order to slow down the rate of transition for the switches from ON to OFF states, additional resistors may be used, the resistors coupled between the Gates of the MOSFET switches and the junction connection point of the pull-up resistors and the comparator outputs. This additional resistor in conjunction with the intrinsic capacitance of the MOSFET switches and the larger value of the pull-up resistor constitutes a filter mechanism that is capable of controlling the rate at which the switches transition from both OFF to ON, and ON to OFF.

Figure 5A:
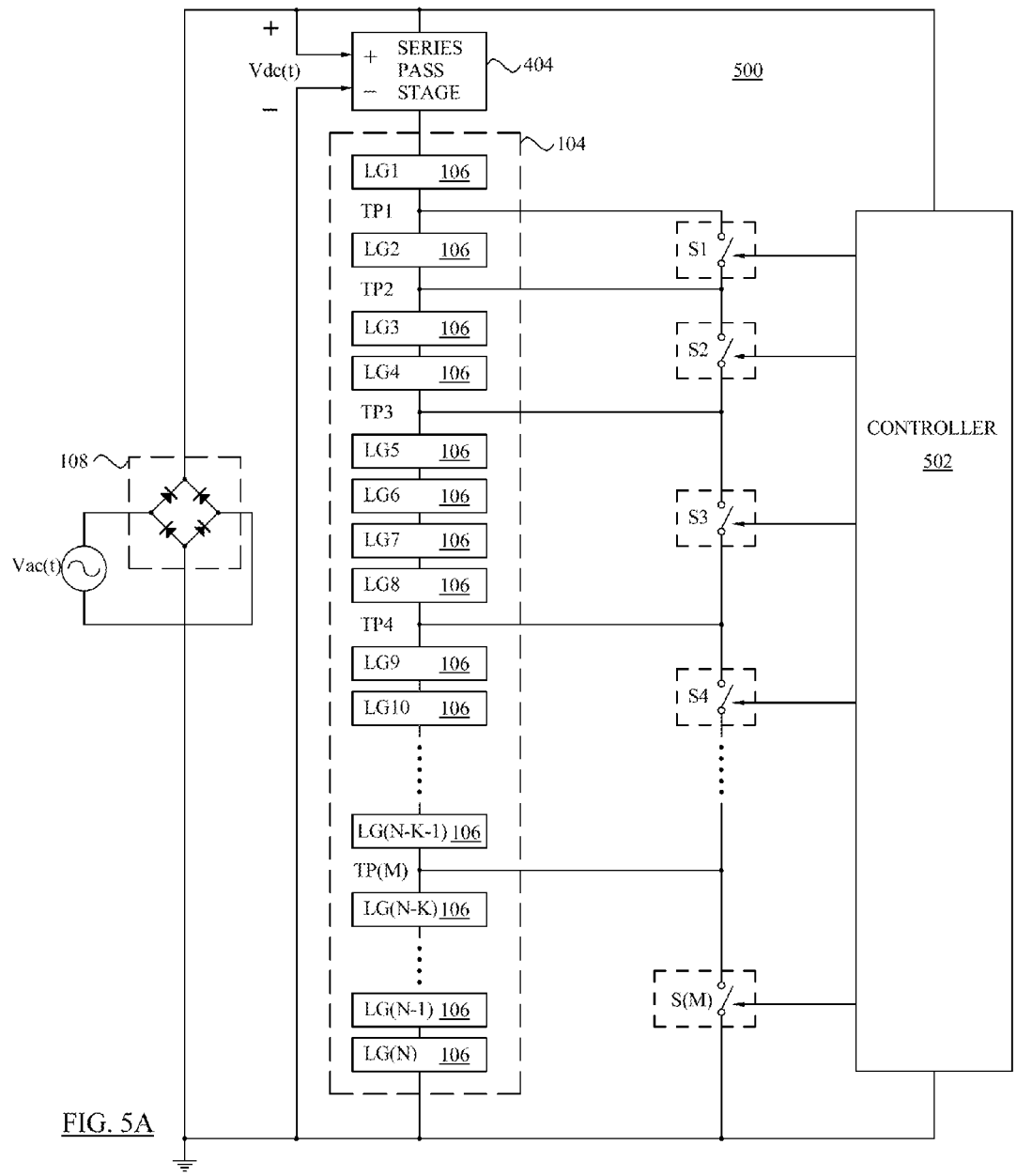
FIG. 5A is a non-limiting exemplary generalized illustration of a regulator circuit using an alternate grouping topography in accordance with the present invention.

As evident from the disclosure of the present invention, there are a large number of different types of control and switching schemes (with a large number of different combinations and permutations) that may be used to divide the load 104 in a variety of different ways and levels of granulations into smaller load group constituents 106. FIG. 5A is a non-limiting, exemplary illustration of another embodiment of a regulator circuit in accordance with the present invention, with a different control and switching scheme for load division. The regulator circuit 500 of FIG. 5A includes similar corresponding or equivalent components, interconnections, functions, and or cooperative relationships as the regulator circuits shown in FIG. 4A to 4J, and described above. Therefore, for the sake of brevity, clarity, convenience, and to avoid duplication, the general description of FIG. 5A will not repeat every corresponding or equivalent component and or interconnections that have already been described above in relation to the regulator circuits shown in FIGS. 4A to 4J.

The regulator circuit 500 of FIG. 5A includes a controller and switching scheme that divides the load 104 into two or more load groups 106, with each load group 106 of the two or more load groups 106 comprised of at least one load element. The controller 502 directs power via the illustrated switching scheme, with switches S1 to S(M), to one or more load groups 106 based on variations in the input power source Vac(t), and operational parameters of the load 104. The regulator circuit 500 enables the maximum number of load elements to be powered ON in response to variations in the input power source Vac(t), commensurate with the power requirements of the maximum number of load elements and instantaneous magnitude of the voltage of the power source, to thereby maximize operational output of the load 104, and to optimize the desired performance measures of the system, including power factor and efficiency.

As illustrated in FIG. 5A, the circuit 500 has a first switch S1 that is exemplarily coupled at switching tap points TP1 and TP2, with switching tap point TP1 selected in between a series coupled load groups 106 LG1 and LG2, and the switching tap point TP2 selected in between a series coupled load groups 106 LG2 and LG3. A second switch S2 is coupled at switching tap points TP2 and TP3, with switching tap point TP2 selected in between a series coupled load groups 106 LG2 and LG3, and the switching tap point TP3 selected in between a series coupled load groups 106 LG4 and LG5. A third switch S3 is coupled at switching tap points TP3 and TP4, with switching tap point TP3 selected in between a series coupled load groups 106 LG4 and LG5, and the switching tap point TP4 selected in between a series coupled load groups 106 LG8 and LG9. A final switch S(M) is coupled at switching tap point TP(M) and ground GND, with switching tap point TP(M) selected in between a series coupled load groups 106 LG(N−K−1) and LG(N−K). Here, K is an integer greater than or equal to zero, where K+1 represents the number of series coupled load groups 106 in the final set of series coupled load groups, coupled between tap point TP(M) and ground GND. Hence, the load 104 is divided into N load groups 106, controlled by M switches via M tap points. N is an integer greater than or equal to two, and M is an integer greater than or equal to one.

The tapping location of the switching tap points TP1 to TP(M) may be selected at any desired position within the series coupled load groups 106, in order to group any of the load groups 106 in any manner desired commensurate with the level and manner of granulation of the load 104 needed. For example, switching tap points TP1 and TP2 could be chosen to group load groups 106 LG2 to LG4 together. In such an exemplary instance, load groups LG2, LG3, and LG4 are coupled in between the switching tap points TP1 and TP2, and would be grouped together and be activated together by the opening of switch S1, with switch S1 coupled between switching tap points TP1 and TP2. Accordingly, load 104 may be divided and isolated into N load groups using one or more switches, where N is an integer greater than or equal to two. However, with the circuit topography of the regulator circuit 500, the load 104 may actually be divided and isolated into $2^M$ load group constituents 106, using only M switches, where M is an integer equal to or greater than or equal to one. In other words, the loads are divided such that they may be activated in a binary scheme (described below).

An added advantage of this approach is that the voltage of the accompanying load groups limits the voltage stress on the switches. That is, the voltages across the adjacent load groups effectively clamp the switch voltages when the switches are in the OFF state. For example, in the non-limiting, exemplary schematic shown in FIG. 5A, the voltage stress on switch S1 is limited by the voltage of load group 106 LG2. Similarly, the voltage stress on switch S2 is limited by the voltage of load groups 106 LG3 and LG4, and so on. This allows the use of low voltage switches (e.g., transistors), even though the voltage across the entire load 104 may be much higher.

As further evidence of the large number and varying types of switching schemes (and combinations and permutations of each) that may be used to divide the load 104 in different manners and levels of granulation into smaller load group constituents 106, below are described two of many, non-limiting, non-exhaustive exemplary methods of switching operation of the regulator circuit 500 of FIG. 5A, with each switching scheme operation dividing the load 104 in a different manner and different level of granulation into smaller load group constituents 106, in accordance with the present invention. The first method of operation (described below) uses a controller that successively (or in sequence) closes the switches, and opens them in reverse. The second method of operation (also described below) uses a controller that opens and closes switches in a binary "counter" switching scheme, to switch-in and switch-out load groups in a binary sequence, commensurate with available power.

Referring to FIG. 5A for the overall systems view operation of the regulator circuit 500 in accordance with the first method of operation where the switches are successively (or in sequence) opened and then closed in reverse, consider the initial commencement of the AC voltage line cycle, when the applied AC voltage Vac(t) passes through zero and is increasing. Initially, at time t=0, all switches S1 to S(M) are closed, which, in essence, applies a short-circuit to load groups 106 LG2 to LG(N). As the input voltage ramps up and increases from zero volts, the switches are successively opened commensurate with available voltage and load requirements. Therefore, because switches S1 to S(M) are closed, current flows initially through load group 106 LG1, through closed switches S1 to S(M), and then to ground GND (return) to bias ON load group 106 LG1.

It should be noted that no current flows through load groups 106 LG2 to LG(N), because the current flowing through load group 106 LG1 takes the least path of resistance, with switches S1 to S(M) being essentially a short circuit. In other words, the closed switch S1 shorts out the parallel-coupled load group 106 LG2. This is the same for the closed switch S2, which shorts out load groups 106 LG3 and LG4, and closed switch S3, which shorts out the load groups 106 LG5 to LG8, and closed switches S4 to S(M), which short out load groups LG(9) to LG(N). Therefore, with the exemplary embodiment of FIG. 5A and in accordance with the present invention, it is no longer required to have a minimum certain level of AC input voltage prior to biasing ON a single larger load 104, but the larger load 104 may be divided into smaller load groups 106, with each smaller load group 106 "switched in" in a desired manner (in this non-limiting example, switching is done successively), and also commensurate with the sufficient available instantaneous voltage.

To continue with the first method of operation where the switches are actuated successively in sequence, as the AC input voltage Vac(t) continues to ramp up and increase, the controller 502 determines that there is sufficient voltage available to activate additional load groups 106, and opens switch S1. Opening switch S1 creates an open-circuit condition in the path of switch S1, allowing current to flow through load group LG1 and additional load group LG2, rather than through switch S1. That is, once the controller 502 determines that there is sufficient AC input voltage Vac(t) to power two load groups 106, the controller 502 opens switch S1, with switches S2 to S(M) already closed. With switch S1 open, the current is directed to flow through load group 106 LG1, switching tap point TP1, load group 106 LG2, switching tap point TP2, and then through switches S2 to S(M) and to ground GND, bypassing the remaining load groups 106 LG3 to LG(N). In other words, switches S2 to S(M) now short out the remaining load groups LG3 to LG(N). Again, it should be noted that no current flows through load groups 106 LG3 to LG(N), because the current flowing through load group 106 LG2 takes the path of least resistance, with switches S2 to S(M) being essentially a short circuit.

As the AC input voltage Vac(t) continues to ramp up and increase, the controller 502 determines that there is sufficient voltage to activate additional load groups 106, and opens switch S2, with S1 remaining open. Opening switch S2 creates an open-circuit condition in the path of the switch S2, directing current to flow through the additional set of load groups LG3 and LG4, rather than the now open switch S2. That is, once the controller 502 determines that there is sufficient AC input voltage to power the four load groups 106 LG1 to LG4, the controller 502 opens switch S2 (with switch S1 already open, and other switches S3 to S(M) already closed). With switches S1 and S2 open, the current is now directed to flow through load groups 106 LG1 to LG4, through tap point TP3, through closed switches S3 to S(M), and then to ground GND. In other words, closed switches S3 to S(M) short out their respective coupled load groups 106 LG5 to LG(N). Again, it should be noted that no current flows through load groups 106 LG5 to LG(N) because the current flowing through load group 106 LG4 takes the least path of resistance, with switches S3 to S(M) being essentially a short circuit.

As the applied AC input voltage Vac(t) continues to ramp up and increase, the controller 502 determines that there is sufficient voltage activate even further additional loads, and opens the next successive switch S3 (with switches S1 and S2 already open, and switches S4 to S(M) already closed). Opening switch S3 creates an open-circuit condition in the path of switch S3, directing current to flow through the additional set of load groups 106 LG5 to LG8. That is, once the controller 502 determines that there is sufficient voltage in the AC line cycle to power eight load groups LG1 to LG8, the controller 502 opens the switch S3 (with switches S1 to S2 already open, and switches S4 to S(M) already closed). With switches S1, S2, and S3 open, current is directed to flow through load groups 106 LG1 to LG8, through tap point TP4, through switches S4 to S(M), and then to ground GND. With switches S4 to S(M) remaining closed, load groups 106 LG9 to LG(N) are effectively shorted out by the closed switches S4 to S(M).

At the peak of the AC line cycle, most (if not all) of the load elements of the regulator circuit 500 will be activated. This means that there may be instances (depending on load requirements and availability of power) where one or more load elements are not activated or turned ON. For example, in the exemplary instance illustrated in FIG. 5A, load groups LG9 to LG(N) may not turn ON, even over the entire AC line cycle. That is, if the controller 502 determines that the magnitude of the input voltage in the AC line cycle is not sufficient to add further loads, the controller 502 will maintain the remaining switches (in this case switches S4 to S(M)) closed, thereby effectively isolating load groups LG9 to LG(N) from being activated, by diverting current through switches S4 to S(M).

To continue with the present example, as the AC input voltage Vac(t) passes through and begins to ramp down from the peak AC voltage, the switching sequence reverses. That is, once the controller 502 determines that there is insufficient AC input voltage to power the eight load groups 106 LG1 to LG8, the controller 502 closes switch S3 (with switches S1 and S2 already open, and switches S4 to S(M) already closed). With switch S3 closed, the current is now directed to flow through load groups 106 LG1 to LG4, through tap point TP3, through switches S3 to S(M), and then to ground GND. In other words, closed switches S3 to S(M) short out their respective coupled load groups 106 LG5 to LG(N). Again, it should be noted that no current passes through load groups 106 LG5 to LG(N) because the current flowing through load group 106 LG4 takes the least path of resistance, with switches S3 to S(M) being essentially a short circuit. In other words, switches S3 to S(M) short out the remaining coupled load groups 106 LG5 to LG(N), taking them off-line, or "switching-out" load groups 106 LG5 to LG(N), commensurate with the instantaneous available voltage.

As the AC input voltage Vac(t) continues to ramp down and decrease, switch S2 is closed by the controller 502. That is, once the controller 502 determines that there is insufficient AC input voltage to power the four load groups 106 LG1 to LG4, the controller 502 closes switch S2 (with switch S1 already open, and switches S3 to S(M) already closed). With switch S2 closed, the current is now directed to flow through load groups 106 LG1 to LG2, through tap point TP2, through switches S2 to S(M), and then to ground GND. In other words, closed switches S2 to S(M) short out their respective coupled load groups 106 LG3 to LG(N). It should be noted that no current flows through load groups 106 LG3 to LG(N) because the current flowing through load group 106 LG2 takes the least path of resistance, with switches S2 to S(M) being essentially a short circuit. In other words, switches S2 to S(M) short out the remaining coupled load groups 106 LG3 to LG(N), taking them off-line, or "switching-out" load groups 106 LG3 to LG(N), commensurate with the instantaneous available voltage.

As the AC input voltage Vac(t) continues to ramp down and decrease even further, switch S1 is closed by the controller 502 (with switches S2 to S(M) remaining closed). With switch S1 closed, current is directed to flow through load group 106 LG1 only, through tap point TP1, and then to ground GND via closed switches S1 to S(M). Therefore, the load 104, comprised of the load groups 106 collectively, when connected in series have a collective voltage, but parts of the load 104 can be energized at different times during the AC cycle. The controller 502 is used to switch the load groups 106 in and out of the circuit according to the availability of voltage from the power source. Accordingly, a rectified AC power source voltage cycles from zero to the peak AC voltage and back to zero, and during that time the load groups 106 are switched in and out, in an appropriate manner to minimize the power dissipated in the series pass stage 404, and or to optimize some other performance objectives such as power factor, efficiency, and power output.

As stated above, a large number of different types of controllers and switching schemes (and combinations and permutations of each) may be used to divide the load 104 in different manners and levels of granulation into smaller load group constituents 106. The following describes the overall systems view of operation of the regulator circuit 500 of FIG. 5A in accordance with a second method of operation. In this second method of operation of the regulator circuit 500 of FIG. 5A, the system functions as a binary counter, switching in and out load groups 106 using a binary counting sequence, wherein $2^M$ different combinations of load groups 106 are activated using only M switches, where M is an integer greater than or equal to one.

Figure 5B:
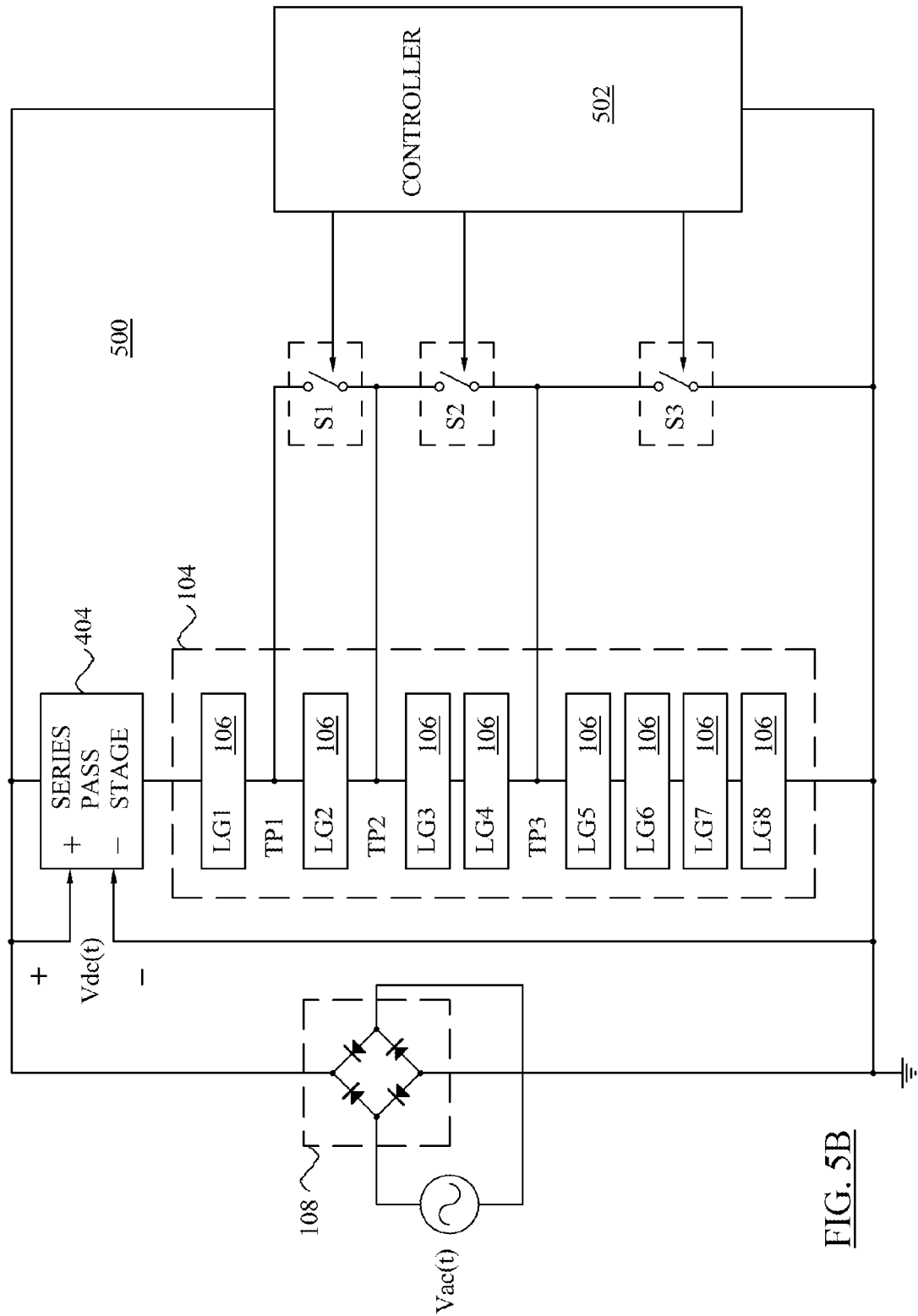
FIG. 5B is a non-limiting exemplary illustration of a regulator circuit using an alternate grouping topography in accordance with the present invention.

For this second method of operation, consider the exemplary embodiment illustrated in FIG. 5B. The load 104 is comprised of eight load groups LG1 to LG8, controlled by three switches S1 to S3. Let t=0 denote the instant at which the AC input voltage Vac(t) passes through zero and is increasing. At t=0, all switches S1 to S(M) are closed (as was the case with the first method of operation described previously), which means that only load group 106 LG1 will be activated as the AC input voltage Vac(t) increases and reaches the minimum level of voltage required to bias ON the first load group 106 LG1. As the input voltage ramps up and increases from zero volts, the switches will be opened and closed using a binary counting scheme, commensurate with available voltage and load requirements. Therefore, as the input voltage reaches the minimum level of voltage required to bias ON the first load group LG1, switches S1 to S3 are closed, and all current flows through one load group 106 LG1, the switching tap point TP1, through closed switches S1 to S3, and then to ground GND (return), thereby biasing ON one load group 106 LG1. It should be noted that no current flows through load groups 106 LG2 to LG8 because the current flowing through load group 106 LG1 takes the least path of resistance, with switches S1 to S3 being essentially a short circuit.

As the AC input voltage Vac(t) continues to ramp up, the controller 502 determines that there is sufficient voltage to power two load groups, and opens switch S1 to activate one additional load group 106 LG2. At this point, two load groups LG1 and LG2 are biased ON.

As the AC input voltage Vac(t) further ramps up, the controller 502 determines that there is sufficient voltage to power three load groups, and closes switch S1 to switch out load group 106 LG2, and opens switch S2. Closing switch S1 and opening switch S2 activates the load groups 106 LG1, LG3, and LG4, for a total of three load groups active. This is similar to a binary counter, where at first only one load group 106 LG1 is active, then two load groups 106 LG1, LG2, and then three load groups 106 LG1, LG3, and LG4, as controlled by the states of the switches.

As the AC input voltage Vac(t) ramps up even further, switch S1 is opened, with switch S2 already open, allowing a total of four load groups 106 LG1 to LG4 to be active. As the line cycle ramps up further, switches S1 and S2 are closed, and switch S3 is opened, enabling five load groups 106 LG1, and LG5 to LG8 to be active. With further increase in the AC input voltage Vac(t), switch S1 is opened, with switch S2 remaining closed and switch S3 remaining open, enabling a total of six load groups 106 LG1, LG2, and LG5 to LG8 to be active. As the AC input voltage Vac(t) increases further, switch S1 is closed and switch S2 is opened, with switch S3 remaining open to enable activation of seven load groups 106 LG1, and LG3 to LG8. A further increase in the AC input voltage enables opening of switches S1, S2, and S3, to allow activation of a total of eight load groups 106 LG1 to LG8, and hence, with M=3 switches, the system is capable of dividing the load 104 into $2^M=8$ combinations of load groups 106. FIG. 5C is a table illustrating the switching scheme using this binary "counter" method to activate loads, assuming the use of three switches (M=3) for activation of a total of $2^M$ or 8 different combinations of load groups 106. Accordingly, with this second operational scheme described, the granularity of the division of the load 104 is maximized with respect to the number of switches, where $2^M$ combinations of load groups 106 are controlled with only M switches. It should be noted that in the next example of FIG. 5D, there are exactly 4 load groups 106 controlled by three switches using this binary scheme, and not 8 load groups 106. Hence, it is not that $2^M$ load groups 106 are controllable using M switches, but rather that $2^M$ combinations of load groups 106 are achievable using M switches in a binary switching scheme as described.

Figure 5D:
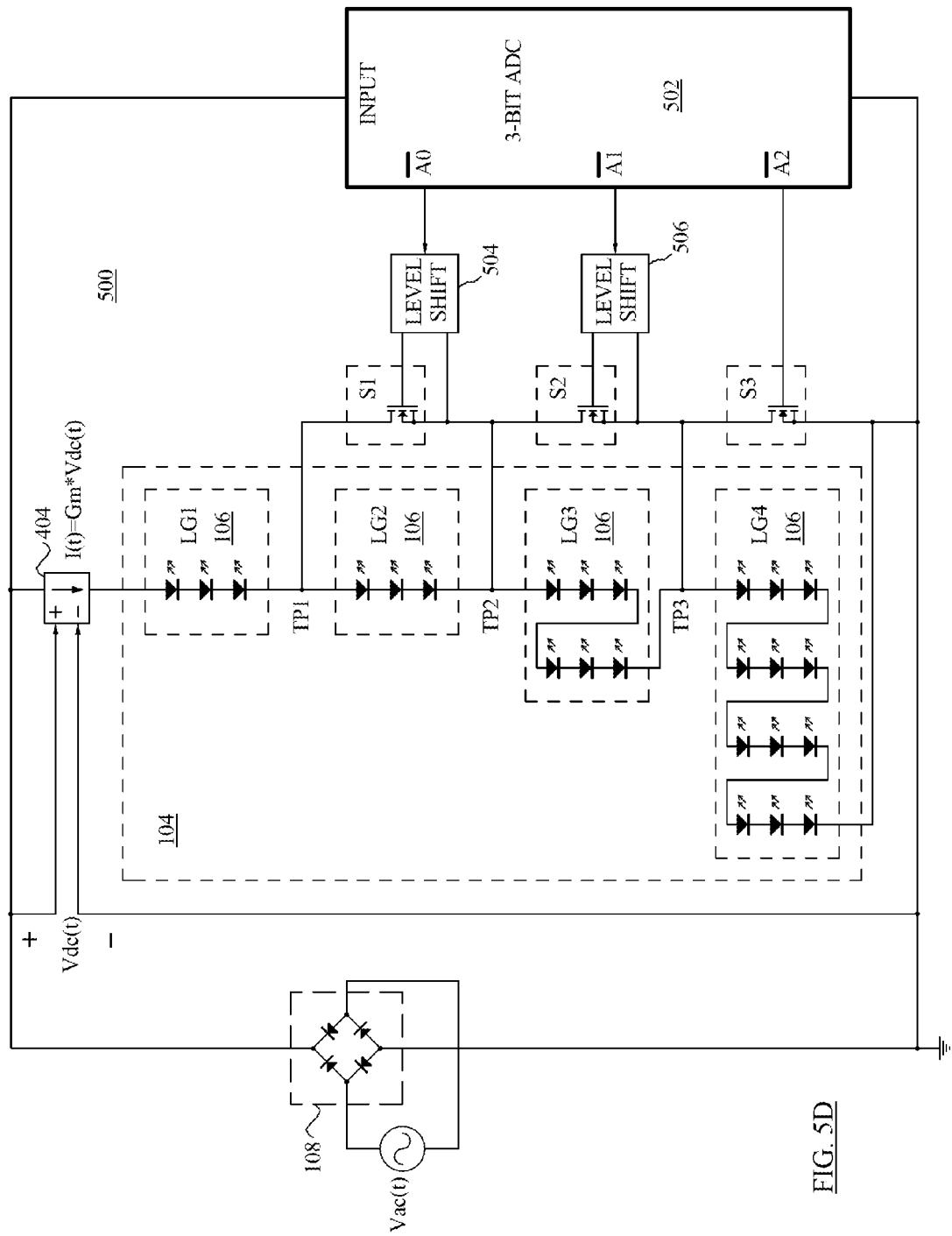
FIG. 5D is a non-limiting exemplary illustration of a regulator circuit illustrating an Analog to Digital Converter (ADC) based controller in accordance with the present invention.

FIG. 5D is a non-limiting, exemplary illustration of the regulator circuit 500 of FIGS. 5A and 5B that further details a controller in accordance with the present invention. In the example illustrated in FIG. 5D, the load 104 is comprised of a string of twenty-four LEDs. The load 104 is divided into four load groups 106 LG1 to LG4. In this non-limiting exemplary instance, the load groups are of varying lengths; load groups 106 LG1 and LG2 include three LEDs, load group 106 LG3 includes six LEDs, and load group LG4 includes 12 LEDs. Note that the number of load groups 106 and the number of load elements (LEDs) in each load group 106 may vary for different applications. Accordingly, the numbers given here are chosen to provide a simple example, and should not be considered limiting. Switches S1, S2, and S3 are controlled to apply a short circuit to load groups 106 LG2, LG3, and LG4, respectively. By controlling these switches, it is possible to achieve effective loads of length 3, 6, 9, 12, 15, 18, 21, and 24 LEDs. Assuming that each LED in the string exhibits a forward voltage of approximately 4 volts when forward biased, the effective load can exhibit voltage levels ranging from 12 volts to 96 volts, in 12 volt increments. The resulting effective load characteristics are summarized in the table given in FIG. 5E.

In general, for a system of this type with M switches, there are $2^M$ combinations, and thus $2^M$ voltage levels are achievable by the effective load. The advantage here is that (for the non-limiting exemplary case of FIG. 5D) eight effective load voltages are achievable using only three switches. By increasing the number of voltage levels achievable using controllable combinations of load elements, the resolution or granularity of the system is increased, and the voltage appearing across the series pass stage 404 may be reduced accordingly. Reducing the voltage appearing across the series pass stage 404 acts to reduce the power dissipated in that stage, thereby increasing system efficiency.

FIG. 5D discloses an exemplary embodiment employing multiple LEDs as load elements and N-channel MOSFETs as controllable switches. It is assumed in this example that the controller 502 is referenced to ground, although other references may be chosen. Because the source terminal of MOSFET switch S3 is also referenced to ground, switch S3 may be driven directly by the controller. The source terminals of MOSFET switches S1 and S2 are not referenced to ground, and these switches therefore require level shift circuits 504 and 506 to translate the control signals originating from the controller, to gate drive signals relative to the source terminal of the respective MOSFETs. Level shift circuits 504 and 506, their use with MOSFET switches, and overall operations in the manner illustrated are very well known.

FIG. 5D also discloses a controller that can be used to control the switches. The load characteristics under the control of these switches are provided in the table of FIG. 5E. From the table of FIG. 5E, it is clear that the effective load voltage is controlled by a binary output from the controller 502. That is, to achieve the load group combinations given in FIG. 5E, the output of the controller driving the switches is a binary word of length 3, the least significant bit (LSB) driving switch S1, and the most significant bit (MSB) driving switch S3.

High efficiency with respect to the regulator circuit 500 is realized by minimizing the voltage Vpass appearing across the output of the series pass stage 404. The regulator circuit 500 of FIG. 5D performs this function by sensing the input source voltage with an exemplary 3-bit flash analog-to-digital converter (ADC), and driving switches S1 to S3 with the binary output of that ADC. N-bit flash ADCs, their operation, and the detailed implementations thereof are very well known. In this particular embodiment, the switches function to short their respective load groups 106, thereby turning them OFF. For this reason, the output of the ADC should actually be inverted; i.e., the binary outputs $\overline{A0}$, $\overline{A1}$, and $\overline{A2}$ are logic level high when the analog input is zero. The ADC is used to convert the analog input level of the rectified AC input voltage, Vdc(t), to a binary digital "word" output, which then controls the switches. In other words, the ADC "assigns" a digital word to the scaled analog voltage of the rectified AC power source. By feeding the (scaled representation of the) rectified AC input voltage, Vdc(t), into the ADC, the ADC converts that analog signal to a digital "word" corresponding to the number of loads that the instantaneous AC input voltage, Vac(t), is capable of powering. If the rectified AC input voltage, Vdc(t) increases, the ADC increases its binary output corresponding to the increased voltage level, and adds additional loads by controlling the respective switches. In other words, the ADC maps the voltage level of the rectified AC input voltage, Vdc(t), to the corresponding number of loads that may be activated or powered ON.

Consider an AC input power source, its voltage increasing from zero. The AC input voltage, Vac(t), (and hence the input to the ADC), are initially zero, and binary outputs $\overline{A0}$, $\overline{A1}$, and $\overline{A2}$ are all logic level high. Switches S1, S2, and S3 are ON, shorting out load groups 106 LG2, LG3, and LG4 respectively. The effective load is therefore load group 106 LG1, a load that (in this non-limiting exemplary instance) includes 3 LEDs. As the AC input voltage increases from zero, the series pass stage 404 feeds current to load group 106 LG1 in proportion to the rectified AC input voltage Vdc(t), in order to achieve high power factor. This condition persists until there is sufficient voltage to power 6 LEDs. The ADC is designed to sense this condition, and the ADC output, LSB $\overline{A0}$, goes low, opening switch S1. Power flow is now to load groups 106 LG1 and LG2, or 6 LEDs powered.

As the input voltage increases further, there is a time at which there is enough voltage to power 9 LEDs. The ADC senses this condition, and the ADC output simultaneously drives output $\overline{A1}$ low and $\overline{A0}$ high. Power flow is now to load groups 106 LG1 and LG3, or 9 LEDs powered. This condition persists until there is sufficient voltage to power 12 LEDs. The ADC, sensing this condition, drives output $\overline{A0}$ from high to low, maintaining $\overline{A1}$ low. Switch S1 is opened, and power flow is now to load groups 106 LG1 to LG3 or 12 LEDs powered. All this time, the series pass stage 404 is feeding current in proportion to the incoming rectified AC voltage, Vdc(t), in order to achieve high power factor.

As the input voltage increases further, there is a time at which there is sufficient voltage to power 15 LEDs. The ADC senses this condition and drives outputs $\overline{A0}$ and $\overline{A1}$ high, and simultaneously drives output $\overline{A2}$ low. This functions to close switches S1 and S2, and opens switch S3. Power flow is now to load groups 106 LG1 and LG4, powering 15 LEDs. This condition persists until there is sufficient voltage to power 18 LEDs. The ADC, sensing this condition, drives output $\overline{A0}$ from high to low, maintaining $\overline{A3}$ low. Hence, switch S1 is opened, and power flow is now to load groups 106 LG1, LG2, and LG4, or 18 LEDs powered.

As the input voltage increases further, there is a time at which there is sufficient voltage to power 21 LEDs. The ADC senses this condition and drives outputs $\overline{A0}$ high and $\overline{A1}$ low, maintaining output $\overline{A2}$ low. This functions to close switch S1 and open switch S2, maintaining switch S3 open. Power flow is now to load groups 106 LG1, LG3, and LG4, powering 21 LEDs. This condition persists until there is sufficient voltage to power the entire string of 24 LEDs. The ADC, sensing this condition, drives output $\overline{A0}$ low, maintaining outputs $\overline{A1}$ and $\overline{A2}$ low. This acts to open switch S1, and maintains switches S2 and S3 open. Power flow is now to load groups 106 LG1, LG2, LG3, and LG4, powering the entire string of 24 LEDs. This entire description proceeds in reverse as the input voltage decreases from the peak AC voltage, from powering 24 LEDs, to powering 21 LEDs, then 18 LEDs, and so on.

In this non-limiting example, it should be noted that each transition includes exactly 3 LEDs. This is a consequence of selecting load groups 106 LG1 and LG2 each to have 3 LEDs, load group 106 LG3 to have 6 LEDs, and load group 106 LG4 to have 12 LEDs. In this way, this circuit provides for effective loads of any integer number from 1 to 8, times 3 LEDs. It is important to note that this case is not limiting; that the load elements can include the same or different numbers of LEDs, and can be of any length in order to provide the properties desired in a given application.

It should further be noted that in the example of the regulator circuit 500 of FIG. 5D it was assumed that the AC input voltage Vac(t) was sufficient to power the entire load of 24 LEDs in series. This may or may not be true in various applications or conditions under which the regulator circuit is used. For example, a system can be designed that provides power to most of the load elements under normal conditions, but has headroom for extreme or transient conditions. In this way, under normal conditions, some of the load combinations will not be used. Such a system therefore possesses a wide input voltage range over which high performance could be achieved. In addition, when the circuit is used in conjunction with a conventional phase-controlled light dimmer circuit, only as many LEDs will be lit as is prescribed by the instantaneous voltage level, commensurate with that originating from the phase-controlled light dimmer output. For example, the phase-controlled light dimmer circuit, adjusted to a low setting, may prescribe a maximum voltage of only 55 volts. Referring to FIG. 5E, this voltage level is commensurate with powering only 12 LEDs. In this case, the ADC makes this determination, and the circuit delivers power to load groups 106 LG1, LG2, and LG3, when the instantaneous input voltage is 55 volts. In addition, at this instant, the current fed into the loads by the series pass stage 404 is that corresponding to 55 volts, since it provides current in proportion to the input source voltage. Thus, the power output of the LEDs is reduced, thereby providing the desired dimming function.

Figure 5F:
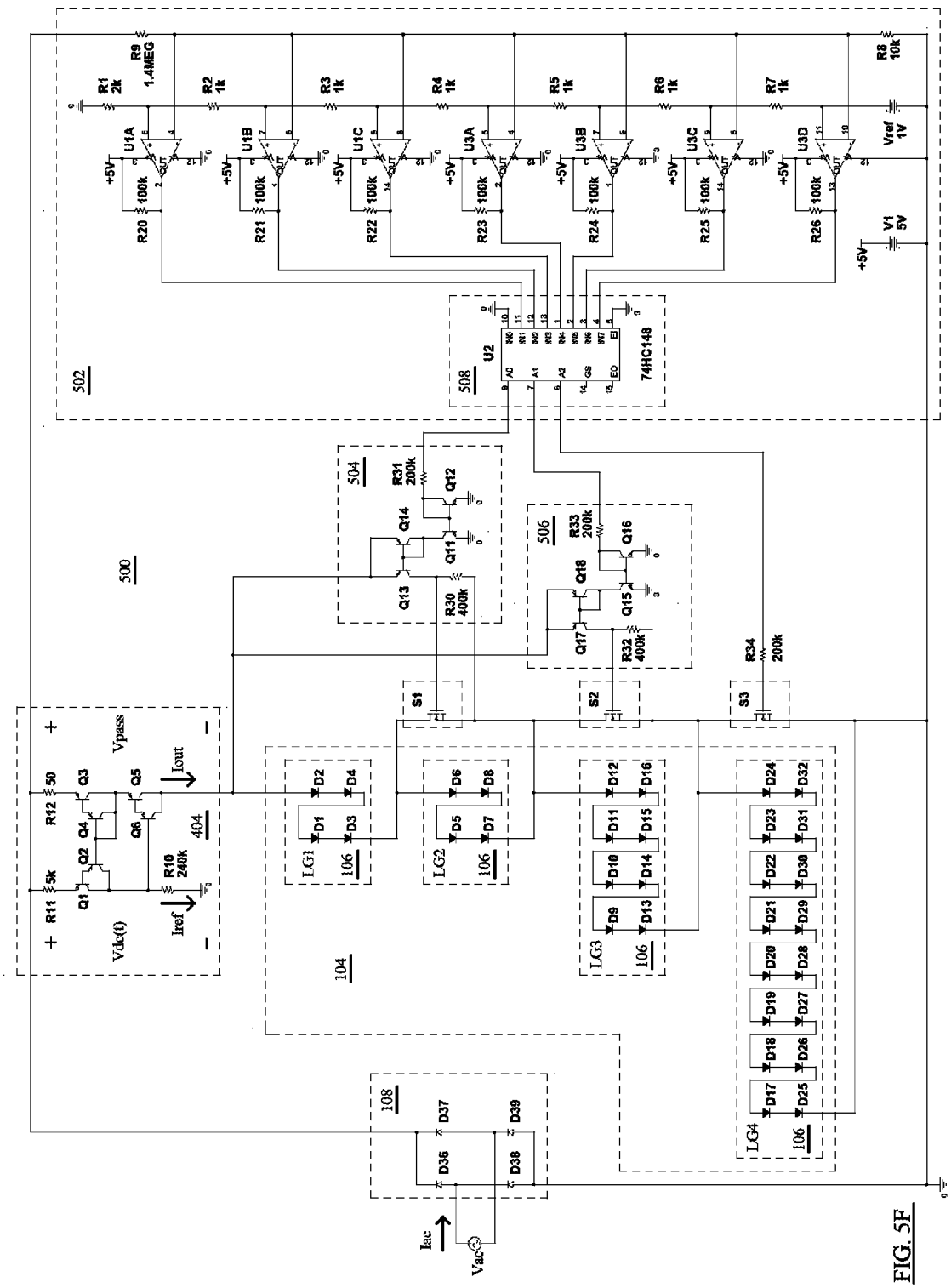
FIG. 5F is a non-limiting exemplary detailed illustration of a regulator circuit using an Analog to Digital Converter (ADC) based controller in accordance with the present invention.

FIG. 5F is another non-limiting, exemplary illustrative implementation of the detailed circuit topography of the regulator circuit 500 described in FIGS. 5A to 5E, but in this non-limiting exemplary implementation, the load 104 is comprised of a string of thirty-two LEDs that are divided into four load groups 106 LG1 to LG4. In this non-limiting exemplary instance (as with the example of FIG. 5D), the load groups are of varying lengths; load groups 106 LG1 and LG2 include four LEDs, load group 106 LG3 includes eight LEDs, and load group 106 LG4 includes sixteen LEDs. Note that the number of load groups 106 and the number of load elements (e.g., LEDs) in each load group 106 will vary in different applications. Accordingly, the numbers given here are chosen to provide a simple example, and should not be considered limiting.

In addition, FIG. 5F further details an exemplary circuit topography of the series pass stage 404 (also shown in FIGS. 4D and 4H) and of the controller 502. The overall operation of the regulator circuit 500 of FIG. 5F is similar to that described for the exemplary embodiment in FIG. 5D. As stated above in relation to the controller 502, an N-bit flash ADC and its operation are very well known, a non-limiting method of implementation of which is exemplarily illustrated in FIG. 5F. It should be noted that there are many known ways of implementing Analog-to-Digital Converters (ADCs) and therefore, the 3-bit flash ADC provided in FIG. 5F should not be limiting. As with most N-bit flash ADCs, the exemplary 3-bit flash ADC is implemented using a series of comparators, each one comparing a scaled down version of the rectified AC input voltage Vdc(t) to a unique threshold voltage (similar to the operations of comparators in FIGS. 4F and 4H). The comparator outputs connect to the inputs of a priority encoder circuit 508 (also very well-known, exemplarily shown as a generic CMOS 74HC148 8-to-3 line priority encoder), producing an inverted (or complementary) binary output $\overline{A0}$, $\overline{A1}$, and $\overline{A2}$ (as described in relation to FIG. 5D above). In the present embodiment, the switches function to short the respective load elements, thereby turning them OFF. For this reason, the outputs of the ADC are inverted; i.e., the inverted binary outputs $\overline{A0}$, $\overline{A1}$, and $\overline{A2}$ are logic level high when the analog input is zero. The present embodiment provides the inverted binary outputs by coupling the comparator threshold voltages (derived from the reference voltage VREF and resistor divider R1-R7) with the non-inverting (or positive) input terminals of the comparators, and the scaled-down rectified AC input voltage is coupled to the inverting (or negative) input terminals of the comparators, resulting in the (inverted) binary outputs $\overline{A0}$, $\overline{A1}$, and $\overline{A2}$.

The FIG. 5F also shows details of the level shifters 504 and 506 shown in FIG. 5D, which provide differential gate-to-source voltages to drive the MOSFET switches. As stated above, level shifters 504 and 506, their use, and operations are very well-known, and may be implemented in a variety of different schemes, a non-limiting example of which is shown in FIG. 5F and hence, the illustrated level shifters in FIG. 5F should not be limiting.

Figure 5G:
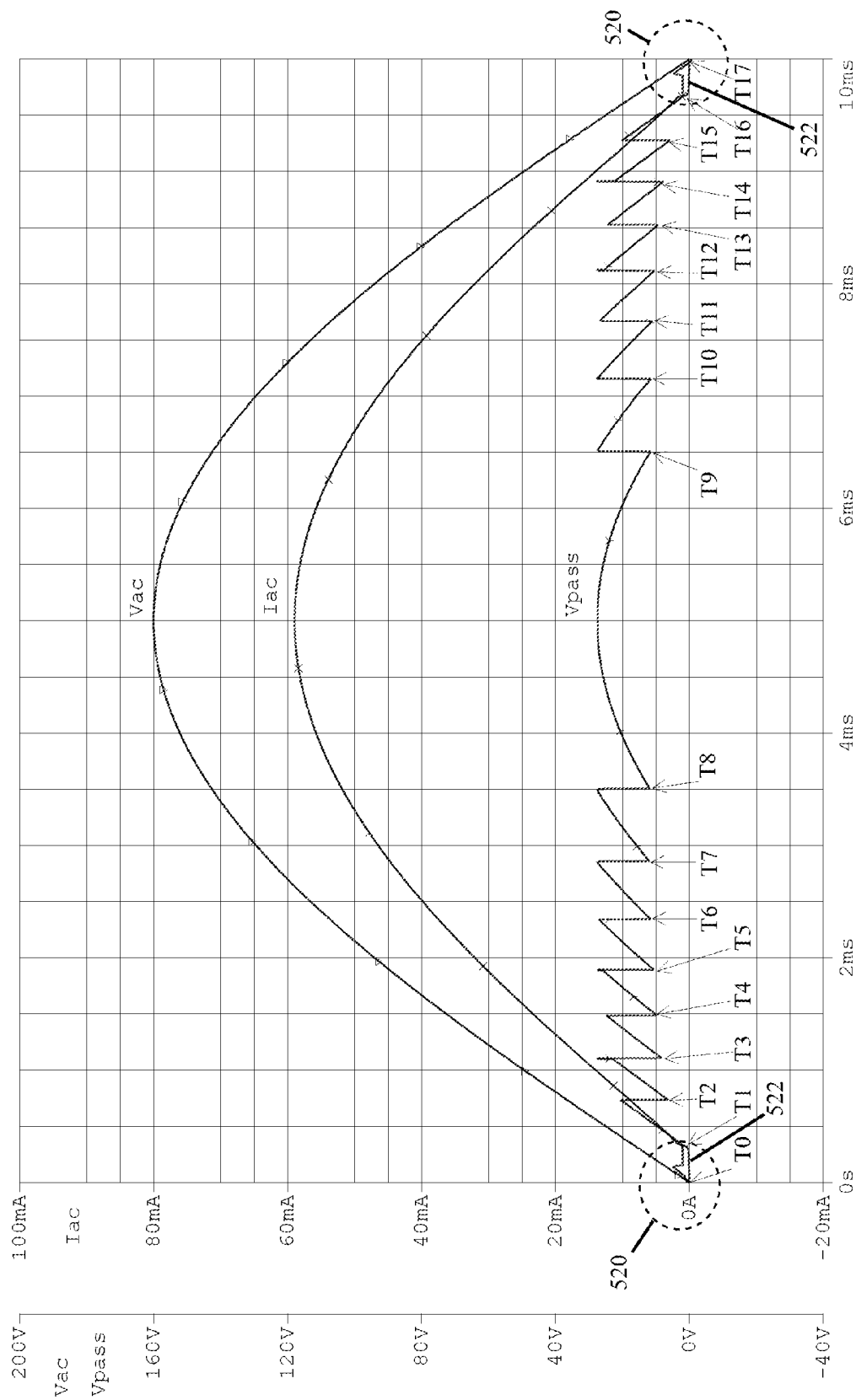
FIG. 5G is a non-limiting exemplary graphical illustration of voltage and current wave forms of the regulator circuit shown in FIG. 5F in accordance with the present invention.

FIG. 5G is an exemplary graphical illustration of the operational electrical properties or characteristics of the regulator circuit 500 of FIG. 5F in accordance with the present invention. The time intervals, switch states, and active load groups 106 in those intervals are summarized in the table of FIG. 5H. The graph of FIG. 5G shows the AC input voltage Vac(t), the AC input current Iac(t), and the voltage appearing across the series pass stage 404, Vpass(t), over a half-cycle of the AC input voltage, Vac(t). As illustrated, one electrical property or characteristic of the regulator circuit of FIG. 5F is that the series pass stage 404 provides a substantially continuous proportionality between the AC input voltage Vac(t) and the AC input current Iac(t) over the majority of the period shown. The exception to the proportionality between Vac(t) and Iac(t) is near the zero-crossings 520, when there is insufficient voltage Vac(t) to generate sufficient current Iac(t) to activate any load group 106. In other words, near the zero-crossings of the AC line cycle, even though voltage Vac(t) is greater than zero between times T0 and T1 (and similarly between times T16 and T17), that voltage does not generate sufficient current Iac(t) to activate or turn ON any load group and hence, essentially no current Iac(t) flows through any of the load groups 106. Therefore, between times T0 and T1, Iac(t) z 0 even though Vac(t)>0.

In relation to FIGS. 5A to 5H, and in view of the second method of control (binary counter method) described above, initially (at time T0), all switches S1 to S3 are closed (or ON). At time T1 there is sufficient voltage appearing across load group 106 LG1 to start to turn ON the load group 106 LG1 (as the voltage Vac(t) continues to increase). Accordingly, on the interval T0-T2, S1=ON, S2=ON, S3=ON, load group 106 LG1 is ON, and load groups 106 LG2, LG3, and LG4 are OFF.

Between times T1 and T2 the AC input voltage Vac(t) and AC input current Iac(t) ramp up and increase, until at time T2 switch S1 opens (or OFF), turning ON load group 106 LG2, with load group 106 LG1 already ON. Accordingly, on the interval T2-T3, S1=OFF, S2=ON, S3=ON, load groups 106 LG1 and LG2 are ON, and load groups 106 LG3 and LG4 are OFF.

Between times T2 and T3 the AC input voltage Vac(t) and AC input current Iac(t) continue to ramp up and increase, until at time T3 switch S1 closes (or ON), turning OFF load group 106 LG2, and switch S2 opens (or OFF), turning ON load group 106 LG3, with load group 106 LG1 already ON. Accordingly, on the interval T3-T4, S1=ON, S2=OFF, S3=ON, load groups 106 LG1 and LG3 are ON, and load groups 106 LG2 and LG4 are OFF.

Between times T3 and T4 the AC input voltage Vac(t) and AC input current Iac(t) continue to ramp up and increase, until at time T4, switch S1 opens (or OFF), turning ON load group 106 LG2, with load groups 106 LG1 and LG3 already ON. Accordingly, on the interval T4-T5, S1=OFF, S2=OFF, S3=ON, load groups 106 LG1, LG2, and LG3 are ON, and load group 106 LG4 is OFF.

Between times T4 and T5 the AC input voltage Vac(t) and AC input current Iac(t) continue to further ramp up and increase, until at time T5, switch S1 closes (or ON), shorting out the load group 106 LG2, switch S2 closes (or ON), shorting out load group 106 LG3, and switch S3 opens (or OFF), turning ON load group 106 LG4. Accordingly, on the interval T5-T6, S1=ON, S2=ON, S3=OFF, load groups 106 LG1 and LG4 are ON, and load groups 106 LG2 and LG3 are OFF.

Between times T5 and T6 the AC input voltage Vac(t) and AC input current Iac(t) continue to further ramp up and increase, until at time T6 switch S1 opens (or OFF), turning ON load group 106 LG2, with load groups 106 LG1 and LG4 remaining ON. Accordingly, on the interval T6-T7, S1=OFF, S2=ON, S3=OFF, load groups 106 LG1, LG2, and LG4 are ON, and load group 106 LG3 is OFF.

Between times T6 and T7 the AC input voltage Vac(t) and AC input current Iac(t) continue to ramp up and increase, until at time T7 switch S1 closes (or ON), shorting out the load group 106 LG2, and switch S2 opens (or OFF), turning ON load group 106 LG3, with load groups 106 LG1 and LG4 remaining ON. Accordingly, on the interval T7-T8, S1=ON, S2=OFF, S3=OFF, load groups 106 LG1, LG3 and LG4 are ON, and load group LG2 is OFF.

Between times T7 and T8 the AC input voltage Vac(t) and AC input current Iac(t) continue to ramp up and increase, until at time T8 (now approaching the peak of the AC line cycle) switch S1 opens (or OFF), turning ON load group 106 LG2, with load groups 106 LG1, LG3, and LG4 remaining ON. Accordingly, on the interval T8-T9, S1=OFF, S2=OFF, S3=OFF, and all load groups 106 LG1 to LG4 are ON.

In the present example, between times T8 and T9, the AC input voltage Vac(t) and AC input current Iac(t) reach their peak values in the AC line cycle. Following the peak, the AC input voltage and current start to ramp down and decrease, and the process described above commences in reverse. That is, at time T9, the voltage and load conditions are the same as those at time T8. Therefore, at time T9, switch S1 closes (or ON), shorting out the load group 106 LG2, with load groups 106 LG1, LG3, and LG4 remaining ON. Accordingly, on the interval T9-T10, S1=ON, S2=OFF, S3=OFF, and load groups 106 LG1, LG3, and LG4 are ON, which are the same switch and load conditions as those on the interval T7-T8 (as shown in FIG. 5H).

As the AC input voltage Vac(t) and AC input current Iac(t) continue to ramp down and decrease, the entire switch and load sequence reverses. That is, from times T9 to T17, the entire sequence described above commences in reverse. Hence, at time T9, the switch and load conditions are the same as those at time T8. At time T10, the switch and load conditions are the same as those at time T7. At time T11 the switch and load conditions are the same as those at time T6, and so on. Therefore, the switch and load conditions on the time interval T9-T10 are the same as those on the time interval T7-T8. Similarly, the switch and load conditions n the time interval T10-T11 are the same as those on the time interval T6-T7, and so on. These results are illustrated in FIGS. 5G and 5H.

Figure 6A:
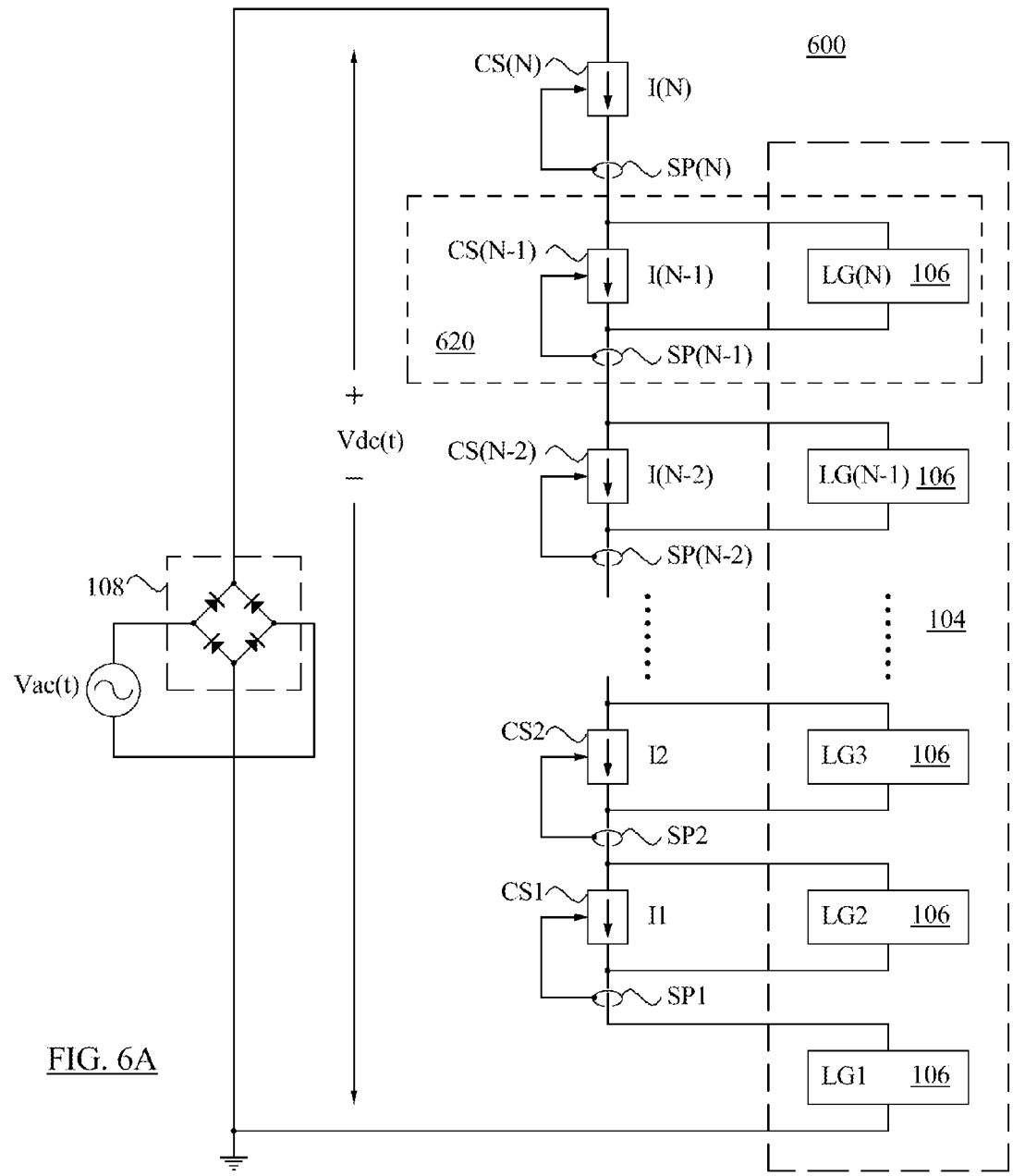
FIG. 6A is a non-limiting exemplary illustration of a current mode embodiment of a regulator circuit in accordance with the present invention.

FIG. 6A is an exemplary illustration of a current mode embodiment of the regulator circuit in accordance with the present invention. In this embodiment, current levels rather than voltage levels are used to determine the switch transitions for the load groups. That is, the load groups 106 LG1 to LG(N) are switched in and out of the circuit according to a sensed current flow within the regulator circuit, rather than sensing the rectified AC input voltage Vdc(t). This current mode embodiment includes N current sources CS1 to CS(N), which are designed so that the $N^{th}$ current source has operating parameters that prescribe a higher operating current than the next, subsequent, $(N-1)^{st}$ current source. Stated otherwise, the required operating current I(N) for current source CS(N) is greater than the required operating current I(N-1) for current source CS(N-1):

$$I(N) > I(N-1) > \ldots > I2 > I1 > 0$$

In this way (as illustrated in FIG. 6A), the very first current source CS1 is designed to provide the lowest current I1, and the highest current I(N) is provided by the current source CS(N).

As illustrated in FIG. 6A, the current mode embodiment of the regulator circuit 600 is comprised of load groups 106 LG1 to LG(N) and current sources CS1 to CS(N). Each of the current sources CS1 to CS(N−1) functions as a closed switch, a series pass stage, and an open switch, depending on conditions in the circuit. Current source CS(N) functions as a closed switch and series pass stage only, as there is no region where it operates as an open switch, because there is no parallel connected load, nor is there a larger current source designed to overtake regulating current source CS(N). In this sense, the regulator circuit 600 is a "distributed" version of the regulator circuits shown and described in view of the voltage mode embodiments of FIGS. 4A to 5H. That is, the control, the switching, and the series pass stage of the voltage mode embodiments may be thought of as being "distributed" amongst the individual current sources in the current mode embodiment of the regulator circuit 600. Hence, there is not a single "controller" as described in relations to the voltage mode regulator circuits of FIGS. 4A to 5H, but a distributed one in this particular current mode embodiment as shown in regulator circuit 600, in accordance with the present invention.

As a randomly selected representative example, concentrating on a single current source module or cell 620 illustrated in FIG. 6A, the current-mode cell 620 is comprised of a regulating current source CS(N−1) with a load group 106 LG(N) coupled in parallel, and includes a current sensor (current sense point) SP(N−1) measuring the current through the parallel combination of regulating current source CS(N−1) and load group 106 LG(N). When a small voltage is applied to current mode regulator circuit 600, the regulating current source CS(N−1) attempts to regulate the current through current sensor SP(N−1) to a predetermined set point (or threshold) value. Because there is initially insufficient voltage to regulate the current to the set point value, the current source CS(N−1) (as the current regulator) assumes a low impedance state, providing as much current as the circuit and applied voltage will allow, but less than that prescribed set point value I(N−1). In this state, the regulating current source CS(N−1) may be considered a closed switch; i.e., a switch in the ON state, which shorts-out the parallel-coupled load group 106 LG(N) (i.e., no power to the load LG(N) and hence, load group 106 LG(N) remains OFF).

As the applied voltage increases, eventually there is sufficient voltage for the regulating current source CS(N−1) to regulate the current through current sensor SP(N−1) to the set point value I(N−1). The regulating current source CS(N−1) then operates in a linear mode of operation. In this mode, the regulating current source functions a series pass stage, regulating the current through current sensor SP(N−1) at or near the set point value I(N−1). Note that the current flowing through current sensor SP(N−1) is the sum of the current flowing in load group 106 LG(N) and that flowing in the regulating current source CS(N−1).

As the applied voltage increases further, the voltage across the regulating current source CS(N−1) increases. Because load group 106 LG(N) is connected in parallel with current source CS(N−1), the voltage across load group 106 LG(N) increases as well. The increasing voltage causes the current flowing in load group 106 LG(N) to increase, and the current provided by the current source CS(N−1) to decrease, in order to maintain the regulated current through current sensor SP(N−1) at or near the set point value. As the applied voltage increases further, the current through load group 106 LG(N) eventually exceeds that prescribed by the set point value. Because the regulating current source CS(N−1) can no longer function to regulate the current at or near the set point value, it shuts OFF completely, entering a high impedance state. In this state, the controllable current source CS(N−1) may be thought of as an open switch; i.e., a switch in the OFF state. This means that the parallel-coupled load group 106 LG(N) now carries all of the current, and essentially no current flows through current source CS(N−1).

In the above description, it is shown that the regulating current source CS(N−1) has three operating modes. First, a low impedance state where it functions as a switch in the ON state (a closed switch). Second, a linear operating mode where it functions as a series pass stage, providing regulated current to circuits connected in series. Third, a high impedance state where it functions as a switch in the OFF state (an open switch). By employing several of these current-mode cells as illustrated in FIGS. 6A and 6C, the control, switching of load elements, and regulation thereof are performed within each cell.

An advantage of the distributed current mode approach is that the voltages of the accompanying load groups limit the voltage stress on the regulating current sources. That is, the voltages across the adjacent loads effectively clamp the regulating current source voltages when the regulating current sources are in the OFF state. For example, in the non-limiting, exemplary embodiment schematic in FIG. 6A, the voltage stress on regulating current source CS1 is limited by the voltage of load group 106 LG2. Similarly, the voltage stress on regulating current source CS2 is limited by the voltage of load group 106 LG3, and so on. This allows the use of low voltage devices (e.g., transistors) in the regulating current sources, even though the voltage across the entire load 104 may be much higher.

Figure 6B:
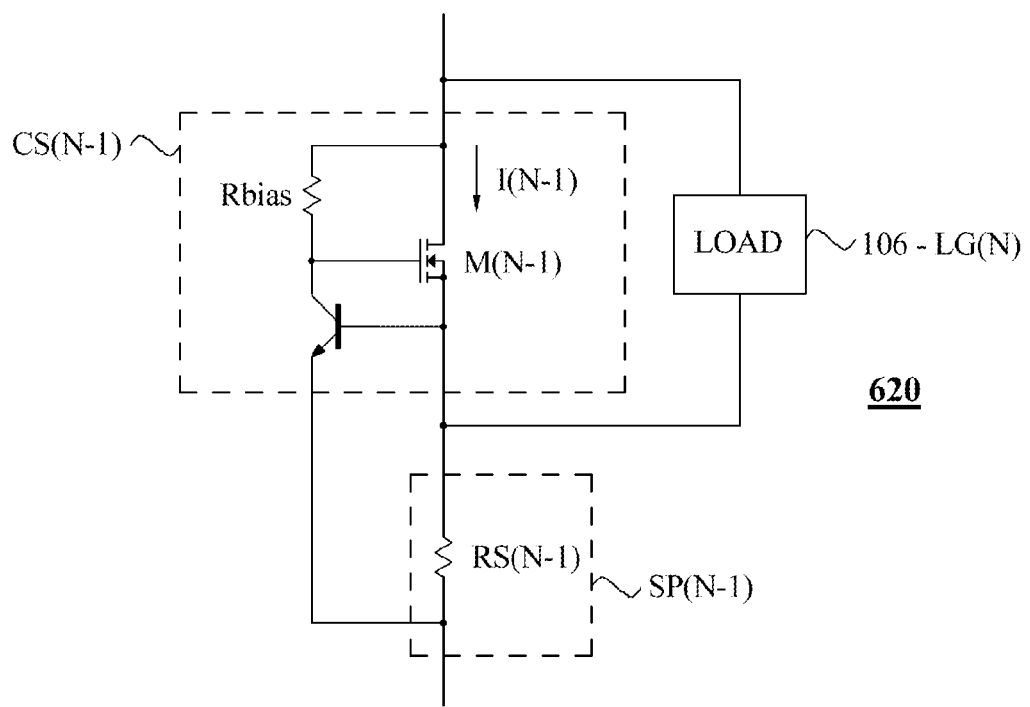
FIG. 6B is a non-limiting exemplary implementation, detailing a circuit topography of a representative current-mode cell or module shown in FIG. 6A.
Figure 6C:
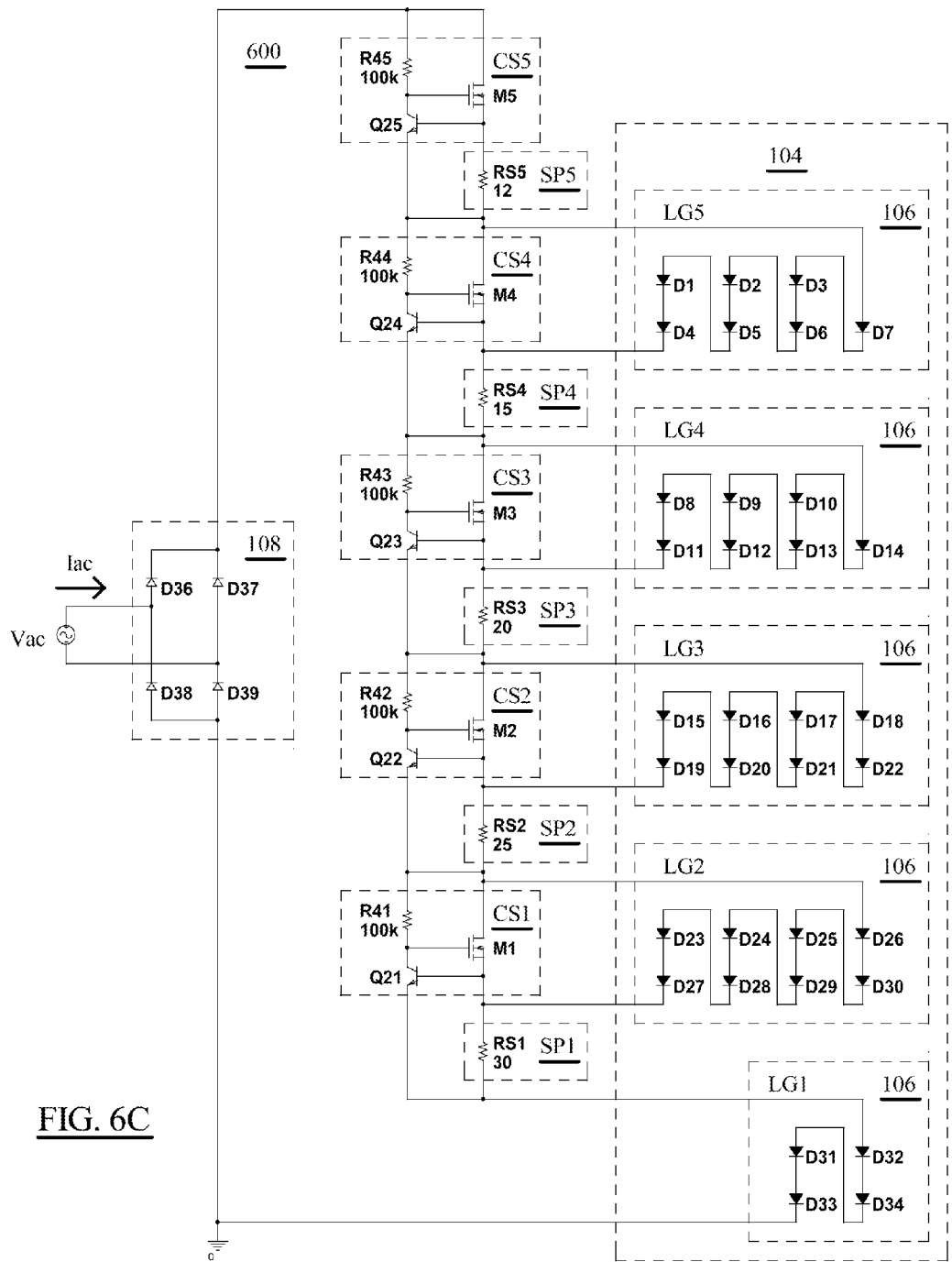
FIG. 6C is a non-limiting exemplary detailed illustration of a current mode embodiment of a regulator circuit in accordance with the present invention.

FIG. 6B is a non-limiting, exemplary implementation, detailing a circuit topography of the representative current-mode cell or module 620 detailed above. As illustrated, the controllable current source CS(N−1) can be realized using only three elements, namely an N-channel MOSFET, an NPN transistor amplifier, and a bias resistor Rbias. The current sense resistor RS(N−1) is a non-limiting, exemplary implementation of the current sense point SP(N−1). Bias resistor Rbias supplies the N-channel MOSFET gate voltage to turn it ON, and also supplies bias current to the NPN transistor amplifier.

For this exemplary implementation, the current set point value (or threshold) is approximately given by $$I(N-1) \cong \frac{V_{BE}}{RS(N-1)}$$

where $V_{BE}$ is the forward bias base-emitter voltage of NPN transistor amplifier (typically 0.6V), and RS(N−1) is the resistance of the particular current sense resistor. In other words, the sense resistor RS(N−1) and the NPN transistor amplifier in combination function as a current sensor and amplifier that provide feedback, to control the gate terminal of the N-channel MOSFET M(N−1), so as to regulate the current through current sensor RS(N−1) to the set point value. When a small voltage is applied to the circuit, bias resistor Rbias supplies voltage to the gate of the N-channel MOSFET M(N−1), and the N-channel MOSFET M(N−1) begins to turn ON. Because there is initially insufficient voltage to regulate the current to the set point value, the N-channel MOSFET M(N−1) assumes a low impedance state, providing as much current as the circuit and applied voltage will allow. In this state, the N-channel MOSFET may be considered a closed switch; i.e., a switch in the ON state.

As the applied voltage increases, the current increases, and eventually there is sufficient voltage for the N-channel MOSFET M(N−1) to supply the current through the current sense resistor RS(N−1) to the set point value. At this point, both the NPN transistor amplifier and the N-channel MOSFET M(N−1) enter a linear mode of operation. In this mode, the N-channel MOSFET M(N−1) functions as a pass element in a series pass stage, regulating the current through current sense resistor RS(N−1) to the set point value.

As the applied voltage increases further, the voltage across the N-channel MOSFET increases. Because load group 106 LG(N) is coupled in parallel with the N-channel MOSFET M(N−1), the voltage across and current through load group 106 LG(N) increases as well. As the current flowing in load group 106 LG(N) increases, the current provided by the N-channel MOSFET M(N−1) decreases, in order to maintain the current through current sense resistor RS(N−1) at the set point value. This process continues until the current through load group 106 LG(N) exceeds that prescribed by the set point value. At this point, the "series pass element," N-channel MOSFET M(N−1), can no longer regulate the current to the set point value. The NPN transistor amplifier enters saturation, turning ON fully, thereby turning OFF completely the N-channel MOSFET M(N−1). Hence, the N-channel MOSFET M(N−1) enters a high impedance state. In this state, the N-channel MOSFET M(N−1) may be considered an open switch; i.e., a switch in the OFF state.

In the above discussion it is shown that the N-channel MOSFET M(N−1) operates in three modes. First, a low impedance state where it functions as a switch in the ON state. Second, a linear operating mode where it functions as a series pass element within a series pass stage, providing regulated current to circuits connected in series. Third, a high impedance state where it functions as a switch in the OFF state. By employing several of these current sources CS1 to CS(N), the control, the switching of multiple load groups 106, and regulation of current in those load groups 106 are performed within the context of each current source CS1 to CS(N).

Referring back to FIG. 6A, the regulating current source CS1 has the lowest set point value I1, followed by regulating current source CS2 with set point value I2, up to regulating current source CS(N), with the highest set point value I(N). Consider the AC input voltage Vac(t), starting from zero, and increasing. Initially there is insufficient voltage to supply enough current to achieve even the lowest set point value I1. As the voltage increases, all of the regulating current sources CS(1) to CS(N) assume a low impedance state, functioning as closed switches (i.e., switches in the ON state), with regulating current sources CS1 to CS(N−1) effectively bypassing (or shorting out) the loads groups 106 LG2 to LG(N), and with load group 106 LG1 initially OFF simply because of insufficient available voltage.

As the AC input voltage Vac(t) increases, the current also increases, flowing through the N regulating current sources CS1 to CS(N), and through load group 106 LG1. Load group 106 LG1 is thereby powered ON with its current increasing. All other load groups 106 LG2 to LG(N) are powered OFF. As the current increases, there is a point in time at which the set point value I1 is achieved. Regulating current source CS1 enters its linear region, functioning as a series pass stage, and regulates the current in load group 106 LG1 to the set point value I1. Regulating current sources CS2 to CS(N) remain in a low impedance, or ON state. As the voltage increases, the voltage appearing across regulating current source CS1 increases, while CS1 functions to regulate the current flowing in the load group 106 LG1 to the set point value I1. The voltage appearing across regulating current source CS1 also appears across load group 106 LG2, coupled in parallel. As the voltage across current source CS1 and load group 106 LG2 increases, the current in load group 106 LG2 increases, and load group 106 LG2 is powered ON. Eventually, the current flowing in load group 106 LG2 exceeds that prescribed by set point value I1, and regulating current source CS1 shuts off, entering a high impedance, or OFF state (i.e., an open switch).

As the AC input voltage Vac(t) increases further, load groups 106 LG1 and LG2 are powered ON with their current increasing. The remaining load groups 106 LG3 to LG(N) are powered OFF. As the current increases, there is a time at which the set point value I2 is achieved. The regulating current source CS2 then enters its linear region, and functions as a series pass stage, regulating the current in load groups 106 LG1 and LG2 to the set point value I2. Regulating current sources CS3 to CS(N) remain in a low impedance, or ON state, effectively bypassing (or shorting out) their respective parallel coupled load groups 106. As the AC input voltage Vac(t) increases further, the voltage appearing across regulating current source CS2 increases, while it functions to regulate the current flowing in load groups 106 LG1 and LG2 to the set point value I2. The voltage appearing across regulating current source CS2 also appears across load group 106 LG3, connected in parallel. As the voltage across load group 106 LG3 increases, the current in load group 106 LG3 increases, and load group 106 LG3 is powered ON. Eventually, the current flowing in load group 106 LG3 exceeds that prescribed by set point value I2, and regulating current source CS2 shuts OFF, entering a high impedance, or OFF state.

Load groups 106 LG1 to LG3 are now powered ON with their current increasing. The remaining load groups LG4 to LG(N) are powered OFF. As the current increases, there is a point in time at which the set point value I3 is achieved. Regulating current source CS3 then enters its linear region, and functions as a series pass stage, regulating the current in load groups 106 LG1 to LG3 to the set point value I3. Regulating current sources CS4 to CS(N) remain in a low impedance, or ON state, effectively bypassing (or shorting out) their respective parallel coupled load groups 106. As the voltage increases, the voltage appearing across controllable current source CS3 increases, while it functions to regulate the current flowing in load groups 106 LG1 to LG3 to the set point value I3. The voltage appearing across controllable current source CS3 also appears across load group 106 LG4, connected in parallel. As the voltage across load group 106 LG4 increases, the current in load group 106 LG4 increases, and load group 106 LG4 is powered ON. Eventually, the current flowing in load group 106 LG4 exceeds that prescribed by set point value I3, and controllable current source CS3 shuts OFF, entering high impedance, or OFF state.

The pattern described in the preceding paragraphs continues as the voltage increases, up to the peak of the applied AC voltage. At the peak of the applied voltage, the most load groups 106 are powered ON at the highest current. Note that it is not necessary that the entire set of load groups 106 be powered ON. That is, even at the peak of the AC input voltage, one or more of the load groups 106 may not be powered ON because the applied voltage may not be sufficient for them to be powered ON. In this way, the operating voltage range of the system is broadened. Only as many loads are powered on as there is voltage sufficient to power them. This means that there might be instances (depending on load requirements and availability of power) where one or more load groups 106 may not be activated or turned ON. For example, in the exemplary instance illustrated in FIG. 6A, load group 106 LG(N) may not turn ON, even at the peak of the AC line cycle. That is, if the voltage appearing across regulating current source CS(N−1), even at the peak of the AC line cycle, is not large enough to power ON the parallel connected load group 106 LG(N), then load group 106 LG(N) will not turn ON in that cycle. Accordingly, with the regulator circuit embodiment 600, and in accordance with the present invention, the load 104 need not be manufactured within very specific electrical characteristics or properties or parameters, and yet is capable of operation over a wide range of incoming AC line voltage.

Following the peak of the applied AC input voltage Vac(t), the voltage begins to ramp down and decrease toward zero. The process of turning ON loads described in the previous paragraphs is reversed, and load groups 106 are turned OFF, from highest to lowest. For example, if load groups 106 LG1 to LG5 were powered on as the AC input voltage Vac(t) increased from zero to the peak of the applied AC input voltage, then these loads would be powered OFF, starting with the load group 106 LG5, followed by LG4, then LG3, and so on.

Figure 6D:
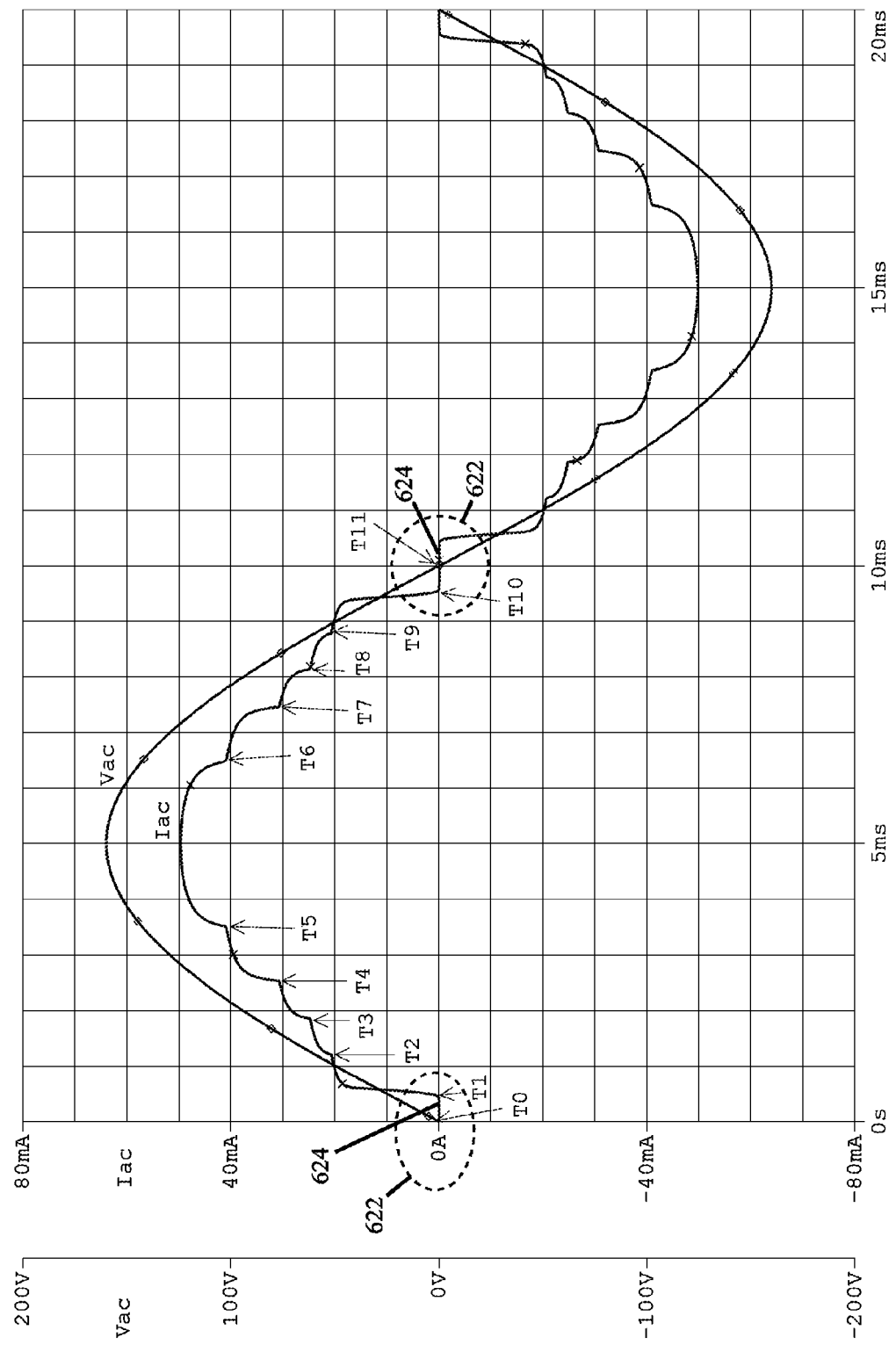
FIG. 6D is a non-limiting exemplary graphical illustration of voltage and current wave forms of the regulator circuit shown in FIG. 6C in accordance with the present invention.

FIG. 6C is a non-limiting, exemplary specific illustrative implementation of the detailed circuit topography of the generalized regulator circuit 600 shown in FIG. 6A, which implements the details of each current source in FIG. 6A with the exemplary current sources illustrated in FIG. 6B. FIG. 6D is an exemplary graphical illustration of the operational electrical properties or characteristics of the regulator circuit 600 of FIG. 6C, in accordance with the present invention.

The overall operation of the regulator circuit 600 of FIG. 6C is similar to that described in FIGS. 6A and 6B. Accordingly, the regulator circuit 600 of FIG. 6C includes similar corresponding or equivalent components, interconnections, functions, and or cooperative relationships as the regulator circuit 600 that is shown in FIG. 6A and detailed in FIG. 6B, and described above. Therefore, for the sake of brevity, clarity, convenience, and to avoid duplication, the general description of the regulator circuit 600 of FIG. 6C will not repeat every corresponding or equivalent component, function, and or interconnections that have already been described above in relation to regulator circuit 600 shown in FIG. 6A and detailed in FIG. 6B.

In the non-limiting exemplary implementation shown in FIG. 6C, load 104 is exemplarily shown to be comprised of a string of thirty-four LEDs that are divided into five load groups 106 LG1 to LG5, with load groups 106 LG5 and LG4 having seven load elements (e.g., LEDs), load groups 106 LG3 and LG2 having 8 load elements (e.g., LEDs), and load group 106 LG1 having four load elements (e.g., LEDs). As illustrated in FIG. 6C, in this non-limiting exemplary embodiment, the regulator circuit 600 implements the five regulating current sources CS1 to CS5 as described in relation to FIG. 6B, with values for the current sense resistors RS1 to RS5 selected to determine the current set point values I1 to I5 for each of the five regulating current sources. FIG. 6D is an exemplary graphical illustration of the operational electrical properties or characteristics of the regulator circuit embodiment 600 of FIG. 6C, in accordance with the present invention.

As illustrated, the graph of FIG. 6D shows the input AC input voltage Vac(t), and corresponding AC input current Iac(t) as the load groups LG1 to LG5 are powered ON and then OFF over the AC line cycle. An electrical property or characteristic of the regulator circuit 600 of FIG. 6C is that regulating current sources CS1 to CS5 provide a substantially continuous proportionality between the AC input voltage Vac(t) and the AC input current Iac(t) over the majority of the full cycle period. Accordingly, since the AC input current Iac(t) is approximately in proportion to the AC input voltage Vac(t), the circuit exhibits a high power factor, which is near unity.

One exception to the proportionality between the Vac(t) and Iac(t) is near the zero-crossings 622 where there is insufficient AC voltage Vac(t) to generate sufficient AC current Iac(t) to activate any of the load groups 106. For example, at the beginning of the line cycle in the indicated region 622, even though the AC voltage Vac(t)>0 between times T0 and T1, that voltage does not generate sufficient AC current Iac(t) to activate or turn ON any load group 106 and hence, essentially no current flows through any of the load groups 106 and therefore, $I_{AC} \approx 0$ even though $V_{AC} > 0$.

As mentioned above in relations to the FIGS. 6A to 6D, regulating current source CS1 has the lowest set point value I1, followed by regulating current source CS2 with set point value I2, up to regulating current source CS5, with the highest set point value I5. Initially at T0, there is insufficient AC input voltage Vac(t) to supply current to achieve even the lowest set point value I1. Accordingly, as the AC input voltage Vac(t) increases from zero, all of the regulating current sources CS1 to CS5 will assume a low impedance state, functioning as closed switches (i.e., switches in the ON state), effectively shorting out the loads groups 106 LG2 to LG5, with load group 106 LG1 initially OFF simply because of insufficient available voltage. More specifically, from T0 to T1, N-channel MOSFETs M1 to M5 will all be biased ON (i.e., closed switch) for the respective current sources CS1 to CS5, providing as much current as the applied voltage will allow.

As illustrated in FIG. 6D, as the AC input voltage Vac(t) increases on the interval T1 to T2, the AC input current Iac(t) increases, flowing through the five regulating current sources CS1 to CS5, and then through load group 106 LG1, powering ON load group 106 LG1. As the current increases on the interval T1 to T2, there is a point at which the set point value I1 is achieved at sense point SP1 by regulating current source CS1. That is, the regulating current source CS1 operates in its linear operating region, and functions as a series pass stage, regulating the current flowing into load group 106 LG1 up to the set point value I1. In other words, the load group 106 LG1 is biased ON between times T1 and T2.

More specifically, between times T1 and T2, there is sufficient AC input voltage Vac(t) available for the N-channel MOSFET M1 of current source CS1 to supply current to load group 106 LG1 via current sense resistor RS1 up to the set point value I1, thereby powering ON load group 106 LG1. In this interval, both the NPN transistor amplifier Q21 and the N-channel MOSFET M1 operate in a linear mode of operation, wherein the N-channel MOSFET M1 functions as a pass element in a series pass stage, regulating the current flow into load group 106 LG1, up to the set point value I1, via the current sense resistor RS1.

As the AC input voltage Vac(t) increases, the voltage appearing across regulating current source CS1 increases, while CS1 functions to regulate the current flowing in load group 106 LG1 up to the set point value I1. The voltage appearing across regulating current source CS1 also appears across load group 106 LG2, which is coupled in parallel. Because the voltage across load group 106 LG2 is increasing, the current in load group 106 LG2 is also increasing, and load group 106 LG2 starts to power ON. The current in load group 106 LG2 then builds up until at time T2 it exceeds that prescribed by the set point value I1, and at this point the regulating current source CS1 shuts off, entering a high impedance, or OFF state (open switch), with load groups 106 LG1 and LG2 powered ON.

More specifically, as the applied AC input voltage Vac(t) increases, the voltage across the N-channel MOSFET M1 increases. Because load group 106 LG2 is coupled in parallel with the N-channel MOSFET M1, the voltage across load group 106 LG2 increases as well. As the voltage across, and current flowing through, load group 106 LG2 increases, the current provided by the N-channel MOSFET M1 decreases, in order to maintain the current through current sense resistor RS1 at the set point value I1. This continues until the cumulative current through the current sense resistor RS1 exceeds that prescribed by the set point value I1, at time T2. At this point, the "series pass element," or N-channel MOSFET M1, can no longer regulate the current at the set point value I1. The NPN transistor amplifier Q21 then enters saturation, turning OFF completely N-channel MOSFET M1. Hence, the N-channel MOSFET M1 enters a high impedance state. In this state, the N-channel MOSFET M1 may be considered an open switch; i.e., a switch in the OFF state, which compels the flow of current fully through load groups 106 LG1 and LG2, thereby powering ON load groups LG1 and LG2.

To continue, load groups 106 LG1 and LG2 are powered ON with their current increasing between times T2 and T3. Regulating current source CS2 operates in its linear region, and functions as a series pass stage, regulating the current in load groups 106 LG1 and LG2 up to the set point value I2.

More specifically, between times T2 and T3, both the NPN transistor Q22 and the N-channel MOSFET M2 operate in a linear mode of operation. In this mode, the N-channel MOSFET M2 functions as a pass element in a series pass stage, regulating the current in load groups 106 LG1 and LG2 up to the set point value I2, via the current sense resistor RS2.

As the AC input voltage Vac(t) increases, the voltage appearing across regulating current source CS2 increases, while CS2 functions to regulate the current flowing in load groups 106 LG1 and LG2 at the set point value I2. The voltage appearing across regulating current source CS2 also appears across load group 106 LG3, which is coupled in parallel. Because the voltage across load group 106 LG3 is increasing, the current in load group 106 LG3 is also increasing, and load group 106 LG3 starts to power ON. The current in load group 106 LG3 then builds up until at time T3 it exceeds that prescribed by the set point value I2, and at this point the regulating current source CS2 shuts off, entering a high impedance, or OFF state (open switch), with load groups 106 LG1 LG2, and LG3 powered ON.

More specifically, as the applied AC input voltage Vac(t) increases, the voltage across the N-channel MOSFET M2 increases. Because load group 106 LG3 is coupled in parallel with the N-channel MOSFET M2, the voltage across load group 106 LG3 increases as well. As the voltage across, and current flowing through, load group 106 LG3 increases, the current provided by the N-channel MOSFET M2 decreases, in order to maintain the current through current sense resistor RS2 at the set point value I2. This continues until the cumulative current through the current sense resistor RS2 exceeds that prescribed by the set point value I2, at time T3. At this point, the "series pass element," or N-channel MOSFET M2, can no longer regulate the current at the set point value I2. The NPN transistor amplifier Q22 then enters saturation, turning OFF completely N-channel MOSFET M2. Hence, the N-channel MOSFET M2 enters a high impedance state. In this state, the N-channel MOSFET M2 may be considered an open switch; i.e., a switch in the OFF state, which compels the flow of current fully through load groups 106 LG1, LG2, and LG3, thereby powering ON load groups LG1, LG2, and LG3.

To continue, load groups 106 LG1, LG2, and LG3 are powered ON with their current increasing between times T3 and T4. Regulating current source CS3 operates in its linear region, and functions as a series pass stage, regulating the current in load groups 106 LG1, LG2 and LG3 up to the set point value I3.

More specifically, between times T3 and T4, both the NPN transistor Q23 and the N-channel MOSFET M3 operate in a linear mode of operation. In this mode, the N-channel MOSFET M3 functions as a pass element in a series pass stage, regulating the current in load groups 106 LG1, LG2, and LG3 up to the set point value I3, via the current sense resistor RS3.

As the AC input voltage Vac(t) increases, the voltage appearing across regulating current source CS3 increases, while CS3 functions to regulate the current flowing in load groups 106 LG1, LG2, and LG3 at the set point value I3. The voltage appearing across regulating current source CS3 also appears across load group 106 LG4, which is coupled in parallel. Because the voltage across load group 106 LG4 is increasing, the current in load group 106 LG4 is also increasing, and load group 106 LG4 starts to power ON. The current in load group 106 LG4 then builds up until at time T4 it exceeds that prescribed by the set point value I3, and at this point the regulating current source CS3 shuts off, entering a high impedance, or OFF state (open switch), with load groups 106 LG1 LG2, LG3, and LG4 powered ON.

More specifically, as the applied AC input voltage Vac(t) increases, the voltage across the N-channel MOSFET M3 increases. Because load group 106 LG4 is coupled in parallel with the N-channel MOSFET M3, the voltage across load group 106 LG4 increases as well. As the voltage across, and current flowing through, load group 106 LG4 increases, the current provided by the N-channel MOSFET M3 decreases, in order to maintain the current through current sense resistor RS3 at the set point value I3. This continues until the cumulative current through the current sense resistor RS3 exceeds that prescribed by the set point value I3, at time T4. At this point, the "series pass element," or N-channel MOSFET M3, can no longer regulate the current at the set point value I3. The NPN transistor amplifier Q23 then enters saturation, turning OFF completely N-channel MOSFET M3. Hence, the N-channel MOSFET M3 enters a high impedance state. In this state, the N-channel MOSFET M3 may be considered an open switch; i.e., a switch in the OFF state, which compels the flow of current fully through load groups 106 LG1, LG2, LG3, and LG4, thereby powering ON load groups 106 LG1, LG2, LG3, and LG4.

To continue, load groups 106 LG1, LG2, LG3, and LG4 are powered ON with their current increasing between times T4 and T5. Regulating current source CS4 operates in its linear region, and functions as a series pass stage, regulating the current in load groups 106 LG1, LG2, LG3, and LG4 up to the set point value I4.

More specifically, between times T4 and T5, both the NPN transistor Q24 and the N-channel MOSFET M4 operate in a linear mode of operation. In this mode, the N-channel MOSFET M4 functions as a pass element in a series pass stage, regulating the current in load groups 106 LG1, LG2, LG3, and LG4 up to the set point value I4, via the current sense resistor RS4.

As the AC input voltage Vac(t) increases, the voltage appearing across regulating current source CS4 increases, while CS4 functions to regulate the current flowing in load groups 106 LG1, LG2, LG3, and LG4 up to the set point value I4. The voltage appearing across regulating current source CS4 also appears across load group 106 LG5, which is coupled in parallel. Because the voltage across load group 106 LG5 is increasing, the current in load group 106 LG5 is also increasing, and load group 106 LG5 starts to power ON. The current in load group 106 LG5 then builds up until at time T5 it exceeds that prescribed by the set point value I4, and at this point the regulating current source CS4 shuts off, entering a high impedance, or OFF state (open switch), with load groups 106 LG1 LG2, LG3, LG4, and LG5 powered ON.

More specifically, as the applied AC input voltage Vac(t) increases, the voltage across the N-channel MOSFET M4 increases. Because load group 106 LG5 is coupled in parallel with the N-channel MOSFET M4, the voltage across load group 106 LG5 increases as well. As the voltage across, and current flowing through, load group 106 LG5 increases, the current provided by the N-channel MOSFET M4 decreases, in order to maintain the current through current sense resistor RS4 at the set point value I4. This continues until the cumulative current through the current sense resistor RS4 exceeds that prescribed by the set point value I4, at time T5. At this point, the "series pass element," or N-channel MOSFET M4, can no longer regulate the current at the set point value I4. The NPN transistor amplifier Q24 then enters saturation, turning OFF completely N-channel MOSFET M4. Hence, the N-channel MOSFET M4 enters a high impedance state. In this state, the N-channel MOSFET M4 may be considered an open switch; i.e., a switch in the OFF state, which compels the flow of current fully through load groups 106 LG1, LG2, LG3, LG4, and LG5, thereby powering ON load groups LG1, LG2, LG3, LG4, and LG5.

To continue, load groups 106 LG1, LG2, LG3, LG4, and LG5 are powered ON with their current increasing at time T5. Regulating current source CS5 operates in its linear region, and functions as a series pass stage, regulating the current in load groups 106 LG1, LG2, LG3, LG4, and LG5 up to the set point value I5.

More specifically, between times T5 and T6, both the NPN transistor Q25 and the N-channel MOSFET M5 operate in a linear mode of operation. In this mode, the N-channel MOSFET M5 functions as a pass element in a series pass stage, regulating the current in load groups 106 LG1, LG2, LG3, LG4, and LG5 up to the set point value I5, via the current sense resistor RS5.

From time T5, as the AC input voltage Vac(t) increases, the voltage appearing across regulating current source CS5 increases, while CS5 functions to regulate the current flowing in load groups 106 LG1, LG2, LG3, LG4, and LG5 up to the set point value I5. The voltage appearing across regulating current source CS5 then reaches its maximum value at the peak of the AC line cycle, and starts to decrease as the applied AC voltage begins to decrease past the peak. This continues until at time T6, there is insufficient voltage for regulating current source CS5 to regulate the current through sense point SP5. At this point, regulating current source CS5 enters a low impedance state; i.e., a switch in the ON state.

More specifically, as the applied AC input voltage Vac(t) increases, the voltage across the N-channel MOSFET M5 increases, as the current through current sense resistor RS5 is regulated up to the set point value I5. The voltage appearing across N-channel MOSFET M5 increases up to the peak of the AC line cycle, and then starts decreasing past the peak. NPN transistor Q25 and MOSFET M5 operate in a linear operating mode, regulating the current up to the set point value I5 via current sense resistor RS5. This continues until at time T6, there is insufficient voltage to maintain regulation of the current in RS5, and N-channel MOSFET M5 assumes a low impedance or ON state; i.e., a closed switch. As the voltage decreases further, the current in load group 106 LG5 decreases toward zero, thereby powering OFF load group 106 LG5.

Hence, as the AC input voltage Vac(t) decreases past the peak of the AC line cycle, the process of turning OFF load groups commences in reverse order. That is, the load groups 106 LG1 to LG5 were activated in order LG1, LG2, LG3, LG4, and then LG5, as the AC input voltage increased from zero to the peak of the AC line cycle. As the voltage decreases from the peak of the AC line cycle toward zero, the load groups 106 will be deactivated in reverse: LG5, LG4, LG3, LG2, and then LG1. The corresponding time intervals are shown in the table of FIG. 6E. That is, the conditions on the interval T0 to T2 correspond to those on T9 to T11, and those on the interval T2 to T3 correspond to those on T8 to T9, and so on. FIG. 6E also summarizes some of the operating parameters of the exemplary embodiment given in FIG. 6C.

Figure 6F:
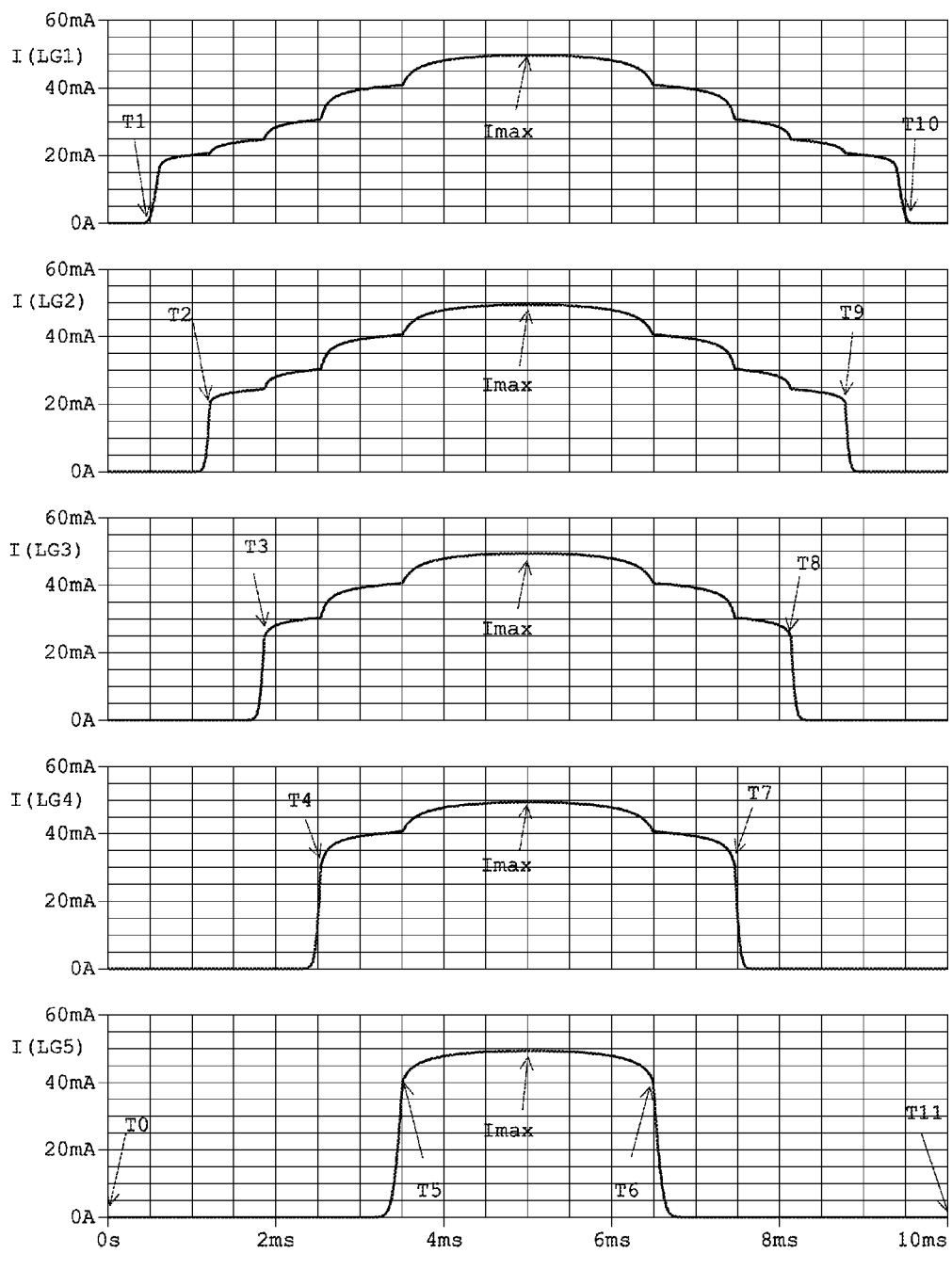
FIG. 6F is a non-limiting exemplary graphical illustration that further details the current wave forms in each of the load groups of the regulator circuit shown in FIG. 6C in accordance with the present invention.

FIG. 6F is an exemplary illustration of current as a function of time through each of the load groups 106 LG1 to LG5, for the exemplary embodiment illustrated in FIG. 6C, over half of the AC line cycle, as the AC voltage begins from zero, through the peak, and back to zero. It is shown that current flows in load group 106 LG1 throughout most of the AC line cycle, with the subsequent load groups 106 LG2 to LG5 having respectively shorter and shorter conduction times (or angles). Furthermore, all of the conducting load groups 106 LG1 to LG5 have essentially the same maximum current, Imax, flowing through them because load groups 106 LG1 to LG5 are effectively coupled in series, as illustrated in FIG. 6C. However, they commence and terminate conduction at different times, and conduct for different durations, which are a function of the contemporaneous available AC voltage, and of the specific requirements of a particular design.

Figure 7A:
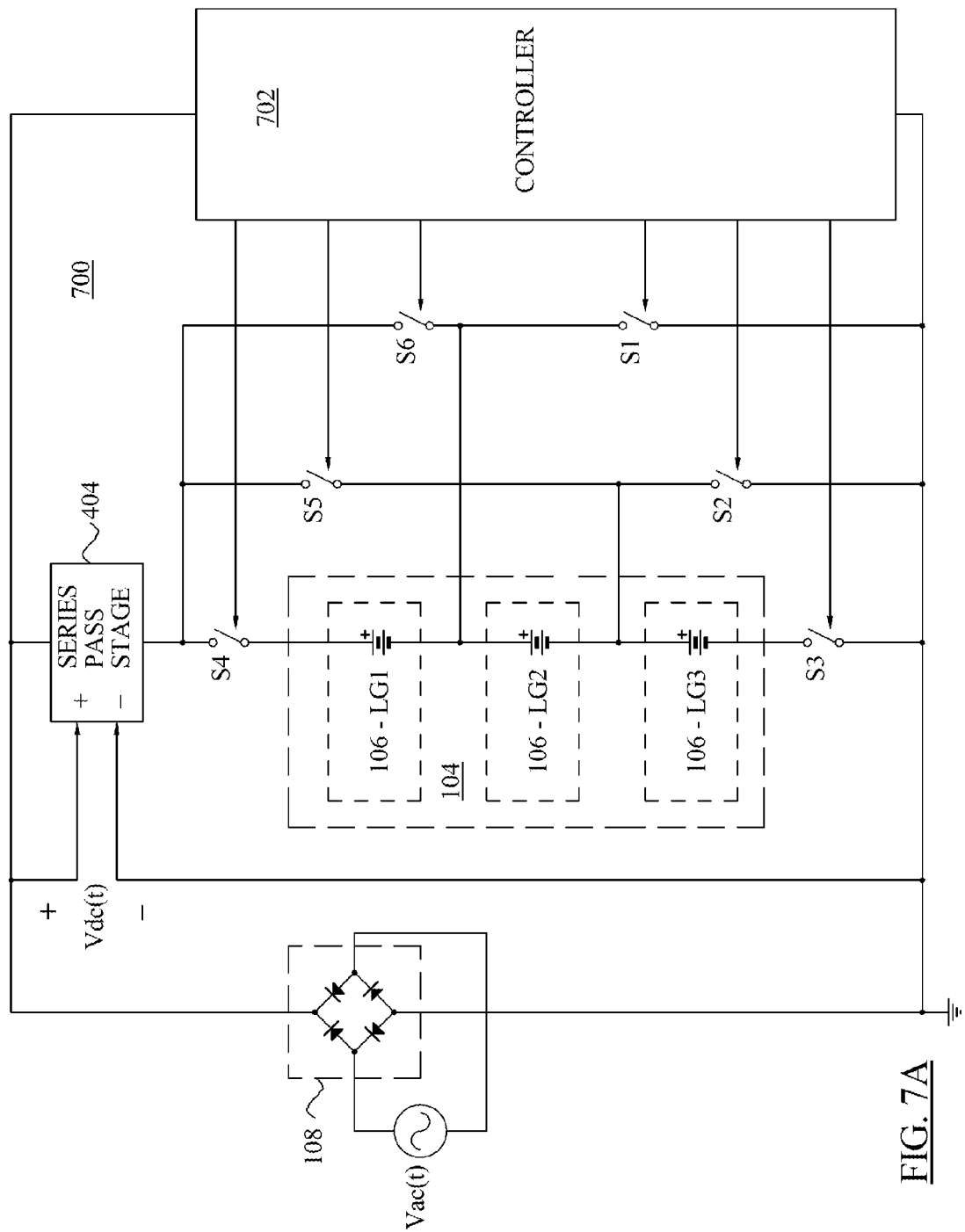
FIG. 7A is a non-limiting exemplary illustration of a regulator circuit using power sources (e.g., batteries) as loads in accordance with the present invention.

FIG. 7A is non-limiting, exemplary illustration of yet another embodiment of a multiple loads regulator circuit with the exception that the loads used are charge storage units, and the regulator circuit regulates the charging of the charge storage units from the input power source in accordance with the present invention. Non-limiting examples of charge storage units may include batteries, capacitors, super-capacitors, etc. The regulator circuit 700 of FIG. 7A is used to switch in and out loads (in this exemplary instance, the loads are actually batteries) to minimize power dissipation in the coupled series pass stage 404, and thereby increase the overall efficiency of the transfer of energy from the power source, to the charge storage units (or batteries, in this exemplary instance).

Figure 7B:
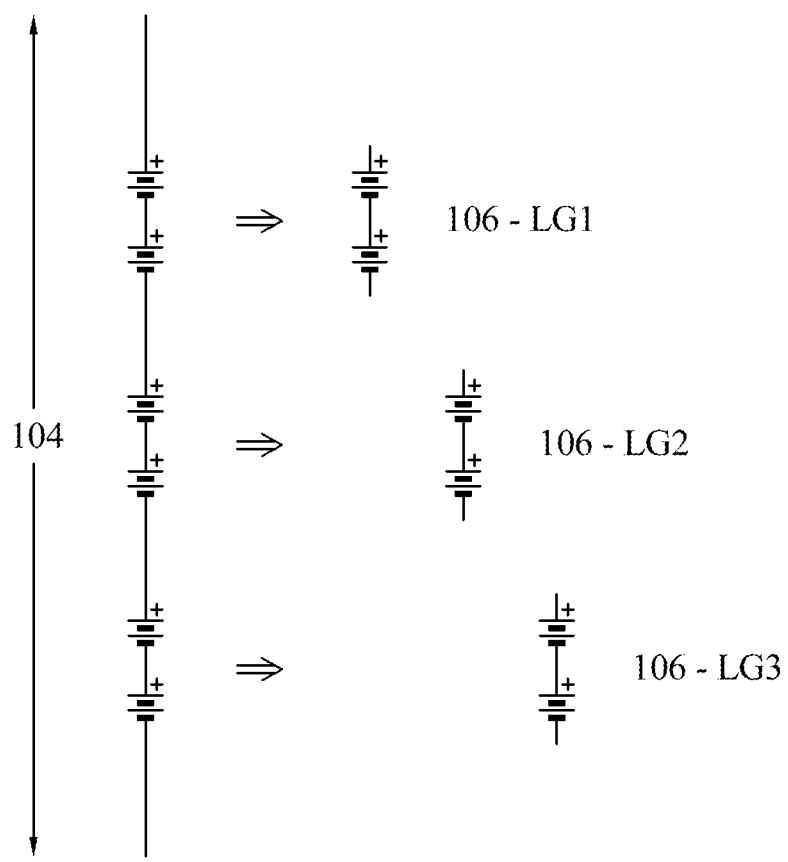
FIG. 7B is a non-limiting exemplary illustration of a load (a connected set of batteries) divided into one or more load groups and or load elements in accordance with the present invention.

The regulator circuit 700 includes a controller 702 that divides a load 104 into two or more load group constituents 106 (LG1, LG2, LG3, ... LG(N)) using switches S1 to S(M), with the load 104 comprised of two or more load groups 106, and each load group 106 comprised of at least one load element (e.g., a battery). FIG. 7B is a non-limiting example of a load 104 divided into smaller load constituent groups 106 (batteries), with each load group having a number of load elements (cells). As stated above with all of the above disclosed embodiments, the manner and level of granulation of the load 104 into finer or smaller load group constituents 106 (i.e., the manner and the amount or number by which a load 104 may be divided into smaller load groups 106 that require smaller voltage, current, and power to be activated or biased ON) can vary, and depend on the load and power requirements, including efficiency desired.

Referring to FIG. 7A, the exemplary regulator circuit 700 also uses a series pass stage 404 as described above for sensing the magnitude of the rectified AC input voltage Vdc(t), and providing a proportional output current in order to achieve high input power factor. The controller 702 controls switches S1 to S6, to switch load groups 106 LG1 to LG3 (e.g., the batteries) into and out of the charging circuit depending on system conditions, such as the instantaneous value of the AC line voltage, and the charging needs of the battery loads.

In this battery charger application, more switches are required than in the above-disclosed exemplary embodiments that used LEDs as loads because it is unacceptable to close a switch across a battery and thereby apply a short circuit to the battery. In the previous examples using loads such as LEDs, applying a short circuit across a load was not a problem because the exemplary LED loads do not store energy. In addition, when the loads are charge storage units that are coupled in series, the amount of charge accumulated in each charge storage unit (e.g., battery) must be balanced. Furthermore, some of the switches in this non-limiting exemplary battery charger embodiment must block voltage of either polarity. A switch that is capable of blocking voltage of either polarity is sometimes called a "voltage bi-directional switch." As best illustrated in FIG. 7C, switches S2 and S6 are non-limiting examples of voltage bi-directional switches, realized by combining an active switch, such as a MOSFET, with a passive switch, such as a diode.

Figure 7C:
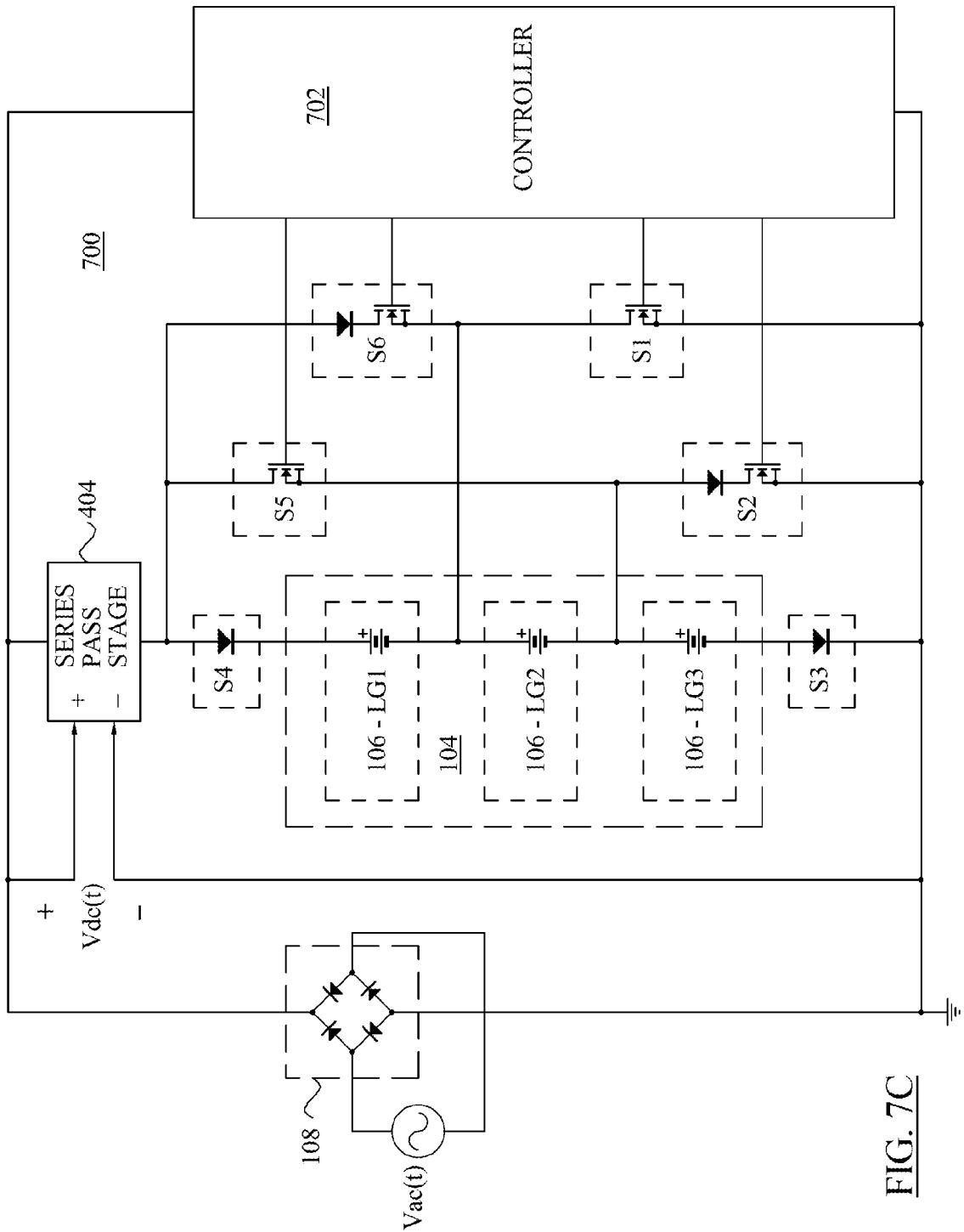
FIG. 7C is a non-limiting exemplary illustration of the regulator circuit of FIG. 7A, showing details of the switch implementations in accordance with the present invention.

As illustrated in FIG. 7C, switches S2 and S6 are voltage bi-directional switches. Switches S1 and S5 are conventional voltage unidirectional active switches, or MOSFETs in this case, and switches S3 and S4 are implemented with passive switches, or diodes in this case. Switch S2 must be voltage bi-directional because it blocks the negative voltage of battery load group 106 LG2 when switch S1 is closed, and a positive voltage of load group 106 LG3 when switch S3 is closed. Similarly, switch S6 is voltage bi-directional because it blocks the negative voltage of load group 106 LG2 when switch S2 is closed, and the positive voltage of load group 106 LG1 when switch S4 is closed. This rudimentary system of three battery load groups 106 requires two voltage bi-directional switches, two voltage unidirectional switches, and two passive switches. More generally, a system of this type comprised of N battery load groups LG(N) requires 2(N−2) voltage bi-directional switches, 2 voltage unidirectional switches, and 2 passive switches. As the load 104 is broken into more and more load groups 106, the resolution or granularity is increased, and the efficiency and overall performance of the system generally improves. Note that many other circuit topologies and switch implementations are possible and contemplated without departing from the spirit and scope of the present invention, which is the switching in-and-out of loads according to source and load conditions for efficient operations.

Figure 7D:
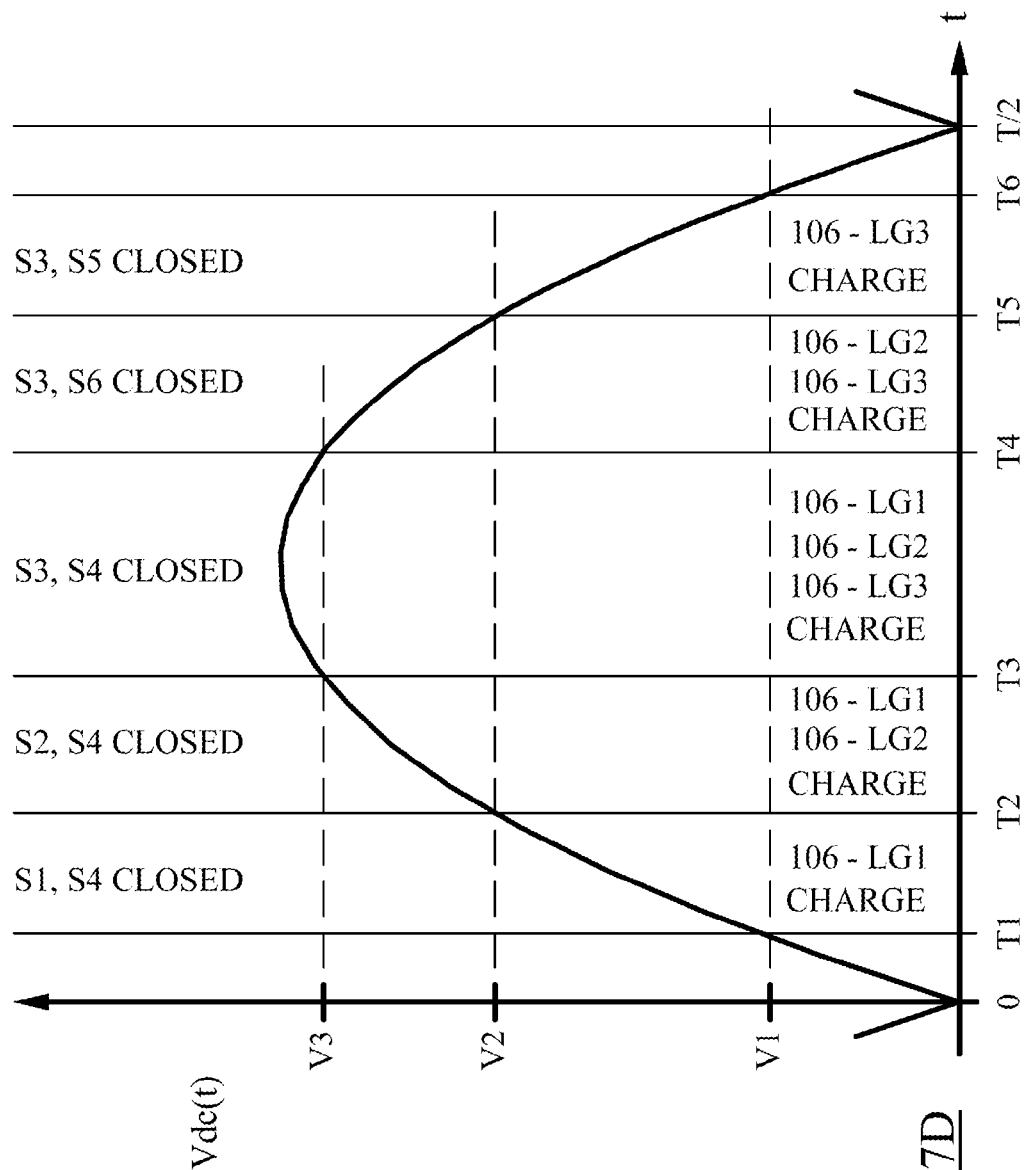
FIG. 7D is a non-limiting exemplary graphical illustration of voltage and specific load elements (e.g., batteries) being charged in the circuit shown in FIG. 7C in accordance with the present invention.

FIG. 7D shows a non-limiting example of a switch timing sequence for the circuit of FIGS. 7A and 7C. In this non-limiting exemplary case, the controller is designed to perform the switching operations depending on the needs of the battery loads and the line conditions. It is shown next by way of example that cell equalization (i.e., charge balancing) is achieved with a properly designed controller. The AC sinusoidal input voltage may be written:

$$Vac(t) = V_p \sin \omega t$$

In order to have near unity power factor, it is desired to control the input AC current so that it is proportional to the input voltage. The linear pass stage performs this function, maintaining proportional input current with proportionality equal to the transconductance Gm. Note, however, that because the series pass stage 404 is operating in the linear mode, no current flows until the instantaneous value of the line voltage Vac(t) is greater than one of the battery loads.

Note that it is not required that the series pass stage 404 be operated in linear mode; it may also operate in switch-mode, for example, as a switch-mode buck, boost, or buck-boost type regulator. It is shown here however that very high efficiency operation is achievable without resorting to switch-mode operation; i.e., while maintaining linear operation of the series pass stage 404, within the context of the present invention. Still, even higher efficiencies are possible using a switching regulator (switch-mode) pass stage 404, in combination with the methods described herein, and in accordance with the present invention.

Let T denote the period of the AC line. Over the half-period from zero to T/2, the AC input current can therefore be written:

$$Iac(t) = \begin{cases} 0; & 0 \le t < T1 \\ I_P \sin \omega t; & T1 \le t \le T6 \\ 0; & T6 < t \le T/2 \end{cases}$$

It is assumed that input current flows only from T1 to T6 owing to the linear operation of the transconductance pass stage used in this example (as discussed above, the linear pass stage can provide current only when the instantaneous magnitude of the input voltage is greater than the effective load voltage). If the pass stage were implemented with a switching regulator, it is possible to maintain current flow prior to T1 and after T6. However, it is demonstrated that a high performance system is achievable while maintaining substantially linear operation of the series pass stage 404. Referring to FIG. 7D, the switching times T1-T6 may be expressed in terms of the voltages at which the switching instants occur:

$$T1 = \frac{T}{2\pi} \sin^{-1} \frac{V1}{V_P}; T2 = \frac{T}{2\pi} \sin^{-1} \frac{V2}{V_P}; T3 = \frac{T}{2\pi} \sin^{-1} \frac{V3}{V_P};$$

and;

$$T4 = \frac{T}{2} - T3; T5 = \frac{T}{2} - T2; T6 = \frac{T}{2} - T1$$

In general, the charge in each battery load is calculated by integrating the battery current with respect to time:

$$Q = \int i(t)dt$$

Let Q1 denote the charge in battery load group 106 LG1, Q2 the charge in battery load group 106 LG2, and Q3 the charge in battery load group 106 LG3. Using the switch timing sequence given in FIG. 7D, the charge in each battery load may be written:

$$Q1 = \int_{T1}^{T2} i(t)dt + \int_{T2}^{T3} i(t)dt + \int_{T3}^{T4} i(t)dt$$

$$Q2 = \int_{T2}^{T3} i(t)dt + \int_{T3}^{T4} i(t)dt + \int_{T4}^{T5} i(t)dt$$

$$Q3 = \int_{T3}^{T4} i(t)dt + \int_{T4}^{T5} i(t)dt + \int_{T5}^{T6} i(t)dt$$

Note that in this example over a half period each battery load is charged in 3 subintervals, and that the charge delivered in some subintervals is the same. That is:

$$\int_{T1}^{T2} i(t)dt = \int_{T5}^{T6} i(t)dt; \text{ and } \int_{T2}^{T3} i(t)dt = \int_{T4}^{T5} i(t)dt$$

From this result, it is straightforward to show that Q1=Q3; i.e., that the charge in battery load group 106 LG1 and battery load group 106 LG3 are equal, over a half cycle of the AC line. Note that it is not essential that the charge be balanced over a half-cycle of the AC line. It is shown here however in this non-limiting rudimentary example, that the charge in each of the charge storage units (e.g., batteries) can be balanced on every half-cycle of the AC line. To continue, it is also straightforward to show, by performing the integration, that the charge delivered to each battery load is:

$$Q1 = \frac{GmV_P}{\omega}\left[\sqrt{1-\left(\frac{V1}{V_P}\right)^2} + \sqrt{1-\left(\frac{V3}{V_P}\right)^2}\right]$$

$$Q2 = \frac{GmV_P}{\omega}\left[2\sqrt{1-\left(\frac{V2}{V_P}\right)^2}\right]$$

$$Q3 = \frac{GmV_P}{\omega}\left[\sqrt{1-\left(\frac{V1}{V_P}\right)^2} + \sqrt{1-\left(\frac{V3}{V_P}\right)^2}\right]$$

Since it is desired to balance the charge in all three battery loads, it is desired that Q1=Q2=Q3. This condition is met by choosing V2 according to:

$$V2 = V_P\sqrt{1-\frac{1}{4}\left[\sqrt{1-\left(\frac{V1}{V_P}\right)^2} + \sqrt{1-\left(\frac{V3}{V_P}\right)^2}\right]^2}$$

In this example, voltages V1 and V3 are chosen to be the lowest values that will allow the linear pass stage to conduct. Then V2 is chosen according to the above equation.

In the non-limiting example shown in FIG. 7C, let the battery loads each be represented by a constant voltage $V_{BAT}=30V_{DC}$, and the AC input voltage is assumed to be 100V peak sine wave at 50 Hz. Since the battery loads are each 30V in this example, V1=30V and V3=90V. Voltage V2 is then calculated from the formula above, and the switching instants are now determined:

$$T1 = \frac{T}{2\pi}\sin^{-1}\frac{V1}{V_P} = \frac{20\text{ ms}}{2\pi}\sin^{-1}\frac{30\text{ V}}{100\text{ V}} = 0.97\text{ ms}$$

$$T2 = \frac{T}{2\pi}\sin^{-1}\frac{V2}{V_P} = \frac{20\text{ ms}}{2\pi}\sin^{-1}\frac{71.9\text{ V}}{100\text{ V}} = 2.55\text{ ms}$$

$$T3 = \frac{T}{2\pi}\sin^{-1}\frac{V3}{V_P} = \frac{20\text{ ms}}{2\pi}\sin^{-1}\frac{90\text{ V}}{100\text{ V}} = 3.56\text{ ms}$$

$$T4 = \frac{T}{2} - T3 = \frac{20\text{ ms}}{2} - 3.56\text{ ms} = 6.44\text{ ms}$$

$$T5 = \frac{T}{2} - T2 = \frac{20\text{ ms}}{2} - 2.55\text{ ms} = 7.45\text{ ms}$$

$$T6 = \frac{T}{2} - T1 = \frac{20\text{ ms}}{2} - 0.97\text{ ms} = 9.03\text{ ms}$$

Figure 7E:
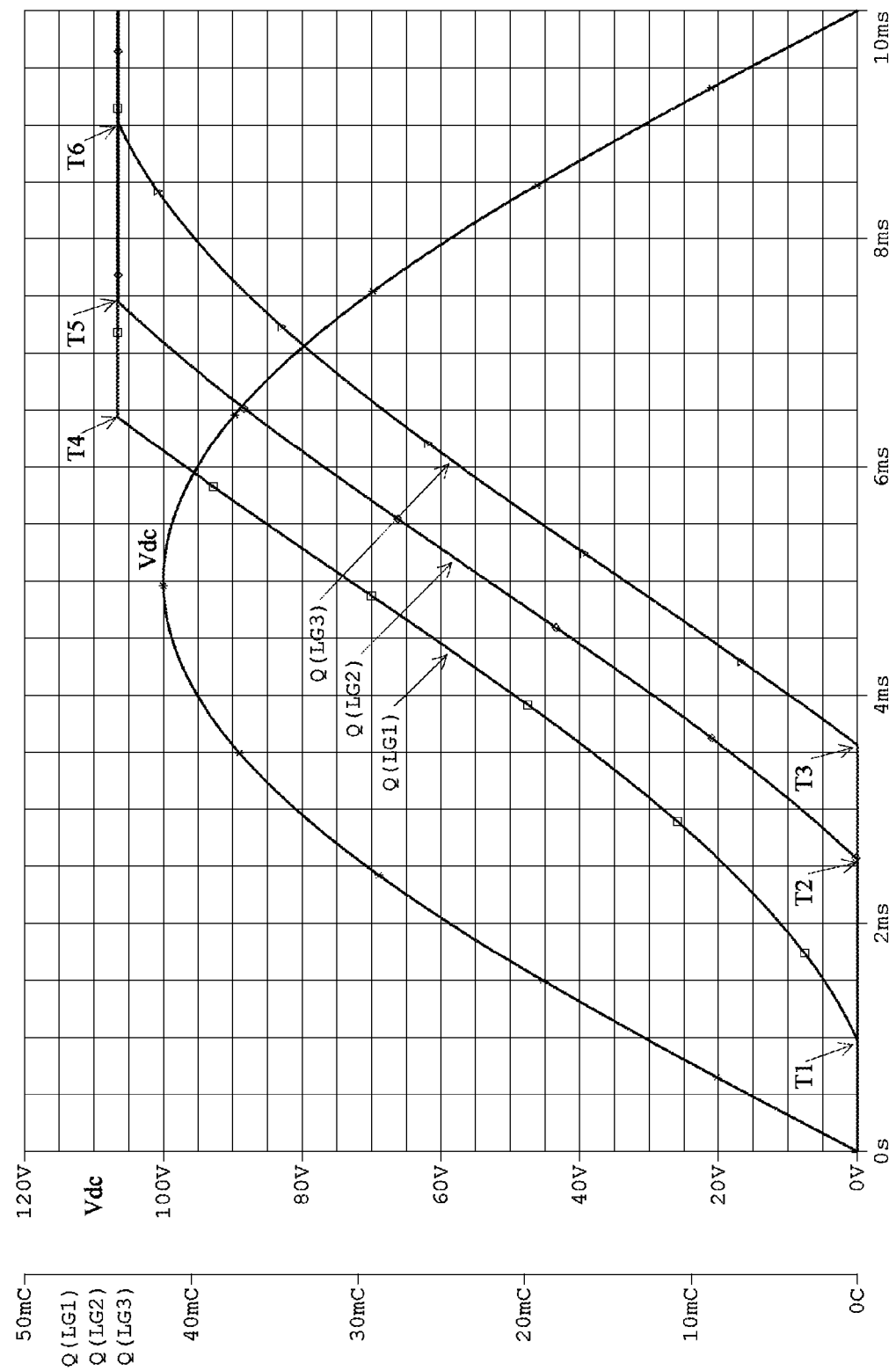
FIG. 7E is a non-limiting exemplary graphical illustration of voltage and charge waveforms of the regulator circuit shown in FIG. 7C in accordance with the present invention.

As best illustrated in FIG. 7E, the rate at which the load groups 106 LG1 to LG3 are charged is balanced over an exemplary half cycle. Consider the sinusoidal AC input voltage Vac(t), crossing through zero at t=0. At the zero crossings of the AC line voltage, the instantaneous value of the full-wave rectified AC voltage is zero. As the full-wave rectified AC voltage Vdc(t) increases, there is a time T1 at which point there is sufficient voltage to supply current to load group 106 LG1, commencing charging battery load group 106 LG1. At T1=0.97 ms, switch S1 is closed, and switch S4 begins to conduct, directing current to flow through load group 106 LG1. Note that because switch S4 is a passive switch (i.e., a diode), switch S1 can be closed before T1, and switch S4 will begin conduction as soon as enough voltage is available to forward bias switch S4. Hence, load group 106 LG1 begins its charge cycle at T1.

As the full-wave rectified AC voltage Vdc(t) continues to increase, there is a time T2 at which point there is sufficient voltage V2 to supply current to load groups 106 LG1 and LG2, and commensurate with providing balanced charge to the battery loads as described above. At T2=2.55 ms, switch S1 opens and switch S2 closes, with switch S4 remaining closed, directing current to flow through load groups 106 LG1 and LG2. Load group 106 LG1 continues its charge cycle, while load group 106 LG2 begins its charge cycle at T2, as shown in FIG. 7E.

As the full-wave rectified AC voltage Vdc(t) continues to increase, there is a time T3 at which point there is sufficient voltage (e.g., V3) to supply current to all three load groups 106 LG2, LG2, and LG3, commencing charging of batteries 106 LG1, LG2, and LG3. At T3=3.56 ms, switch S2 opens and switch S3 closes, with switch S4 remaining closed, directing current to flow through all three load groups 106 LG1, LG2, and LG3. Load groups 106 LG1 and LG2 continue their charge cycles, while load group 106 LG3 begins its charge cycle, at T3.

As the full-wave rectified AC voltage Vdc(t) reaches its peak value and starts decreasing, there is a time T4 at which there is sufficient voltage (e.g., V3) to supply current to load groups 106 LG2 and LG3, commencing charging batteries 106 LG2 and LG3. At T4=6.44 ms, switch S6 closes and switch S4 opens, with switch S3 remaining closed, directing current to flow through load groups 106 LG2 and LG3. Load group LG1 ends its charge cycle, while load groups 106 LG2 and LG3 continue their charge cycles, at T4.

As the full-wave rectified AC voltage Vdc(t) continues to decrease, there is a time T5 at which point there is sufficient voltage V2 to supply current to load group 106 LG3, commensurate with providing balanced charge to the battery loads as described above. At T5=7.54 ms, switch S6 opens and switch S5 closes, with switch S3 remaining closed, directing current to flow through load group 106 LG3. Load group 106 LG3 continues its charge cycle, and load group 106 LG2 ends its charge cycle.

As the full-wave rectified DC voltage decreases further, there is a time T6 at which point there is insufficient voltage to supply current to any load groups 106. At T6=9.03 ms, switches S3 and S5 open, and no current flows for the remainder of the AC half-cycle. Note that because switch S3 is a passive switch (i.e., a diode), switch S5 can be opened after T6, because switch S3 will end conduction as soon as insufficient voltage is available to forward bias the diode switch S3. Hence, load group 106 LG3 ends its charge cycle at T6. The process described above from T0 to T6 repeats in every half-cycle of the AC line cycle, resulting in efficient energy transfer from the power source to the load group 106 LG1 to LG3, and equalized charge delivered to each of the load groups 106 LG1 to LG3.

As was described in a previous embodiment (e.g., shown in FIG. 4G), load group 106 LG1 in that embodiment required the lowest voltage to be turned ON and hence, load group 106 LG1 in FIG. 4G remained ON throughout the majority of the line cycle. Additionally, in that embodiment, the time periods and durations between times T1 and T2, or T3 and T4, or any other time duration combinations could have been varied. Finally, the voltage levels (in the embodiment related to FIG. 4G) at which point switching occurs could have also been varied. However, in this embodiment (FIG. 7D), since storage units LG1 to LG3 charges must be balanced, the switching scheme disclosed ensures that each load group LG1 to LG(N) is equally charged, and were able to achieve this charge balance within every half-cycle of the AC line (i.e., each load is charged with an appropriate amount of charge with an appropriate duration, in every half line cycle). Therefore, in this example, no load group 106 is ON or active throughout the majority of the line cycle, unless the balancing of charge allows it. Accordingly, the battery load group 106 LG1 in FIG. 7D is charged between T1 and T4 only, load group 106 LG2 is charged between T2 and T5 only, and battery load group 106 LG3 is charged between T3 and T6 only. In addition, the duration of time between T1 and T2 compared with T3 and T4 is different and the voltage difference between levels V1 and V2 verses V2 and V3 (to activate/deactivate switches) is also different, in order to balance the charge in each of the battery load groups 106 LG1 to LG3 over one-half of the AC line cycle. In this non-limiting exemplary embodiment shown in FIG. 7D, it is clear (due to symmetry of the sinusoidal voltage line cycle) that the load groups 106 LG1 and LG3 will receive the same amount of charge. For load group 106 LG2, in order for this battery load group 106 LG2 to be charged and charge balanced with respect to battery load groups LG1 and LG3, the voltage level V2 was adjusted. That is, the level of the voltage V2 at which the load group 106 LG2 is activated (commences charging) is raised, which reduces the duration of time (T2 to T5) over which this load group 106 LG2 is charged.

Note that it is not necessary that the charge delivered to the battery load groups 106 be balanced in every half-cycle of the AC line cycle. The above example was used to demonstrate that it is possible to achieve charge balance to battery load groups 106 in every half-cycle, but other intervals or periods can be employed, including but not limited to balancing the charge over a full line cycle, balancing the charge over multiple line cycles, or balancing the charge over intervals not related to the line cycle. For example, consider a hypothetical system consisting of 8 battery load groups 106 LG1 to LG8. Battery load groups 106 LG1 to LG4 could be charged using a charge-balancing scheme similar to that above, over a one-hour interval, and battery load groups 106 LG5 to LG8 could be charged using the same charge-balancing scheme, over the next one-hour interval. Hence, charge balance is achieved but the intervals and subintervals can vary from times much less than a line period, to times much greater than a line period.

Figure 7F:
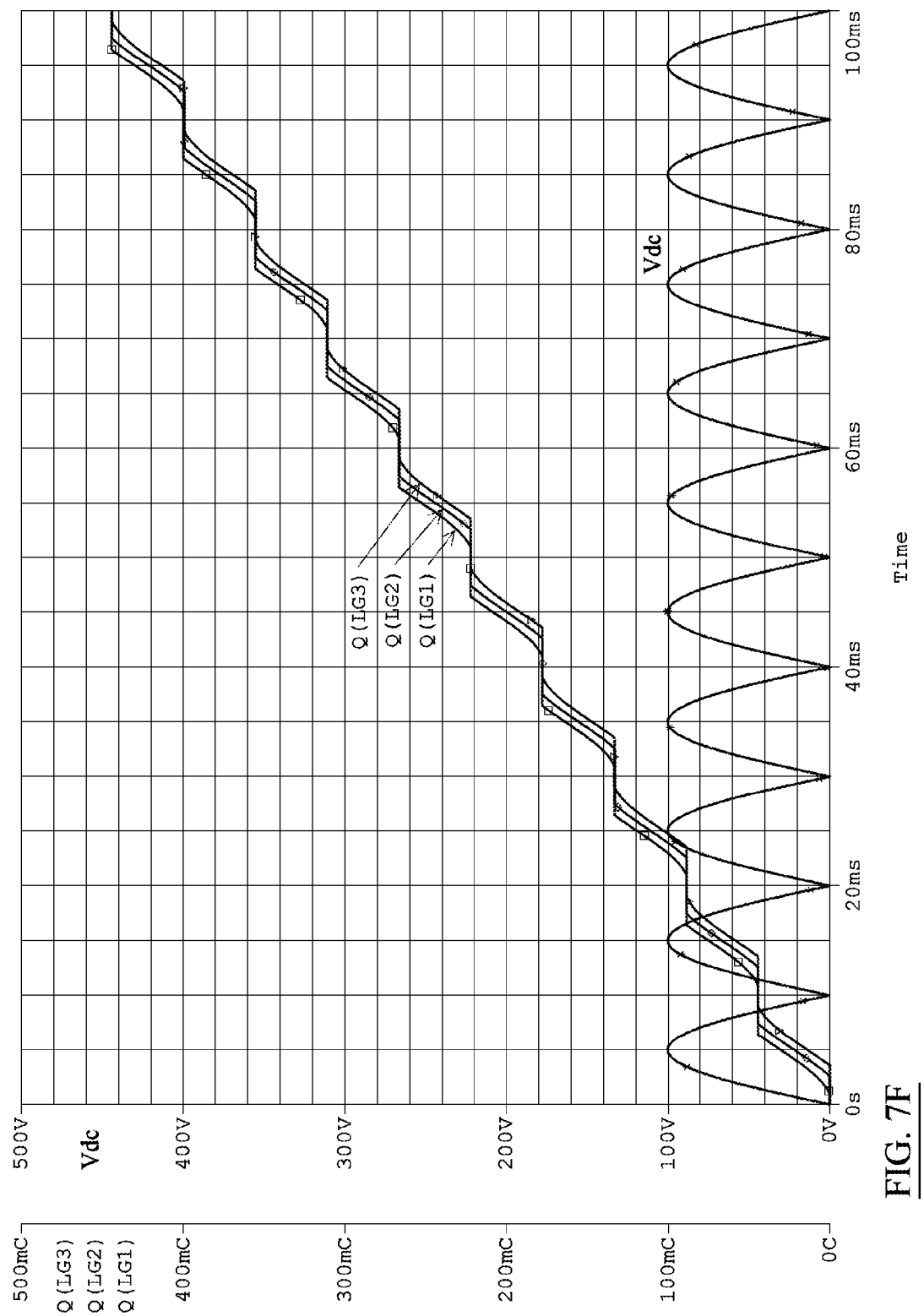
FIG. 7F is a non-limiting exemplary graphical illustration of voltage and charge waveforms of the regulator circuit shown in FIG. 7C over several line periods in accordance with the present invention.

For the exemplary embodiment of FIG. 7D, the charge delivered to the three battery load groups 106 LG1 to LG3 over one-half of a line cycle is illustrated in FIG. 7E, demonstrating that each battery load group 106 LG1, LG2 and LG3 receive the same amount of charge. At the end of one-half of a line cycle, each battery receives approximately 44.2 mC of charge. The charge in each of the three battery load groups 106 LG1 to LG3 over five (5) full line cycles is illustrated in FIG. 7F. It is shown that the charge delivered to each battery load groups 106 LG1 to LG3 is equal at the end of every line half-cycle, and is therefore equal at the end of five full line cycles. Each battery load group 106 LG1, LG2, and LG3 accumulates approximately 442 mC of charge (in accordance with the non-limiting example described above) at the end of five full line cycles, which is ten times that accumulated over one-half of the line cycle as shown previously.

Figure 7G:
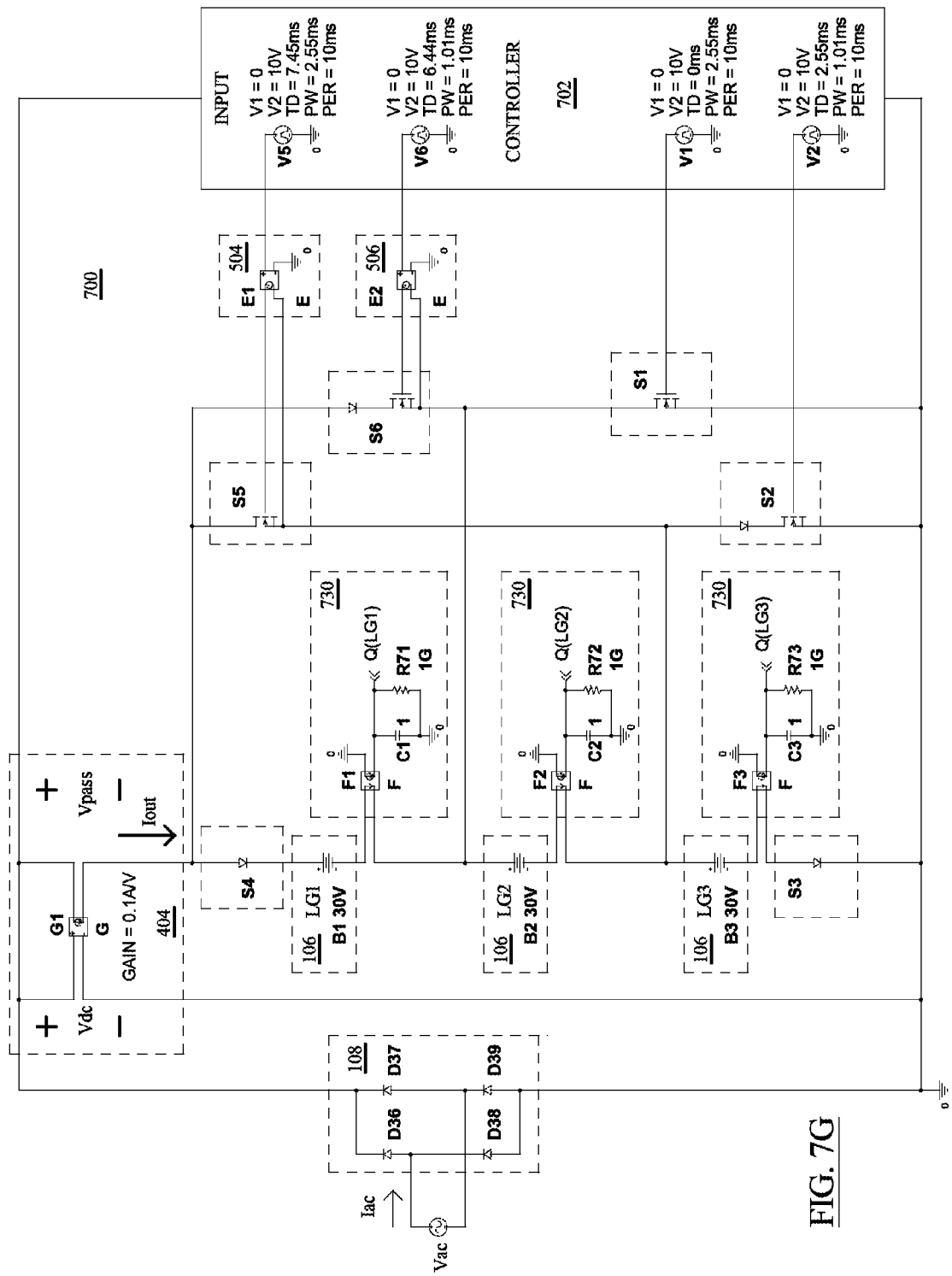
FIG. 7G is a non-limiting exemplary detailed illustration of a regulator circuit shown in FIG. 7C in accordance with the present invention.

FIG. 7G is a non-limiting, exemplary illustrative implementation of the detailed circuit topography of the regulator circuit 700 shown in FIGS. 7A to 7F. In addition, FIG. 7G further details an exemplary circuit topography of the series pass stage 404 (also shown in FIG. 4D) and exemplary circuit details of the controller 702. The overall operation of the regulator circuit 700 of the FIG. 7G is similar to that described in reference to FIGS. 7A to 7F.

The embodiment given in FIG. 7F also shows details of level shifters 504 and 506, which provide a differential Gate-to-Source voltage to drive the MOSFET switches. As stated above, level shifters 504 and 506, their use, and operations are very well-known, and may be implemented in a variety of different schemes, non-limiting examples of which are shown in FIGS. 5D, 5F, and 7F and hence, the illustrated level shifters in FIGS. 5D, 5F, and 7F should not be limiting.

Figure 7H:
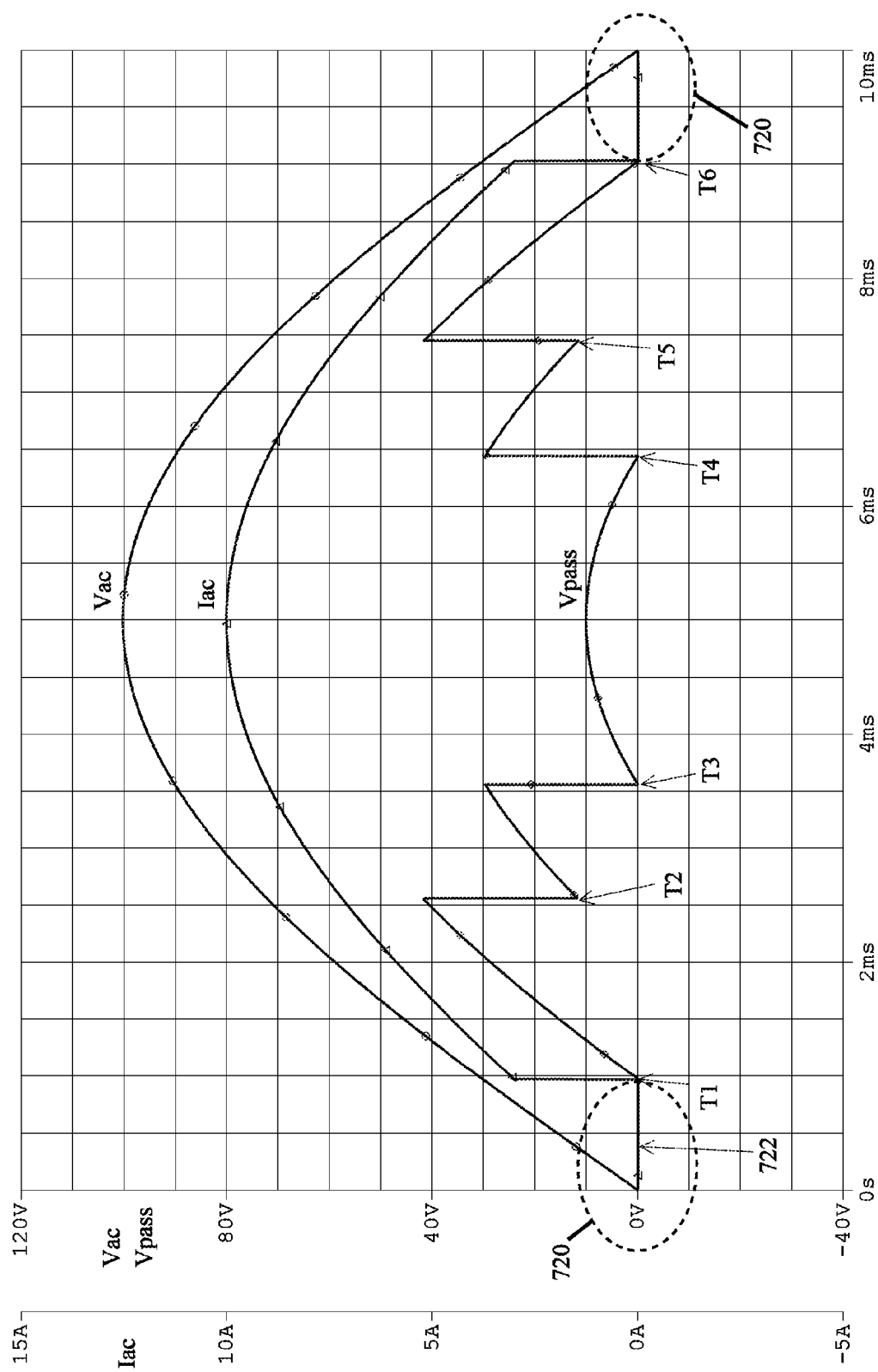
FIG. 7H is a non-limiting exemplary graphical illustration of voltage and current waveforms of the regulator circuit shown in FIG. 7G in accordance with the present invention.

FIG. 7H is an exemplary graphical illustration of the operational electrical properties or characteristics of the regulator circuit 700 of FIG. 7G in accordance with the present invention. The graphs of FIG. 7H show the AC input voltage Vac(t), the AC input current Iac(t), and the voltage across the series pass stage 404, Vpass(t). As illustrated, one electrical property or characteristic of the regulator circuit of FIG. 7G is that the series pass stage 404 provides a substantially continuous proportionality between the AC input voltage Vac(t) and the AC input current Iac(t) over the majority of the half-cycle period. The exception to the proportionality between the Iac(t) and Vac(t) is near the zero-crossings 720 where there is insufficient AC input voltage Vac(t) to generate sufficient AC input current Iac(t) to activate (or in this exemplary instance, "charge") any load group 106. That is, at the very beginning of the line cycle, the AC input voltage Vac(t) in the indicated region 722, even though voltage Vac(t)>0 between times T0 and T1, that voltage does not generate sufficient current to commence charging the load group 106 LG1.

The values given in FIGS. 7A to 7F, and those derived from the above equations are used in the non-limiting, exemplary model shown in FIG. 7G, to demonstrate circuit function. Rather than the rudimentary open-loop controller given in FIG. 7G, a closed-loop controller could monitor the charge of each of the battery loads, and act to adjust the charge delivered to the respective battery loads to maintain charge balance. That is, a feedback scheme could be used to calculate the switching instants on a cycle-by-cycle basis. As illustrated in FIG. 7G, the controller 702 includes a timing scheme for the proper sequence of activation of switches S1 to S6 at specified times, and for specified durations (i.e., period), all of which are derived from the above detailed equations, which are implemented in both hardware and or software. The regulator circuit 700 of FIG. 7G also includes charge measuring modules 730 Q1, Q2, and Q3 that measure the amount of accumulated charge Q in each load group 106 LG1 to LG3, the outputs of which are shown in the graphs of FIGS. 7E and 7F indicating accumulated charge. It should be noted that the measuring modules 730 Q1, Q2, and Q3 are optional but can be part of an overall feedback module that measures charge in each load group 106, and provides that information to the controller 702 for determination of the appropriate timing scheme. As a result, the regulator circuit 700 of FIG. 7G provides a balanced charge, high power factor, and high efficiency.

As mentioned above in relations to the FIGS. 7A to 7G, and as illustrated in FIG. 7H, at time T1 the switch S1 and S4 are closed (e.g., ON), but now there is sufficient voltage Vac(t) to cause sufficient current Iac(t) to flow through load group 106 LG1, to start to charge the load group 106 LG1 (as the voltage Vac(t) continues to increase). Between times T1 and T2, the voltage Vac(t) (and the current Iac(t)) continue to ramp up until at time T2 switches S2 and S4 are closed (e.g., ON), which commences charging of battery load groups 106 LG1 and LG2. Between times T2 and T3 the voltage Vac(t) and the current Iac(t) continue to ramp up even further until at time T3 switches S3 and S4 close (e.g., ON), to commence the charging of load groups 106 LG1, LG2, and LG3.

Between times T3 and T4 the voltage Vac(t) and the current Iac(t) reach the peak of the AC line cycle and start to reverse until at time T4 switches S3 and S6 close (e.g., ON) to commence charging of load groups 106 LG2 and LG3.

Between T4 and T5 the voltage Vac(t) and the current Iac(t) continue to decrease until at time T5 switches S3 and S5 close (e.g., ON) to commence charging of the load group 106 LG3 until time T6.

As illustrated in FIG. 7H, the voltage across the series pass stage 404, Vpass, is maintained close to zero, while the charge delivered to each of the battery load groups 106 is balanced, as illustrated in FIG. 7F. It can be shown that the efficiency of this rudimentary three-level system, using the charge balancing control method described is:

$$\text{efficiency} = \frac{3 \cdot VBAT}{V_P} \frac{2}{\pi} \frac{\sqrt{1-\left(\frac{V1}{V_P}\right)^2} + \sqrt{1-\left(\frac{V3}{V_P}\right)^2}}{1 - \frac{2}{\pi}\sin^{-1}\frac{V1}{V_P} + \frac{2}{\pi}\frac{V1}{V_P}\sqrt{1-\left(\frac{V1}{V_P}\right)^2}} = 80.6\%$$

An efficiency of 80.6% is a respectable result considering that the battery load is broken into only three battery load groups 106. Further increases in efficiency can be gained by breaking the battery load down into more load groups 106 LG1 to LG(N), thereby enabling further reduction of the voltage across the series pass stage 404. It is thus demonstrated that high efficiency is achievable even with linear operation of the series pass stage 404. Note that still further increases in efficiency are possible by implementing the series pass stage 404 with a switching regulator.

An embodiment realizing a battery charging system has been described within the context of the present invention. Charge balance and high efficiency have been demonstrated using this rudimentary three-level example. Increasing the number of levels, that is, dividing the load into more load groups, acts to improve the efficiency by allowing the reduction of voltage appearing across the series pass stage 404 in operation. It is clear that other applications of this embodiment exist. For example, the batteries could be replaced by capacitors or super-capacitors, and the system could operate as a high efficiency, high power factor AC/DC converter. In this case, connecting the DC system load across the series combination of the batteries, capacitors, or super-capacitors provides DC power to the system load. The charge flowing to each of the capacitors or super-capacitors is then maintained using the methods described above.

Although the invention and various embodiments of the invention have been described in considerable detail in language specific to structural features and or method acts (including showing of parameters of components), it is to be understood that the invention and embodiments of the invention described and shown in the drawings should not be limited to the specific features or acts described and shown. Rather, the specific features and acts (such as the parameters of circuit components shown) are disclosed as exemplary forms of implementing the invention. Stated otherwise, it is to be understood that the phraseology, terminology, and various measurements employed herein (and shown in drawings) are for the purpose of description and should not be regarded as limiting. Therefore, while exemplary illustrative embodiments of the invention have been described and shown, numerous variations and alternative embodiments will occur to those skilled in the art. For example, with respect to FIG. 4A, an additional switch (e.g., switch S0, not shown) may be coupled in between a switching tap point TP0 (not shown) and ground, with switching tap point TP0 selected in between the series coupled series pass stage 404 and the first load group 106 LG1. With such an arrangement, initially at time t=0 where the switches S0 to SN are all closed, the entire load 104 would be shorted out. As another example, with respect to FIG. 5A, additional switch (e.g., switch S0, not shown) may be coupled in between a switching tap point TP0 (not shown) and switching tap point TP1, with switching tap point TP0 selected in between the series coupled series pass stage 404 and the first load group 106 LG1. With such an arrangement, initially at time t=0 where the switches S0 to S(N) are all closed, the entire load 104 would be shorted out. Throughout the disclosure of the present invention all load elements of a load group 106 of a load 104 are illustrated as being identical. For example, all load elements of a load group 106 of a load 104 are shown as either LEDs only, or batteries only. However, this is only for the convenience of example and should not be limiting. Accordingly, one or more load elements within one or more load groups 106 of a load 104 may vary and be different so long as the load elements have similar or compatible electrical properties or characteristics. For example, a load element of a load group 106 LG1 may be a laptop computer, and a load element of the same load group 106 LG1 or a different load group 106 LG2 of a load 104 may be another component or product, but with similar or compatible electrical properties and characteristics. Accordingly, one or more load elements within one or more load groups 106 of a load 104 need not be identical products or components so long as they have similar or compatible electrical properties and characteristics. As yet another example, the embodiment illustrated in FIGS. 5D to 5F uses a 3-bit flash ADC as the controller. As an alternative embodiment, the present invention also contemplates the use of a timer as a controller instead of the 3-bit flash ADC shown. The timer may be configured to sense the zero-crossings of the AC input voltage Vac(t) and "count up" in order to predict the various voltage levels and the corresponding times at which those levels are reached, and based on those instantaneous voltage levels, switch in and out load groups 106 in a manner similar to that described in relation to FIGS. 5D to 5F. In other words, given the application (e.g., 120 VAC line at 60 Hz), the various voltage levels as the AC input voltage is ramped up or increased and the corresponding times at which those levels are reached (for example, the time at which the input AC voltage Vac(t) will reach 30 volts) can be mapped to control the switches to control loads. Yet another example relating to the embodiment of FIGS. 5D to 5F is the use of a "counting" approach, whereby a load group 106 is added into the circuit each time the voltage appearing across the series pass stage 404 exceeds some threshold. In this scheme, the controller observes the voltage across the series pass stage 404, and load groups 106 are switched into and out of the circuit in order to minimize that voltage. Hence, the number of load elements in the circuit is increased each time the voltage Vpass exceeds some upper threshold, and the number of load elements in the circuit is decreased each time the voltage Vpass falls below some lower threshold. In this way, only as many load groups 106 are activated as can be supported by the available AC input voltage Vac(t). Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter-clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:

1. A regulator circuit, comprising:
   a controller that divides a load into two or more load groups, with a load group of the two or more load groups comprised of at least one load element;
   the controller directs power to one of the load, at least one load group, and at least one load element commensurate with instantaneous magnitude of a power source voltage and power requirements of one of the load, at least one load group, and at least one load element to establish any one or more of:
   a load voltage across and a load current through the load;
   a load group voltage across and a load group current through at least one load group; and
   a load element voltage across and a load element current through at least one load element;
   wherein the load group voltage having a first magnitude that is less than the load voltage magnitude, and with the load element voltage having a second magnitude that is less than or equal to the first magnitude;
   wherein load element current through at least one load element established commensurate with power requirements of the load element and the instantaneous magnitude of the power source voltage to thereby maximize operational output of the load and improve efficiency.

2. The regulator circuit as set forth in claim 1, wherein:
   the load element current through at least one load element is established throughout most of an Alternating Current (AC) line cycle commensurate with power requirements of the load element and the instantaneous magnitude of the AC power source voltage to thereby maximize operational output of the load, improving efficiency and power factor.

3. The regulator circuit as set forth in claim 2, further comprising:
   one or more series pass stages for regulating current to load substantially proportional to input voltage.

4. The regulator circuit as set forth in claim 1, wherein:
   the load group current through at least one load group is established throughout most of an Alternating Current (AC) line cycle commensurate with power requirements of the load group and the instantaneous magnitude of the AC power source voltage to thereby maximize operational output of the load, improving efficiency and power factor.

5. The regulator circuit as set forth in claim 4, further comprising:
   one or more series pass stages for regulating current to load substantially proportional to input voltage.

6. A regulator circuit, comprising:
   a controller that divides a load into two or more load groups, with a load group of the two or more load groups comprised of at least one load element;
   the controller directs power to one of the load, at least one load group, and at least one load element commensurate with instantaneous magnitude of a power source voltage and power requirements of one of the load, at least one load group, and at least one load element to establish any one or more of:
   a load voltage across and a load current through the load;
   a load group voltage across and a load group current through at least one load group; and
   a load element voltage across and a load element current through at least one load element;
   wherein the load group voltage having a first magnitude that is less than the load voltage magnitude, and with the load element voltage having a second magnitude that is less than or equal to the first magnitude;
   wherein load element current through at least one load element established commensurate with power requirements of the load element and the instantaneous magnitude of the power source voltage, with the load element current through at least one load element is established through a part of an Alternating Current (AC) line cycle commensurate with power requirements of the load element and the instantaneous magnitude of the AC power source voltage.

7. A regulator circuit, comprising:
   a controller that divides a load into two or more load groups, with a load group of the two or more load groups comprised of at least one load element;
   the controller directs power to one of the load, at least one load group, and at least one load element commensurate with instantaneous magnitude of a power source voltage and power requirements of one of the load, at least one load group, and at least one load element to establish any one or more of:
   a load voltage across and a load current through the load;
   a load group voltage across and a load group current through at least one load group; and
   a load element voltage across and a load element current through at least one load element;
   wherein the load group voltage having a first magnitude that is less than the load voltage magnitude, and with the load element voltage having a second magnitude that is less than or equal to the first magnitude;
   wherein load element current through at least one load element established commensurate with power requirements of the load element and the instantaneous magnitude of the power source voltage, with the load group current through at least one load group is established through a part of an Alternating Current (AC) line cycle commensurate with power requirements of the load group and the instantaneous magnitude of the AC power source voltage.

* * * * *